United States Patent
Hirota et al.

(10) Patent No.: US 6,502,391 B1
(45) Date of Patent: Jan. 7, 2003

(54) EXHAUST EMISSION CONTROL DEVICE OF INTERNAL COMBUSTION ENGINE

(75) Inventors: Shinya Hirota, Susono (JP); Shunsuke Toshioka, Susono (JP); Toshiaki Tanaka, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/890,216

(22) PCT Filed: Dec. 16, 1999

(86) PCT No.: PCT/JP99/07080

§ 371 (c)(1),
(2), (4) Date: Jul. 24, 2001

(87) PCT Pub. No.: WO00/43648

PCT Pub. Date: Jul. 27, 2000

(30) Foreign Application Priority Data

Jan. 25, 1999 (JP) .......................................... 11-016283
Jul. 30, 1999 (JP) .......................................... 11-217616

(51) Int. Cl.[7] ................................................. F01N 3/00
(52) U.S. Cl. ............................. 60/288; 60/295; 60/301
(58) Field of Search ........................... 60/287, 299, 301, 60/288, 295

(56) References Cited

U.S. PATENT DOCUMENTS

| | | | | |
|---|---|---|---|---|
| 5,388,406 A | * | 2/1995 | Takeshima et al. | ........... 60/288 |
| 5,473,890 A | | 12/1995 | Takeshima et al. | |
| 6,014,859 A | * | 1/2000 | Yoshizaki et al. | ............. 60/274 |
| 6,058,700 A | * | 5/2000 | Yamashita et al. | ............. 60/288 |

FOREIGN PATENT DOCUMENTS

| | | | |
|---|---|---|---|
| EP | 754841 | | 1/1997 |
| JP | 05-263633 | * | 10/1993 |
| JP | 05-263634 | * | 10/1993 |
| JP | 05-272330 | * | 10/1993 |
| JP | 05-272334 | * | 10/1993 |
| JP | 5288044 | | 11/1993 |
| JP | 05-312027 | * | 11/1993 |
| JP | 05-312031 | * | 11/1993 |
| JP | 05-340236 | * | 12/1993 |
| JP | 05-340238 | * | 12/1993 |
| JP | 7-259542 | | 10/1995 |
| JP | 2605580 | | 2/1997 |
| JP | 2727914 | | 12/1997 |
| JP | 2842122 | | 10/1998 |
| JP | 2845068 | | 10/1998 |
| JP | 11-93641 | | 4/1999 |

* cited by examiner

*Primary Examiner*—Thomas Denion
*Assistant Examiner*—Diem Tran
(74) *Attorney, Agent, or Firm*—Kenyon & Kenyon

(57) ABSTRACT

An object of the present invention is to improve reliability of exhaust emission purification in an exhaust emission purifying device having an NOx catalyst and an bypass path bypassing the NOx catalyst. The present invention provides an exhaust emission purifying device including an SOx absorbing material 17 provided in an exhaust passage of an internal combustion engine, a main NOx catalyst 20 provided in the exhaust passage on the downstream side of the SOx absorbing material, a bypass pipe 26 branching off from the exhaust passage at a position between the SOx absorbing material 17 and the main NOx catalyst 20, and an exhaust switching valve 28 provided at the start end of the bypass pipe 26 and adapted to switch the exhaust flow between the main NOx catalyst 20 and the bypass pipe 26, wherein a sub NOx catalyst 24 is provided in the bypass pipe 26 and wherein when the exhaust switching valve 28 is controlled so as to lead the exhaust to the main NOx catalyst 20 and as to prevent the exhaust from flowing through the bypass pipe 26, any exhaust leaking from the exhaust switching valve 28 to the bypass pipe 26 is purified by the sub NOx catalyst 24.

19 Claims, 21 Drawing Sheets

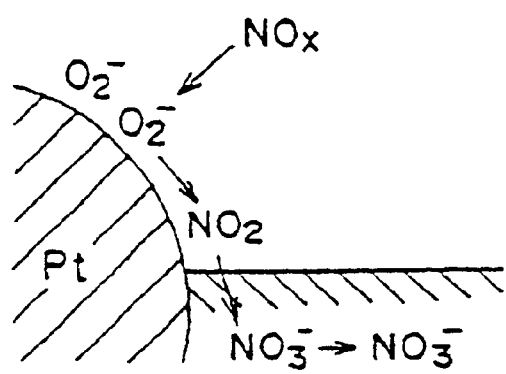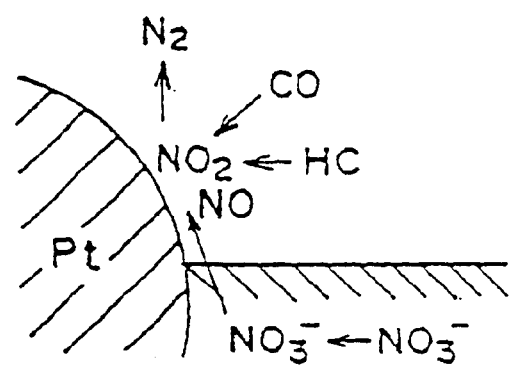
Fig. 4

(A)

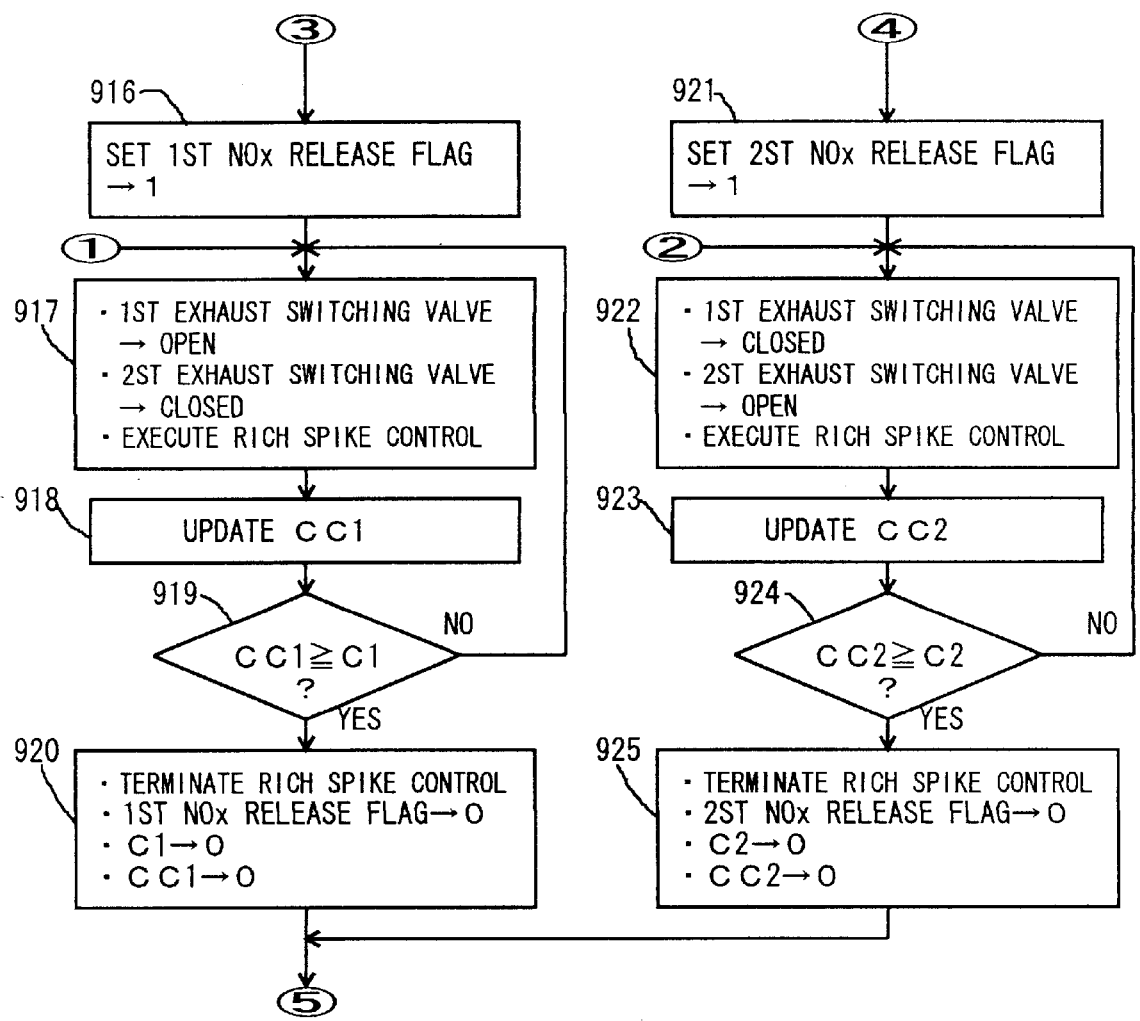

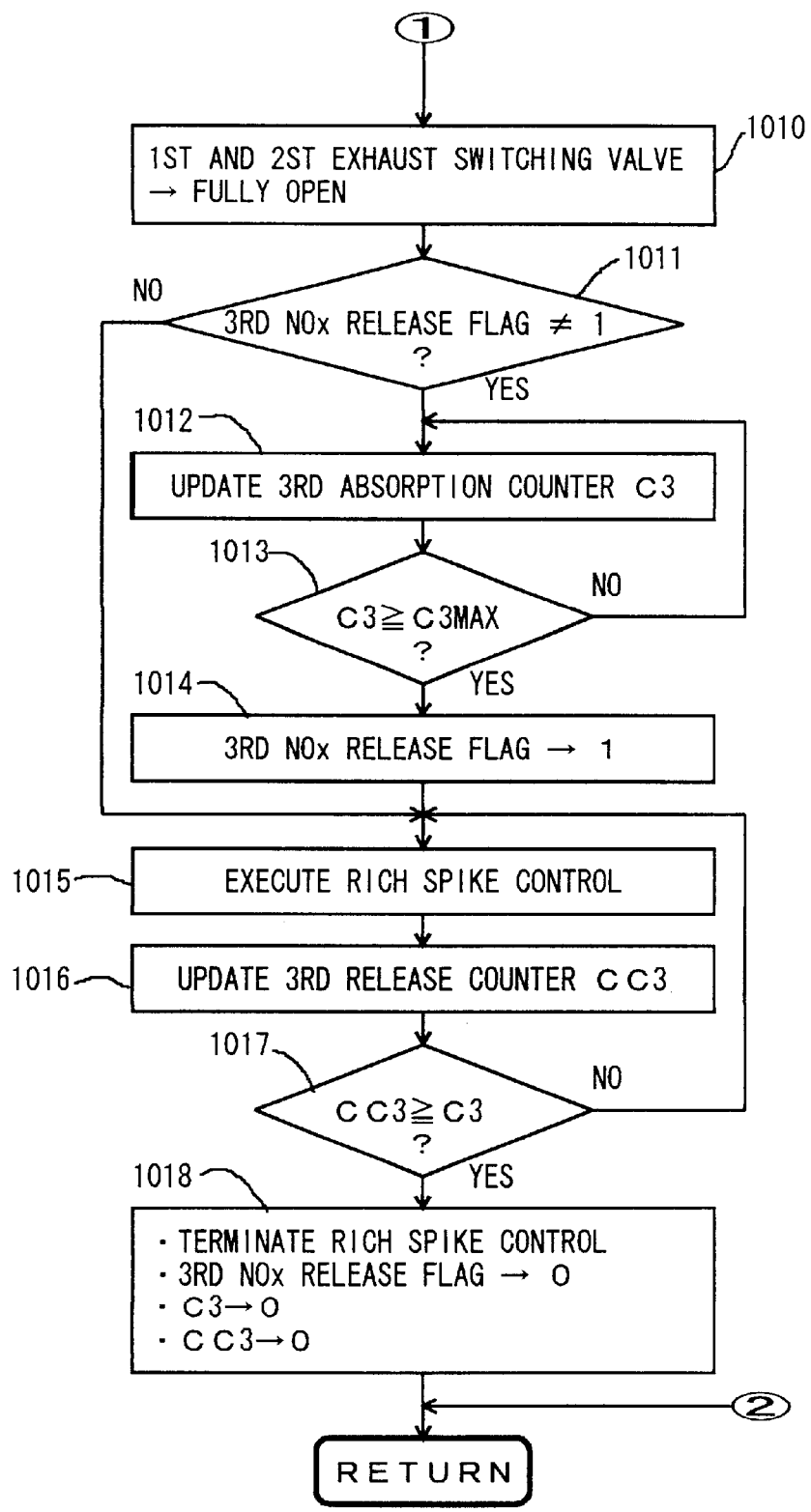

EXHAUST EMISSION CONTROL DEVICE OF INTERNAL COMBUSTION ENGINE

TECHNICAL FIELD

The present invention relates to an exhaust emission purifying device capable of removing nitrogen oxides (NOx) from the exhaust emitted from an internal combustion engine capable of lean burning.

BACKGROUND ART

Recently, as a vehicle-mounted internal combustion engine, a lean-burn type internal combustion engine is being developed which is capable of burning an air-fuel mixture with excessive oxygen. Along with this, a technology for removing harmful gas components, in particular, nitrogen oxides (NOx), contained in the exhaust gas from a lean-burn type internal combustion engine is being developed.

As a technology for purifying the exhaust emitted from a lean-burn type internal combustion engine, a technology is known according to which an NOx absorbing material, such as an occlusion reduction type NOx catalyst, is provided in the exhaust passage of an internal combustion engine.

The NOx absorbing material absorbs the NOx in the exhaust when the air-fuel ratio of the exhaust flowing therethrough indicates excessive oxygen (that is, in the case of a lean air-fuel ratio), and releases the NOx it has absorbed when the oxygen concentration of the exhaust flowing therethrough is reduced. The occlusion reduction type NOx catalyst, which is an example of the NOx absorbing material, is a catalyst which absorbs the NOx in the exhaust when the air-fuel ratio of the exhaust flowing in is lean, and reduces the NOx to nitrogen ($N_2$) while releasing the NOx it has absorbed when the oxygen concentration of the exhaust flowing in is reduced.

When the occlusion reduction type NOx catalyst is arranged in the exhaust passage of a lean-burn-type internal combustion engine, the NOx in the exhaust is absorbed by the occlusion reduction type NOx catalyst when the air-fuel ratio of the exhaust is lean, and the NOx which has been absorbed by the occlusion reduction type NOx catalyst is released as $NO_2$ when the air-fuel ratio of the exhaust is stoichiometric or rich, the $NO_2$ reacting with the reduction components in the exhaust, such as hydrocarbon (HC) and carbon monoxide (CO), to be thereby reduced to nitrogen ($N_2$)

In some cases, the fuel of an internal combustion engine contains sulfur content. If such a fuel is burnt in an internal combustion engine, the sulfur content in the fuel is oxidized to generate sulfur oxides (SOx), such as $SO_2$ and $SO_3$. The occlusion reduction type NOx catalyst absorbs the SOx in the exhaust on the same principle as the absorption of NOx, so that, when the occlusion reduction type NOx catalyst is arranged in the exhaust passage of an internal combustion engine, the occlusion reduction type NOx catalyst absorbs not only NOx but also SOx.

The SOx absorbed by the occlusion reduction type NOx catalyst forms a stable sulfate with passage of time, so that, in the same conditions for effecting release/reduction of NOx from the occlusion reduction type NOx catalyst, it is not easily decomposed or released and tends to be accumulated in the occlusion reduction type NOx catalyst. When the accumulation amount of SOx in the occlusion reduction type NOx catalyst increases, the NOx absorption capacity of the occlusion reduction type NOx catalyst decreases, and it becomes impossible to remove the NOx in the exhaust to a sufficient degree, that is, so-called SOx poisoning occurs.

To cope with this problem, there has conventionally been proposed an exhaust emission purifying device in which an SOx absorbing material for absorbing the SOx contained in the exhaust is provided in the exhaust passage on the upstream side of the occlusion reduction type NOx catalyst. When the air-fuel ratio of the exhaust flowing in is lean, the SOx absorbing material absorbs the SOx in the exhaust, and when the air-fuel ratio of the exhaust flowing in is stoichiometric or rich, it releases the SOx it has absorbed as $SO_2$.

In this exhaust emission purifying device, the SOx in the exhaust is removed on the upstream side of the occlusion reduction type NOx catalyst, and it is possible to prevent the SOx poisoning of the occlusion reduction type NOx catalyst.

However, there is a limitation to the SOx absorption capacity of the SOx absorbing material, so that it is necessary to perform a processing for releasing the SOx absorbed by the SOx absorbing material, that is, a regeneration processing, before the SOx absorption capacity of the SOx absorbing material has been saturated.

An example of the SOx absorbing material regeneration technology is disclosed in Japanese Patent No. 2605580. According to this patent official gazette, to release the SOx absorbed by the SOx absorbing material, it is necessary for the air-fuel ratio of the exhaust flowing in to be stoichiometric or rich. Further, the higher the temperature of the SOx absorbing material, the easier it is for the SOx to be released.

In the exhaust emission purifying device disclosed in the above-mentioned official gazette, to prevent the SOx released from the SOx absorbing material from being absorbed by the occlusion reduction type NOx catalyst, there are provided an bypass path branching off from the exhaust pipe connecting the SOx absorbing material and the occlusion reduction type NOx catalyst and bypassing the occlusion reduction type NOx catalyst, and an exhaust switching valve for selectively switching the exhaust flow between the occlusion reduction type NOx catalyst and the bypass path. When executing the regeneration process of the SOx absorbing material, the exhaust switching valve is controlled so as to cause all the exhaust from the SOx absorbing material to flow through the bypass path.

Further, in the exhaust emission purifying device disclosed in the above-mentioned official gazette, when the regeneration process of the SOx absorbing material is not being performed, in other words, when the absorption or releasing of NOx is to be performed by the occlusion reduction type NOx catalyst, the exhaust switching valve is controlled so as to cause all the exhaust to flow through the occlusion reduction type NOx catalyst.

As is known in the art, the sealing property of the exhaust switching valve used in the above exhaust emission purifying device cannot be regarded as perfect, and the valve allows leakage of approximately 1 to 10% of the exhaust. Thus, in the exhaust emission purifying device disclosed in the above official gazette, if the exhaust switching valve is controlled so as to allow the exhaust to flow through the occlusion reduction type catalyst and as to prevent the exhaust from flowing into the bypass path, some exhaust is allowed to leak through the exhaust switching valve to the bypass path, with the result that the NOx contained in the exhaust leaking through the exhaust switching valve to the bypass path is released to the atmosphere without being removed from the exhaust.

As a result of the recent progress in the catalyst technology, the NOx purifying ratio by the occlusion reduction type NOx catalyst is over 90%. Thus, the deterioration in exhaust emission control due to the leakage through the exhaust switching valve cannot be neglected.

Further, the above-described conventional exhaust emission purifying device for an internal combustion engine is not provided with a means for reducing the hydrocarbon (HC) in the exhaust when the internal combustion engine is started when the ambient temperature is low (that is, at the time of low-temperature startup), so that there is the danger of the hydrocarbon (HC) in the exhaust being released to the atmosphere without being purified from the exhaust. Thus, the conventional exhaust emission purifying device leaves room for improvement.

DISCLOSURE OF THE INVENTION

The present invention has been made in view of the above various problems. It is an object of the present invention to prevent a deterioration in exhaust emission purifying due to leakage of the exhaust into the bypass path when the bypass path is closed by the exhaust flow switching means.

Another object of the present invention is to reduce the hydrocarbon concentration in the exhaust when the internal combustion engine is started at low temperature.

To achieve the above objects, the present invention adopts the following means.

An exhaust emission purifying device of an internal combustion engine according to the present invention comprises a lean-burn-type internal combustion engine capable of burning an air-fuel mixture with excessive oxygen, an NOx absorbing material which is arranged in an exhaust passage of the internal combustion engine and which is adapted to absorb nitrogen oxides (NOx) when the air-fuel ratio of the exhaust flowing-in is lean and to release the nitrogen oxides (NOx) it has absorbed when the oxygen concentration of the exhaust flowing-in is low, a bypass path branching off from a portion of the exhaust passage on the upstream side of the NOx absorbing material and allowing the exhaust to flow so as to bypass the NOx absorbing material, an exhaust flow switching means for selectively switching the exhaust flow between the NOx absorbing material and the bypass path, an SOx absorbing material arranged in the exhaust passage on the upstream side of the exhaust flow switching means and adapted to absorb sulfur oxides (SOx) when the air-fuel ratio of the exhaust flowing in is lean and to release the sulfur oxides (SOx) it has absorbed when the oxygen concentration of the exhaust flowing in is low, and an NOx catalyst provided in the bypass path and adapted to remove the nitrogen oxides (NOx) when the air-fuel ratio of the exhaust is lean.

Normally, when purifying the exhaust discharged from an internal combustion engine and, in particular, when purifying the nitrogen oxides (NOx) contained in the exhaust, the exhaust flow switching means is controlled such that the exhaust discharged from the internal combustion engine passes through the NOx absorbing material. In this case, although no exhaust ought to flow through the bypass path. However, when the sealing property of the exhaust flow switching means is not perfect, a minute amount of exhaust is allowed to leak to the bypass path through the exhaust flow switching means.

In contrast, in the exhaust emission purifying device for an internal combustion engine of the present invention, the minute amount of exhaust leaking to the bypass path passes through the NOx catalyst provided in the bypass path at a very low spatial velocity (hereinafter, spatial velocity will be abbreviated as SV), so that the nitrogen oxides (NOx) contained in the exhaust leaking to the bypass path is efficiently purified by the NOx catalyst.

As a result, in the exhaust emission purifying device for an internal combustion engine of the present invention, even if some exhaust is allowed to flow through the bypass path when no exhaust should flow through the bypass path, the exhaust flowing through the by pass path can be released to the atmosphere after being purified, so that it is advantageously possible to achieve an improvement in reliability in exhaust emission control.

Further, in the exhaust emission purifying device for an internal combustion engine of the present invention, there is provided in the exhaust passage on the upstream side of the exhaust flow switching means an SOx absorbing material adapted to absorb SOx when the air-fuel ratio of the exhaust is lean and to release the SOx it has absorbed when the oxygen concentration of the exhaust flowing in is low, so that the SOx in the exhaust is absorbed by the SOx absorbing material before the exhaust flows to the NOx absorbing material, whereby there is no danger of the NOx absorbing material undergoing SOx poisoning.

In the exhaust emission purifying device for an internal combustion engine of the present invention, examples of an internal combustion engine capable of lean burning include an in-cylinder injection type lean burn gasoline engine and a diesel engine. In the case of a lean burn gasoline engine, the air-fuel ratio of the exhaust can be controlled by controlling the air-fuel ratio of the air-fuel mixture supplied to the combustion chamber. In the case of a diesel engine, the air-fuel ratio of the exhaust can be controlled by performing a secondary fuel injection during intake stroke, expansion stroke, or exhaust stroke, or by supplying a reducing agent to the exhaust passage on the upstream side of the NOx absorbing material. Here, the air-fuel ratio of the exhaust is the ratio of the air to the fuel (hydrocarbon) supplied to the engine intake passage and to the portion of the exhaust passage on the upstream side of the NOx absorbing member.

In the exhaust emission purifying device for an internal combustion engine of the present invention, examples of the NOx absorbing material include an occlusion reduction type NOx catalyst. The occlusion reduction type NOx catalyst is a catalyst which absorbs the nitrogen oxides (NOx) in the exhaust when the air-fuel ratio of the exhaust flowing in is lean, and reduces the nitrogen oxides (NOx) it has absorbed to nitrogen ($N_2$) while releasing the nitrogen oxides when the oxygen concentration of the exhaust flowing in is low.

Examples of an occlusion reduction type NOx catalyst include a catalyst comprising an alumina carrier which carries thereon at least one of the following metals: alkali metals, such as potassium K, sodium Na, lithium Li, and cesium Cs; alkali earth metals, such as barium Ba and calcium Ca; and rare earth metals, such as lanthanum La and yttrium Y, together with a noble metal, such as platinum Pt.

In the exhaust emission purifying device for an internal combustion engine of the present invention, the exhaust flow switching means may be formed by a single switching valve provided in the branching portion of the bypass path, or by providing a first opening/closing valve in the exhaust passage at a position nearer to the NOx absorbing material than to the branching portion and a second opening/closing valve in the bypass path.

In the exhaust emission purifying device for an internal combustion engine of the present invention, examples of the SOx absorbing material include a material comprising a carrier consisting alumina and carrying thereon at least one of the following metals: transition metals such as copper Cu, iron Fe, manganese Mn, and nickel Ni; and sodium Na; titanium Ti; and lithium Li. In order that the SOx may be easily absorbed by the SOx absorbing material in the form of sulphate ions $SO_4^{2-}$, it is desirable that one of platinum Pt, palladium Pd, and rhodium Rh be carried on the carrier of the SOx absorbing material.

In the exhaust emission purifying device for an internal combustion engine of the present invention, examples of the NOx catalyst provided in the bypass path include a selective reduction type NOx catalyst which reduces or decomposes the nitrogen oxides (NOx) when hydrocarbon exists in an atmosphere with excessive oxygen. The selective reduction type NOx catalyst generally exhibits its characteristics of providing a high NOx purification ratio even with respect to a small amount of hydrocarbon (HC) when the exhaust flows at a low SV, and is capable of purifying hydrocarbon (HC) or nitrogen oxides at a purifying ratio of 70 to 80%.

Thus, in the case in which the exhaust flow switching means is controlled such that the exhaust emitted from the internal combustion engine flows through the NOx absorbing material, when a minute amount of exhaust leaks to the bypass path from the exhaust flow switching means, the minute amount of exhaust flows through the NOx catalyst at a low SV so that the nitrogen oxides (NOx), hydrocarbon (HC), etc. contained in the exhaust are efficiently purified. Examples of the selective reduction type NOx catalyst include a catalyst comprising a zeolite carrier carrying platinum (Pt) thereon.

The NOx catalyst provided in the bypass path may be an occlusion reduction type NOx catalyst which absorbs nitrogen oxides (NOx) when the air-fuel ratio of the exhaust flowing in is lean and which reduces and purifies the nitrogen oxides (NOx) it has absorbed while releasing the same when the oxygen concentration of the exhaust flowing in is reduced and there exists a reducing agent such as hydrocarbon (HC).

Examples of the occlusion reduction type NOx catalyst include a catalyst comprising the alumina carrier which carries thereon at least one of the following metals: alkali metals, such as potassium K, sodium Na, lithium Li, and cesium Cs; alkali earth metals, such as barium Ba and calcium Ca; and rare earth metals, such as lanthanum La and yttrium Y; together with a noble metal, such as platinum Pt.

In the exhaust emission purifying device for an internal combustion engine of the present invention, it is desirable that the exhaust flow switching means be controlled so as to permit the exhaust to flow to the NOx absorbing material and to inhibit the exhaust to flow to the bypass path when the air-fuel ratio is controlled to be lean, and to permit the exhaust to flow to the bypass path and inhibit the exhaust to flow to the NOx absorbing material when the air-fuel ratio is controlled to be stoichiometric or rich.

When the air-fuel ratio of the exhaust is controlled to be lean, sulfur oxides (SOx) contained in the exhaust are absorbed by the SOx absorbing material, and the exhaust from which the sulfur oxides (SOx) have been removed flows through the NOx absorbing material, so that only the nitrogen oxides (NOx) in the exhaust are absorbed by the NOx absorbing material, and it is possible to reliably prevent occurrence of so-called SOx poisoning, in which sulfur oxides (SOx) are absorbed by the NOx absorbing material.

On the other hand, when the air-fuel ratio of the exhaust is controlled to be stoichiometric or rich, the exhaust passed through the SOx absorbing material is discharged by way of the bypass path, and no exhaust is allowed to flow through the NOx absorbing material, so that, even if sulfur oxides (SOx) are released from the SOx absorbing material, the sulfur oxides (SOx) released from the SOx absorbing material do not flow into the NOx absorbing material, and there is no danger of the NOx absorbing material undergoing SOx poisoning. Since the exhaust having the air-fuel ratio of stoichiometric or rich flows through the NOx catalyst in the bypass path, the sulfuroxides (SOx) adsorbed by the NOx catalyst are released to become $SO_2$.

Here, the expression: "when the air-fuel ratio of the exhaust is controlled to be stoichiometric or rich" is of course the concept which covers the case in which the air-fuel ratio of the exhaust is controlled to be stoichiometric or rich in order to perform the regeneration processing on the SOx absorbing material, but also covers the case in which the air-fuel ratio of the exhaust becomes stoichiometric or rich as a result of the air-fuel ratio of the air-fuel mixture being controlled to be stoichiometric or rich according to the operating condition of the engine.

Examples of the engine operating condition in which the air-fuel ratio of the air-fuel mixture is stoichiometric or rich include high-load operating condition, a full-load operating condition, and warming up operation after engine startup.

In the exhaust emission purifying device for an internal combustion engine of the present invention, the NOx catalyst provided in the bypass path may have a 3-way purifying function and an HC adsorption capacity at a low temperature. In this case, it is desirable for the exhaust flow switching means to be controlled such that when the temperature of the exhaust is less than a predetermined temperature, the exhaust is led to the bypass path and is prevented from flowing into the NOx absorbing material, and that when the temperature of the exhaust is higher than the predetermined temperature, the exhaust is led to the NOx absorbing material and is prevented from passing through the bypass path.

When the temperature of the exhaust is less than the predetermined temperature, the NOx absorbing material is not activated yet, so that it is impossible to sufficiently purified the exhaust at this temperature by passing it through the NOx absorbing material. In the exhaust emission purifying device of the present invention, when the exhaust temperature is less than the predetermined temperature, the exhaust is caused to flow through the bypass path, whereby the hydrocarbon (HC) in the exhaust is adsorbed by the NOx catalyst.

As a result, when the internal combustion engine is started at a low temperature, the exhaust is advantageously released to the atmosphere after being purified.

On the other hand, when the temperature of the exhaust has been raised to a level higher than the predetermined temperature, the NOx absorbing material is activated, and can exert the purifying capacity, so that the exhaust flow switching means is controlled such that the exhaust is led to the NOx absorbing material and that the exhaust is prevented from flowing through the bypass path.

At this time, if the sealing property of the exhaust flow switching means is not perfect, a minute amount of exhaust leaks from the exhaust flow switching means to the bypass path. However, since the amount of exhaust leaking from the exhaust flow switching means to the bypass path is relatively small, the minute amount of exhaust flows through the NOx catalyst provided in the bypass path at a low SV.

When the exhaust flows through the NOx catalyst at a low SV, the reaction of the nitrogen oxides (NOx) contained in the exhaust with the hydrocarbon (HC) adsorbed by the NOx catalyst is promoted, so that the nitrogen oxides (NOx) in the exhaust are effectively purified, and an improvement is achieved in terms of exhaust emission purification. Further, as stated above, the hydrocarbon (HC) adsorbed by the NOx catalyst is consumed as the reducing agent for the nitrogen oxides (NOx), and in addition, it reacts with the oxygen contained in the exhaust to be thereby purified, so that the exhaust emission purification is further improved.

In the exhaust emission purifying device for an internal combustion engine of the present invention, when the internal combustion engine is an in-cylinder injection type internal combustion engine provided with a fuel injection valve for directly injecting fuel into the combustion chamber of the internal combustion engine, and the SOx absorbing material has a 3-way purifying function, the exhaust flow switching means may be controlled at the startup of the internal combustion engine so as to throttle the exhaust flow amount passing through the NOx absorbing material and the NOx catalyst and as to cause the fuel injection valve to perform a secondary fuel injection during the expansion stroke of each cylinder in addition to the injection of the fuel for combustion.

When, at the startup of the internal combustion engine, the exhaust flow passing through the NOx absorbing material and the NOx catalyst is throttled, the back pressure acting on the internal combustion engine rises to cause the temperature of the exhaust to rise. When, in this condition, the fuel is injected secondarily from the fuel injection valve during the expansion stroke of each cylinder, the reaction of the injected fuel with the oxygen in the exhaust is promoted. When the reaction of the fuel with the oxygen is promoted, the quantity of heat generated at the time of the reaction of the fuel and oxygen increases, and the exhaust temperature rises. When the exhaust, which has thus attained high temperature, flows into the SOx absorbing material, the heat of the exhaust is transmitted to the SOx absorbing material, and the temperature of the SOx absorbing material rises abruptly, with the result that the 3-way purifying function of the SOx absorbing material is activated at an early stage. As a result, it is possible to improve the exhaust emission purification when the internal combustion engine is started at a low temperature.

In the exhaust emission purifying device for an internal combustion engine of the present invention, it is also possible to further provide a temperature rise restraining means which controls the exhaust flow switching means such that the exhaust flows through both the NOx absorbing material and the NOx catalyst when the temperature of the NOx absorbing material becomes higher than a predetermined temperature when the exhaust flow switching means is being controlled such that the exhaust is led to the NOx absorbing material and the exhaust is prevented from flowing into the NOx catalyst.

The NOx absorbing material has such characteristics that, when it is in a predetermined temperature range, efficiently absorbs the nitrogen oxides (NOx), so that when the exhaust temperature becomes higher than a predetermined temperature when the entire amount of exhaust is flowing through the NOx absorbing material, the temperature of the NOx absorbing material exceeds the activation temperature range, with the result that it becomes difficult for the NOx absorbing material to absorb nitrogen oxides (NOx). In view of this, the temperature rise restraining means so controls the exhaust flow switching means that the exhaust flows through both the NOx absorbing material and the NOx catalyst.

In this case, the amount of exhaust flowing through the NOx absorbing material is reduced by half as compared with the case in which the entire amount of exhaust flows through the NOx absorbing material, so that the quantity of heat the NOx absorbing material receives from the exhaust is also reduced by half, and there is no excessive temperature rise of the NOx absorbing material, with its temperature being kept within the activation temperature range.

When the entire amount of exhaust is flowing through the NOx absorbing material, the air-fuel ratio of the exhaust is controlled to be lean, so that it is preferable that the NOx catalyst is one which functions to purify the NOx in the exhaust when the air-fuel ratio of the exhaust is lean. Examples of such a NOx catalyst include an occlusion reduction type NOx catalyst.

The temperature rise restraining means may be one which executes the SOx poisoning regeneration processing on the NOx catalyst immediately before controlling the exhaust flow switching means to cause the exhaust to flow through both the NOx absorbing material and the NOx catalyst.

In the exhaust emission purifying device for an internal combustion engine of the present invention, when the air-fuel ratio of the exhaust is being controlled to be stoichiometric or rich, the exhaust flow switching means is controlled such that the entire amount of the exhaust flows through the NOx catalyst, so that, in this process, it is assumed that the sulfur oxides (SOx) released from the SOx absorbing material is adsorbed by the NOx catalyst to thereby cause SOx poisoning. At the same time, when the exhaust flows through both the NOx absorbing material and the NOx catalyst in the condition in which the NOx catalyst has undergone SOx poisoning, it is assumed that the NOx purifying ratio of the NOx catalyst will be reduced.

In the exhaust emission purifying device for an internal combustion engine of the present invention, the exhaust flow switching means may be controlled such that when the internal combustion engine is performing warming-up operation, the exhaust is led to the NOx catalyst and that the exhaust is prevented from flowing into the NOx absorbing material, switching being performed such that after the completion of the warming up of the internal combustion engine, the exhaust is led to the NOx absorbing material and is prevented from flowing into the NOx catalyst at the time when the NOx exhaust amount from the internal combustion engine has become less than the predetermined amount.

When the internal combustion engine is the warming up state, the air-fuel ratio of the exhaust is controlled to be stoichiometric or rich, so that the exhaust flow switching means is controlled so as to cause the entire amount of exhaust to flow through the NOx catalyst to prevent the sulfur oxides (SOx) released from the SOx absorbing material from flowing into the NOx absorbing material. Thus, no exhaust flows through the NOx absorbing material until the warming up of the internal combustion engine is completed and the operating condition of the internal combustion engine has been switched to the lean air-fuel ratio operation, and the NOx absorbing material is expected to be in the non-activated state even after the completion of the warming up of the internal combustion engine. In such a case, when the exhaust flow switching means is controlled such that the entire amount of exhaust flows through the NOx absorbing material, the nitrogen oxides (NOx) in the exhaust are not purified by the NOx absorbing material, and there is the danger of deteriorating the exhaust emission purification.

In contrast, in the exhaust emission purifying device for an internal combustion engine of the present invention, when, after the completion of the warming up of the internal combustion engine, the amount of nitrogen oxides (NOx)

discharged from the internal combustion engine becomes less than the predetermined amount, the exhaust flow switching means is switched from the state in which the entire amount of exhaust flows through the NOx catalyst to the state in which the entire amount of exhaust flows through the NOx absorbing material.

In this case, after the completion of the warming up of the internal combustion engine, the exhaust gas flows into an NOx absorbing material in the non-activated state, so that the temperature of the NOx absorbing material rises due to the heat of the exhaust. In this process, the exhaust flows through the NOx absorbing material in the non-activated state, but, since the amount of nitrogen oxides (NOx) contained in the exhaust is very small, it is possible to raise the temperature of the NOx absorbing material while restraining the deterioration in exhaust emission to a minimum.

The amount of nitrogen oxides (NOx) discharged from the internal combustion engine becomes less than the predetermined amount when, for example, the vehicle on which the internal combustion engine is mounted is running at decelerated speed, or when the load of the internal combustion engine becomes less than a predetermined value, and, in this regard, the so-called fuel cut condition is preferable, in which the fuel injection is stopped in the internal combustion engine.

Further, while, at the time of warming up of the internal combustion engine, the air-fuel ratio of the exhaust is being controlled to be stoichiometric or rich, the exhaust flow switching means may be controlled such that the exhaust is led to the Nox catalyst and that the exhaust is prevented from flowing into the NOx absorbing material, and while, at the warming up of the internal combustion engine, the amount of NOx discharged from the internal combustion engine is less than the predetermined amount, it may be controlled such that the exhaust is led to the NOx absorbing material and that the exhaust is prevented from flowing into the NOx catalyst.

In this case, it is possible to activate the NOx absorbing material while restraining the deterioration of exhaust emission at the time of warming up of the internal combustion engine. As a result, it is possible to improve the exhaust emission when the exhaust starts to flow through the NOx absorbing material after the completion of the warming up of the internal combustion engine.

In the exhaust emission purifying device for an internal combustion engine of the present invention, when SOx poisoning of at least one of the NOx absorbing material and the NOx catalyst is detected, it is possible to control the exhaust flow switching means to such that the exhaust flows through both the NOx absorbing material and the NOx catalyst, and to further provide an SOx poisoning regeneration means for simultaneously executing a SOx poisoning regeneration processing on the NOx absorbing material and the NOx catalyst.

When simultaneously performing the SOx poisoning regeneration on the NOx absorbing material and the NOx catalyst, the frequency of execution of the SOx poisoning regeneration processing is reduced as compared with the case in which the SOx poisoning regeneration is individually and separately performed on the NOx absorbing material and the NOx catalyst. In the SOx poisoning regeneration processing, it is necessary to raise the temperature of the NOx absorbing material and the NOx catalyst to a relatively high temperature range, so that the fuel is burnt in the NOx absorbing material and the NOx catalyst. Thus, when the frequency of execution of the SOx poisoning regeneration processing is reduced, the fuel consumption amount related to the SOx poisoning regeneration processing is reduced. Further, when in the SOx poisoning regeneration processing the exhaust flows through both the NOx absorbing material and the NOx catalyst, the SV of the exhaust in the NOx absorbing material and the NOx catalyst is reduced, whereby the SOx purification ratio is improved.

In the exhaust emission purifying device for an internal combustion engine of the present invention, it is also possible to provide, in addition to the SOx poisoning regeneration processing means, are generation completion determination means for determining the SOx poisoning regeneration completion of the NOx absorbing material and the NOx catalyst. In this case, when it is determined by the regeneration completion determination means that the SOx poisoning regeneration of one of the NOx absorbing material and the NOx catalyst has been completed, the SOx poisoning regeneration means may control the exhaust flow switching means so as to prevent the exhaust from flowing to the substance on which the SOx poisoning regeneration has been completed.

The reason for this control is that, when the exhaust is continued to be supplied to the NOx absorbing material or the NOx catalyst on which SOx poisoning regeneration processing has been completed, the fuel component contained in the exhaust is burnt in the NOx absorbing material or the NOx catalyst to cause an unnecessary rise in the temperature of the NOx absorbing material or the NOx catalyst, thereby causing a heat deterioration in the NOx absorbing material or the NOx catalyst.

Further, when it is determined by the regeneration completion determination means that the SOx poisoning regeneration of one of the NOx absorbing material and the NOx catalyst has been completed, the SOx poisoning regeneration means may interrupt the SOx poisoning regeneration processing and cool the one on which the SOx poisoning regeneration has been completed, resuming the SOx poisoning regeneration processing solely on the one on which the SOx poisoning regeneration has not been completed yet after the completion of the cooling of the one on which the SOx poisoning regeneration has been completed.

In this case, the NOx absorbing material or the NOx catalyst on which the SOx poisoning regeneration has been completed is not left at a high temperature, whereby it is possible to further improve the durability of the NOx absorbing material and the NOx catalyst.

Next, in the exhaust emission purifying device for an internal combustion engine of the present invention, when the NOx catalyst consists of an occlusion reduction type NOx catalyst, it is possible to further provide an NOx absorption amount detection means for detecting the amount of nitrogen oxides (NOx) absorbed by the NOx absorbing material and the amount of nitrogen oxides (NOx) absorbed by the NOx catalyst.

When the NOx catalyst consists of an occlusion reduction type NOx catalyst, NOx are absorbed by the NOx catalyst on the same principle as that of the NOx absorbing material, so that it is necessary to release and purify the nitrogen oxides (NOx) absorbed by the NOx catalyst before the nitrogenoxide (NOx) absorbing capacity of the NOx catalyst is saturated. In view of this, in the exhaust emission purifying device of the present invention, there is provided an NOx absorption amount detection means capable of detecting the amount of nitrogen oxides (NOx) absorbed by the NOx catalyst in addition to the amount of nitrogen oxides (NOx) absorbed by the NOx absorbing material.

It is preferable that the NOx absorption amount detection means estimates the amount of nitrogen oxides (NOx) absorbed by each of the NOx absorbing material and the NOx catalyst on the basis of the amount of exhaust leaking from the exhaust flow switching means. In this case, it is possible to estimate the absorption amounts of nitrogen oxides (NOx) of the NOx absorbing material and the NOx catalyst with high accuracy, whereby it is possible to accurately set the execution time for releasing and purifying the nitrogen oxides (NOx).

In the exhaust emission purifying device for an internal combustion engine of the present invention, when it is necessary to control the exhaust flow switching means such that the exhaust flows through both the NOx absorbing material and the NOx catalyst, it is possible to further provide an NOx purifying means for controlling the exhaust flow switching means such that the exhaust flows through both the NOx absorbing material and the NOx catalyst after all the nitrogen oxides (NOx) absorbed by the NOx absorbing material and the NOx catalyst have been released and purified.

This means is provided for the case in which the NOx absorbing capacity of the NOx absorbing material is the same as the NOx absorbing capacity of the NOx catalyst. In this case, the nitrogen oxide (NOx) absorption amount of the NOx absorbing material and the nitrogen oxide (NOx) absorption amount of the NOx catalyst are set to zero before the exhaust flows through both the NOx absorbing material and the NOx catalyst, so that the time when the nitrogen oxide (NOx) absorbing capacity of the NOx absorbing material is saturated is the same as the time when the nitrogen oxide (NOx) absorbing capacity of the NOx catalyst is saturated. As a result, the nitrogen oxide (NOx) releasing/purifying processing for the NOx absorbing material is performed at the same time as the nitrogen oxide (NOx) releasing/purifying processing for the NOx catalyst, with the result that the execution frequency of the nitrogen oxide (NOx) releasing/purifying processing decreases, whereby it is possible to reduce the fuel consumption amount related to the NOx releasing/purifying processing.

On the other hand, when the nitrogen oxide (NOx) absorbing cap capacity of the NOx absorbing material is different from the nitrogen oxide (NOx) absorbing capacity of the NOx catalyst, all the nitrogen oxides (NOx) absorbed by the NOx absorbing material and the NOx catalyst are released and purified before the exhaust flow switching means is controlled such that the exhaust flows through both the NOx absorbing material and the NOx catalyst. And, when the exhaust flow switching means is controlled such that the exhaust flows through both the NOx absorbing material and the NOx catalyst, the NOx purifying means simultaneously releases and purifies the nitrogen oxides (NOx) absorbed by the NOx absorbing material and the nitrogen oxides (NOx) absorbed by the NOx catalyst, using, of the NOx absorbing material and the NOx catalyst, the one whose NOx absorbing capacity is less as a reference.

The exhaust emission purifying device for an internal combustion engine of the present invention is arranged in the exhaust passage of a lean-burn type internal combustion engine, and may comprise an NOx absorbing material which absorbs nitrogen oxides (NOx) when the air-fuel ratio of the exhaust flowing-in is lean and which releases the nitrogen oxides (NOx) it has absorbed when the oxygen concentration of the exhaust flowing-in is low, a bypass path branching off from the exhaust passage on the upstream side of the NOx absorbing material and allowing the exhaust to flow so as to bypass the NOx absorbing material, an exhaust flow switching means selectively switching the exhaust flow between the NOx absorbing material and the bypass path, an SOx absorbing material arranged in the exhaust passage on the upstream side of the exhaust flow switching means and adapted to absorb sulfur oxides (SOx) when the air-fuel ratio of the exhaust flowing-in is lean and to release the sulfur oxides (SOx) it has absorbed when the oxygen concentration of the exhaust flowing-in is low, and a NOx catalyst provided in the exhaust passage on the downstream side of the bypass path and adapted to purify the nitrogen oxides (NOx) when the air-fuel ratio of the exhaust is lean.

BRIEF DESCRIPTION OF THE DRAWINGS

FIG. 4 is a diagram illustrating the NOx absorbing/releasing action of an occlusion reduction type NOx catalyst;

BEST MODE FOR CARRYING OUT THE INVENTION

Embodiments of the exhaust emission purifying device for an internal combustion engine according to the present invention will now be described with reference to FIGS. 1 through 19.

First Embodiment

Figure 1:
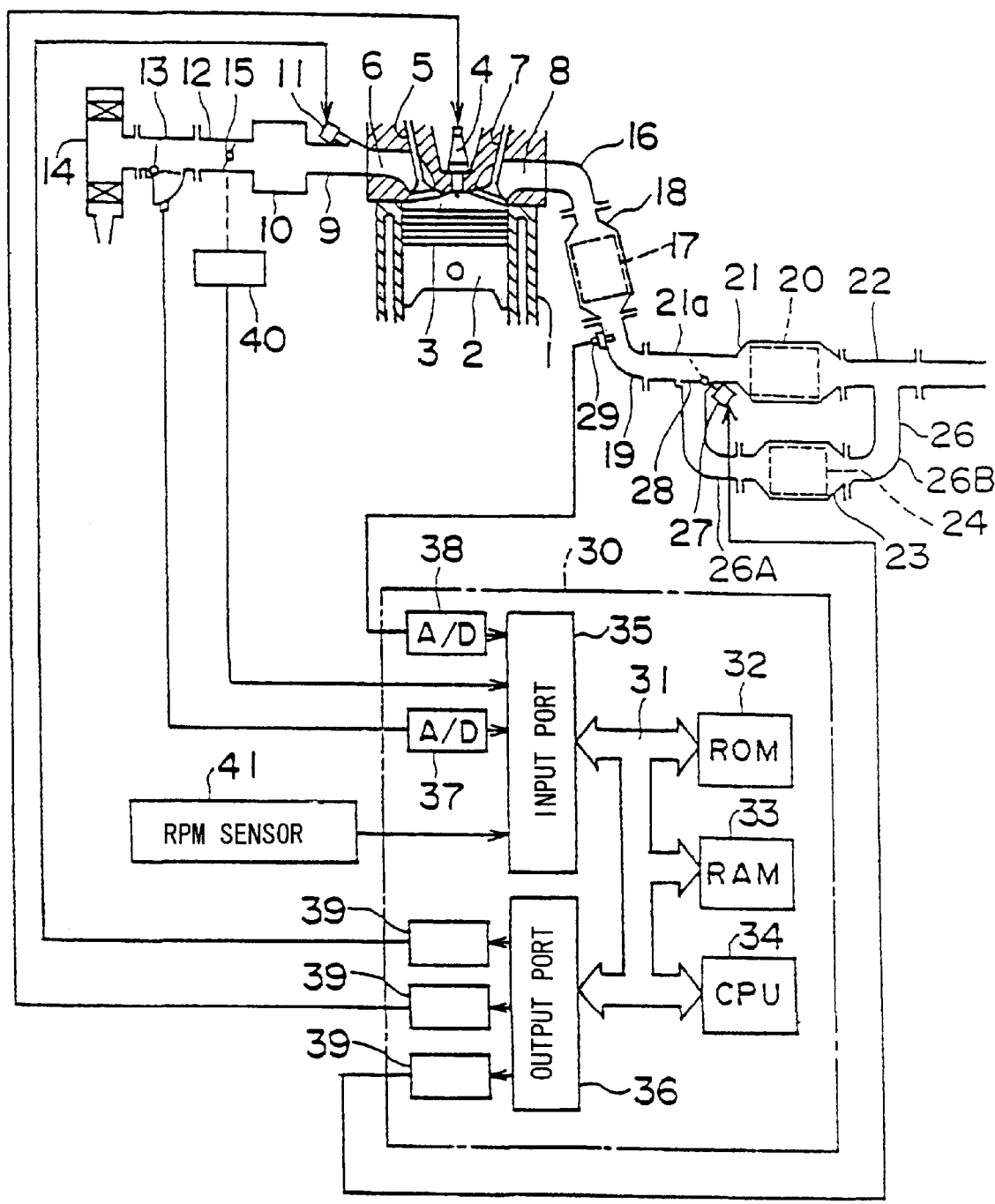
FIG. 1 is a schematic diagram showing the construction of a first embodiment of an exhaust emission purifying device for an internal combustion engine of the present invention.

FIG. 1 is a diagram schematically showing the construction of the present invention when it is applied to a vehicle gasoline engine capable of lean-burn combustion. In the drawing, numeral 1 indicates an internal combustion engine main body, numeral 2 indicates a piston, numeral 3 indicates a combustion chamber, numeral 4 indicates a sparking plug, numeral 5 indicates an intake valve, numeral 6 indicates an intake port, numeral 7 indicates an exhaust valve, and numeral 8 indicates an exhaust port.

The intake port 6 is connected to a surge tank 10 through each branch pipe of an intake manifold 9, and a fuel injection valve 11 for injecting the fuel to the intake port 6 is mounted to each branch pipe of the intake manifold 9. The surge tank 10 is connected to an air cleaner 14 through an intake duct 12 and an airflow meter 13, and a throttle valve 15 is arranged in the intake duct 12.

On the other hand, the exhaust port 8 is connected to a casing 18 containing an SOx absorbing material 17 through an exhaust manifold 16, and the outlet portion of the casing 18 is connected to a casing 21 containing an occlusion reduction type NOx catalyst (NOx absorbing material) 20 through an exhaust pipe 19. In the following, this occlusion reduction type NOx catalyst 20 will be referred to as the main NOx catalyst 20. The casing 21 is connected to an unillustrated muffler through an exhaust pipe 22.

An inlet pipe portion 21a of the casing 21 and the exhaust pipe 22 are also connected by a bypass path 26 bypassing the main NOx catalyst 20. The bypass path 26 is formed by a bypass pipe 26A connected to the inlet pipe portion 21a of the casing 21, a bypass pipe 26B connected to the exhaust pipe 22, and a casing 23 placed between the bypass pipes 26A and 26B, and a selective reduction type NOx catalyst 24 is accommodated in the casing 23. In the following, this selective reduction type NOx catalyst 24 will be referred to as the sub NOx catalyst 24. In this embodiment, the sub NOx catalyst 24 consists of platinum (Pt) carried by zeolite, and exerts sufficient 3-way purifying function when the air-fuel ratio of the exhaust flowing-in is stoichiometric.

Provided in the inlet pipe portion 21a of the casing 21, which is a branching portion of the bypass pipe 26A, is an exhaust switching valve (exhaust flow switching means) 28 whose valve body is operated by an actuator 27. This exhaust switching valve 28 is operated by the actuator 27 to select between a bypass-closed position in which the inlet portion of the bypass pipe 26A is closed as indicated by the solid line of FIG. 1 and in which the inlet pipe portion 21a of the casing 21 is fully open, and a bypass-open position in which the inlet pipe portion 21a of the casing 21 is closed as indicated by the broken line of FIG. 1 and in which the inlet portion of the bypass pipe 26A is fully open.

An electronic control unit (ECU) 30 for controlling the engine comprises a digital computer, and is provided with a ROM (read only memory) 32, a RAM (random access memory) 33, a CPU (central processor unit) 34, an input port 35, and an output port 36, which are connected to each other by a bidirectional bus 31. The airflow meter 13 generates an output voltage in proportion to the intake air amount, and this output voltage is input into an input port 35 through a corresponding A/D converter 38. Further, mounted to the throttle valve 15 is an idle switch 40 for detecting that the throttle valve 15 is at an idling opening degree, and an output signal of this idle switch 40 is input into the input port 35.

On the other hand, in the exhaust pipe 19 on the downstream side of the SOx absorbing material 17, there is mounted a temperature sensor 29 for generating an output voltage in proportion to the temperature of the exhaust which has passed the SOx absorbing material 17, and the output voltage of this temperature sensor 29 is input into the input port 35 through the A/D converter 38. Further, connected to the input port 35 is an RPM sensor 41 adapted to generate an output pulse indicating the engine RPM. The output port 36 is connected to the sparking plug 4, the fuel injection valve 11, and the actuator 27 through corresponding driving circuits 39.

In this internal combustion engine 1, the fuel injection time TAU is calculated based, for example, on the following equation:

$$TAU = TP \cdot K$$

Figure 2:
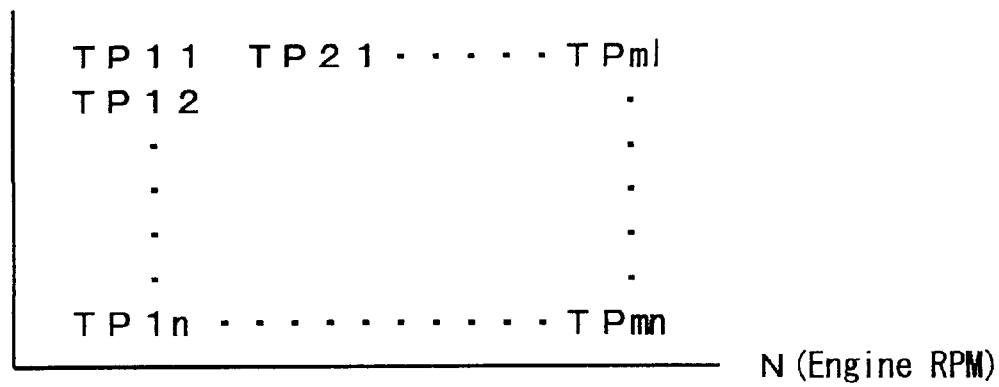
FIG. 2 is a diagram showing an example of the basic fuel injection time map.

Here, TP represents the basic fuel injection time, and K represents a correction coefficient. The basic fuel injection time TP indicates the required fuel injection time for making the air-fuel ratio of the air-fuel mixture supplied to the cylinder of the internal combustion engine 1 stoichiometric. This basic fuel injection time TP is obtained in advance by experiment, and is stored in advance in the ROM 32 in the form of a map as shown in FIG. 2 as a function of the engine load Q/N (intake-air-amount Q/engine-RPM N) and the engine RPM N.

The correction coefficient K is a coefficient for controlling the air-fuel ratio of the air-fuel mixture supplied to the cylinder of the internal combustion engine 1. When K=1.0, the air-fuel ratio of the air-fuel mixture supplied to the cylinder is stoichiometric. On the other hand, when K<1.0, the air-fuel ratio of the air-fuel mixture supplied to the cylinder is higher than the stoichiometric ratio, that is, lean, and when K>1.0, the air-fuel ratio of the air-fuel mixture supplied to the cylinder is less than the stoichiometric ratio, that is, rich.

In this embodiment, when the engine operating condition is in a low-middle load operating range, the value of the correction coefficient K is smaller than 1.0, and the internal combustion engine 1 is operated at a lean air-fuel ratio. When the engine operating condition is in a high-load operating range, when the engine operating condition is in a warming-up operating range after startup, when the engine operating condition is in an accelerating operation range, and when the internal combustion engine is in such an engine operating condition that the vehicle in which the internal combustion engine 1 is mounted makes a normal run at a predetermined speed (for example, higher than 120 km/h) (normal operating condition), the value of the correction coefficient K is 1.0, and the internal combustion engine is operated at the stoichiometric air-fuel ratio. When the engine operating condition is in the full-load operating range, the value of the correction coefficient K is larger than 1.0, and the internal combustion engine 1 is operated at a rich air-fuel ratio.

In the following, the control operation for controlling the fuel injection amount so as to operate the internal combustion engine 1 at a lean air-fuel ratio is referred to as the lean air-fuel ratio control; the control operation for controlling the fuel injection amount so as to operate the internal combustion engine 1 at a stoichiometric air-fuel ratio is referred to as the stoichiometric control; and the control operation for controlling the fuel injection amount so as to operate the internal combustion engine 1 at a rich air-fuel ratio is referred to as the rich air-fuel ratio control.

Normally, in a gasoline engine like the internal combustion engine 1, the low-middle load operation is performed at the highest frequency, so that in the major part of the operation period, the value of the correction coefficient K is smaller than 1.0, and a air-fuel mixture having the lean air-fuel ratio is burnt.

Figure 3:
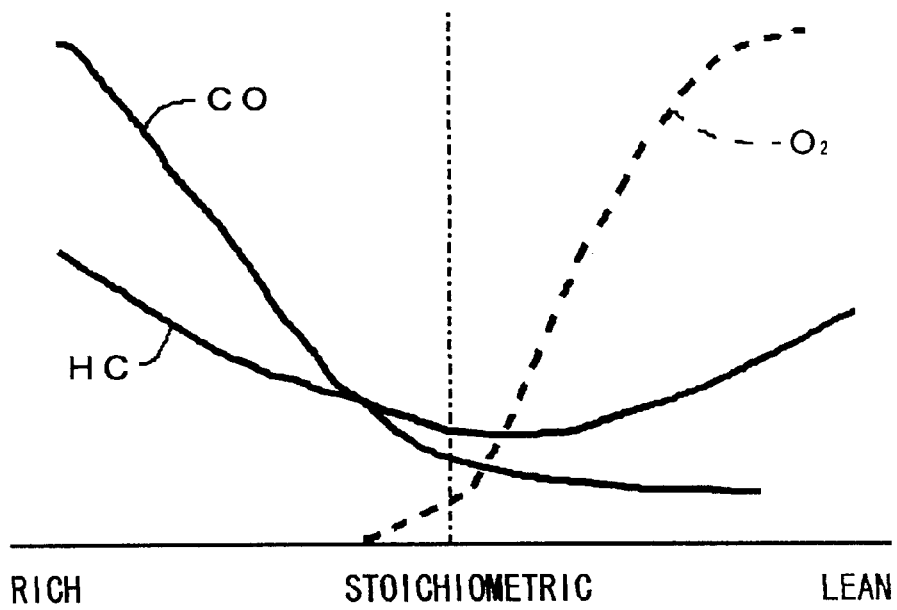
FIG. 3 is a chart schematically showing the concentrations of the unburned HC, CO and oxygen in the exhaust discharged from the internal combustion engine.

FIG. 3 schematically shows the concentrations of the main components of the exhaust discharged from the combustion chamber 3. As can be seen from this diagram, the lower the air-fuel ratio of the air-fuel mixture supplied to the combustion chamber 3 (i.e., the richer the air-fuel mixture), the higher the concentrations of the unburned HC and CO in the exhaust discharged from the combustion chamber 3, and the higher the air-fuel ratio of the air-fuel mixture supplied to the combustion chamber 3 (i.e., the leaner the air-fuel mixture), the higher the concentration of the oxygen $O_2$ in the exhaust discharged from the combustion chamber 3.

The main NOx catalyst 20 accommodated in the casing 21 comprises, for example, alumina, as the carrier, which carries thereon at least one of the following metals: alkali metals, such as potassium K, sodium Na, lithium Li, and cesium Cs; alkali earth metals, such as barium Ba and calcium Ca; and rare earth metals, such as lanthanum La and yttrium Y, together with a noble metal such as platinum Pt. The ratio of the air to the fuel (hydrocarbon) supplied to the intake passage of the internal combustion engine 1 and the exhaust passage on the upstream side of the main NOx catalyst 20 will be referred to as the air-fuel ratio of the exhaust flowing into the main NOx catalyst 20 (hereinafter abbreviated as the exhaust air-fuel ratio) Then, this main NOx catalyst 20 absorbs NOx when the exhaust air-fuel ratio is lean, and releases the NOx it has absorbed when the oxygen concentration of the exhaust flowing-in is low.

When fuel (hydrocarbon) or air is not supplied to the exhaust passage on the upstream side of the main NOx catalyst 20, the exhaust air-fuel ratio coincides with the air-fuel ratio of the air-fuel mixture supplied to the combustion chamber 3. Thus, in this case, the main NOx catalyst 20 absorbs NOx when the air-fuel ratio of the air-fuel mixture supplied to the combustion chamber 3 is lean, and releases the NOx it has absorbed when the oxygen concentration of the air-fuel mixture supplied to the combustion chamber 3 is reduced.

When the above-described main NOx catalyst 20 is arranged in the exhaust passage of the internal combustion engine 1, this main NOx catalyst 20 actually performs absorption and releasing of NOx. The mechanism of the absorption and releasing is to be regarded as shown in FIG. 4. In the following, this mechanism will be described with reference to the case, as an example, in which platinum Pt and barium Ba are carried on the carrier. The mechanism is the same if some other noble metal and some other alkali metal, alkali earth metal, or rare earth metal are used.

First, when the exhaust flowing -in becomes leaner (i.e., when the air-fuel ratio becomes higher), the oxygen concentration of the exhaust flowing-in increases substantially, and, as shown in FIG. 4(A), the oxygen $O_2$ adheres to the surface of the platinum Pt in the form of $O_2^-$ or $O^{2-}$. On the other hand, the NO contained in the exhaust flowing-in reacts with the $O_2^-$ or $O^{2-}$ on the surface of the platinum Pt to become $NO_2$ ($2NO+O_2 \rightarrow 2NO_2$).

Next, part of the $NO_2$ produced is absorbed by the main NOx catalyst 20 while being oxidized on the platinum Pt, and, as shown in FIG. 4 (A), is diffused into the main NOx catalyst 20 in the form of nitrate ions $NO_3^-$ while being combined with barium oxide BaO. In this way, NOx is absorbed by the main NOx catalyst 20.

As long as the oxygen concentration of the exhaust flowing-in is high, $NO_2$ is produced on the surface of the platinum Pt, and, as long as the NOx absorbing capacity of the main NOx catalyst 20 is not saturated, $NO_2$ is absorbed by the main NOx catalyst 20 to produce nitrate ions $NO_3^-$.

On the other hand, when the oxygen concentration of the exhaust flowing-in is reduced and the amount of $NO_2$ generated is reduced, the reaction is reversed ($NO_3^- \rightarrow NO_2$), and the nitrate ions $NO_3^-$ in the main NOx catalyst 20 are released from the main NOx catalyst 20 in the form of $NO_2$ or NO. That is, when the oxygen concentration of the exhaust flowing-in is reduced, NOx is released from the main NOx catalyst 20. As shown in FIG. 3, when the degree of leanness of the exhaust flowing-in is low (i.e., when the air-fuel ratio is low), the oxygen concentration of the exhaust flowing-in is reduced, so that when the degree of leanness of the exhaust flowing-in is low, NOx is released from the main NOx catalyst 20.

On the other hand, when, at this time, the fuel injection amount of the internal combustion engine 1 undergoes stoichiometric control or rich air-fuel ratio control and the exhaust air-fuel ratio becomes stoichiometric or rich, a large amount of unburned HC and CO is discharged from the internal combustion engine 1 as shown in FIG. 3, and these unburned HC and CO react with the $O_2^-$ or $O^{2-}$ on the platinum Pt to be oxidized.

Further, when the exhaust air-fuel ratio becomes stoichiometric or rich, the oxygen concentration of the exhaust flowing-in is extremely reduced, so that $NO_2$ or NO is released from the main NOx catalyst 20, and this $NO_2$ or NO reacts with the unburned HC and CO to be thereby reduced to $N_2$ as shown in FIG. 4(B).

That is, the HC and CO in the exhaust flowing-in immediately react with the $O_2^-$ or $O^{2-}$ on the platinum Pt to be thereby oxidized, and even when the $O_2^-$ or $O^{2-}$ on the platinum Pt is consumed, if there still remains some of the HC and CO, the NOx released from the NOx catalyst and the NOx discharged from the internal combustion engine 1 are reduced to $N_2$ by the HC and CO.

In this way, when $NO_2$ or NO ceases to exist on the surface of the platinum Pt, $NO_2$ or NO is successively released from the main NOx catalyst 20 and further reduced to $N_2$. Thus, when the exhaust air-fuel ratio is made stoichiometric or rich, NOx is released from the main NOx catalyst 20 in a short time.

In this way, when the exhaust air-fuel ratio becomes lean, NOx is absorbed by the main NOx catalyst 20, and when the exhaust air-fuel ratio is made stoichiometric or rich, NOx is released from the main NOx catalyst 20 in a short time to be reduced to $N_2$. Thus, it is possible to prevent NOx from being discharged to the atmosphere.

As described above, in this embodiment, when the engine operating condition is in the full-load operating range, the air-fuel ratio of the air-fuel mixture supplied to the combustion chamber 3 is made rich; when the engine operating condition is in the high-load operating range, warming-up operating range after startup, acceleration operating range, and normal operating range at a speed higher than a predetermined speed, the air-fuel ratio of the air-fuel mixture supplied to the combustion chamber 3 is made stoichiometric; and when the engine operating condition is in the low-middle load operating range, the air-fuel ratio of the air-fuel mixture is made lean, so that, in the low-middle load operating range, the NOx in the exhaust is absorbed by the main NOx catalyst 20, and in the full-load operating range and high-load operating range, the NOx which has been absorbed by the main NOx catalyst 20 is released and reduced.

When the frequency of full-load operation or high-load operation is low, and the frequency of low-middle load operation is high, with its operation time being longer, the amount of NOx absorbed by the main NOx catalyst 20 is larger than the amount of NOx released from the NOx catalyst 20 and reduced, so that there is the danger of the NOx absorbing capacity of the main NOx catalyst 20 being saturated.

In view of this, in this embodiment, when the air-fuel mixture of lean air-fuel ratio is being burnt in the internal combustion engine 1, that is, when the engine operating condition is in the low-middle load operating range, a rich spike control is executed, in which the air-fuel ratio of the air-fuel mixture is controlled such that the air-fuel mixture of stoiometric or rich air-fuel ratio is burnt at a relatively short period in a spike-like manner (short time), effecting the releasing and reduction of NOx on a short periodic basis.

At this time, it is preferable that the NOx absorption amount of the main NOx catalyst 20 is monitored, and the rich spike control is executed at the time when the NOx absorption amount has reached a predetermined amount (the limit value of NOx amount that can be absorbed by the main NOx catalyst 20). In the following description, the control operation for the internal combustion engine 1 in which the exhaust air-fuel ratio (the air-fuel ratio of the air-fuel mixture in this embodiment) alternates at a relatively short period between "lean air-fuel ratio" and "spike-like stoiometric air-fuel ratio or rich air-fuel ratio" for the absorption and releasing of NOx by the main NOx catalyst 20, will be referred to as a lean/rich spike control. In the present application, the lean/rich spike control is included in the lean air-fuel ratio control.

On the other hand, sulfur (S) is contained in the fuel, and therefore, when the sulfur in the fuel burns, sulfur oxides (SOx), such as $SO_2$ and $SO_3$, are generated, and the main NOx catalyst 20 also absorbs these SOx in the exhaust. It is assumed that the SOx absorption mechanism of the main NOx catalyst 20 is the same as the NOx absorption mechanism. That is, as in the case of the description of the NOx absorption mechanism, a case will be described as an example in which platinum Pt and barium Ba are carried on the carrier, and as described above, when the exhaust air-fuel ratio is lean, oxygen $O_2$ adheres to the surface of the platinum Pt of the main NOx catalyst 20 in the form of $O_2^-$ or $O^{2-}$, and the SOx (for example, $SO_2$) in the exhaust flowing-in is oxidized on the surface of the platinum Pt to become $SO_3$.

Thereafter, the produced $SO_3$ is absorbed by the main NOx catalyst 20 to be combined with barium oxide BaO while being further oxidized on the surface of the platinum Pt, and is diffused into the main NOx catalyst 20 in the form of sulfate ions $SO_4^{2-}$ to generate sulfate $BaSO_4$. This sulfate $BaSO_4$ is stable and hard to decompose, and is not decomposed even if the air-fuel ratio of the exhaust flowing-in is made rich, and will remain in the main NOx catalyst 20. Thus, when, with passage of time, the amount of $BaSO_4$ produced in the main NOx catalyst 20 increases, the amount of BaO that can contribute to the absorption of the main NOx catalyst 20 decreases, resulting in a deterioration in NOx absorbing capacity. This is what is called SOx poisoning.

In view of this, in this embodiment, in order that no SOx may flow into the main NOx catalyst 20, there is provided on the upstream side of the main NOx catalyst 20 an SOx absorbing material 17 which absorbs SOx when the air-fuel ratio of the exhaust flowing-in is lean, and which releases the SOx it has absorbed when the air-fuel ratio of the exhaust flowing-in becomes stoichiometric or rich to cause lowering of oxygen concentration. This SOx absorbing material 17 absorbs both SOx and NOx when the air-fuel ratio of the exhaust flowing into the SOx absorbing material 17 is lean, but when the air-fuel ratio of the exhaust flowing-in becomes stoichiometric or rich to cause lowering of oxygen concentration, it releases not only SOx but also NOx.

As described above, the stable sulfate $BaSO_4$ is produced in the main NOx catalyst 20 when it absorbs SOx. As a result, even when the air-fuel ratio of the exhaust flowing into the main NOx catalyst 20 is made stoichiometric or rich, SOx ceases to be released from the main NOx catalyst 20. Thus, to cause SOx to be released from the SOx absorbing material 17 when the air-fuel ratio of the exhaust flowing into the SOx absorbing material 17 is made stoichiometric or rich, it is necessary for SOx to exist in the SOx absorbing material 17 in the form of sulfate ions $SO_4^{2-}$, or, even if $BaSO_4$ is produced, it is necessary for the $BaSO_4$ to exist in the unstable state in the SOx absorbing material 17. As an SOx absorbing material 17 making this possible, it is possible to use the material comprising the alumina carrier which carries thereon at least one of the following metals selected from: transition metals, such as copper Cu, iron Fe, manganese Mn, and nickel Ni; sodium Na; titanium Ti; and lithium Li.

In this SOx absorbing material 17, when the air-fuel ratio of the exhaust flowing into the SOx absorbing material 17 is lean, the $SO_2$ in the exhaust is absorbed in the SOx absorbing material 17 in the form of sulfate ions $SO_4^{2-}$ while being oxidized on the surface of the SOx absorbing material 17, and then diffused into the SOx absorbing material 17. In this case, when one of platinum Pt, palladium Pd, and rhodium Rh is carried on the carrier of the SOx absorbing material 17, the $SO_2$ easily adheres to the platinum Pt, palladium Pd, or rhodium Rh in the form of $SO_2^{3-}$, thereby the $SO_2$ is easily absorbed in the SOx absorbing material 17 in the form of sulfate ions $SO_4^{2-}$. Thus, to promote the absorption of $SO_2$, it is preferable to have one of platinum Pt, palladium Pd, and rhodium Rh carried on the carrier of the SOx absorbing material 17.

When this SOx absorbing material 17 is arranged on the upstream side of the main NOx catalyst 20, the SOx in the exhaust is absorbed by the SOx absorbing material 17 when the air-fuel ratio of the exhaust flowing into the SOx absorbing material 17 becomes lean, so that no SOx flows into the main NOx catalyst 20 on the downstream side, and only the NOx in the exhaust is absorbed by the main NOx catalyst 20.

On the other hand, as described above, the SOx absorbed by the SOx absorbing material 17 is diffused in the SOx absorbing material 17 in the form of sulfate ions $SO_4^{2-}$ or exists as sulfate $BaSO_4$ in the unstable state. Thus, when the air-fuel ratio of the exhaust flowing into the SOx absorbing material 17 becomes stoichiometric or rich to cause lowering of oxygen concentration, the SOx absorbed by the SOx absorbing material 17 is easily released from the SOx absorbing material 17. Further, the SOx absorbing material 17, constructed as described above, has a so-called 3-way purifying function which it purifies the HC, CO, and NOx in the exhaust when the air-fuel ratio of the exhaust is close to the stoichiometric air-fuel ratio.

Further, studies made by the present applicant has shown the following fact regarding the absorption/releasing action of the SOx absorbing material 17. When the amount of SOx absorbed in the SOx absorbing material 17 is small, the SOx absorbing power of the SOx absorbing material 17 is strong, so that no SOx is released from the SOx absorbing material 17 by causing the exhaust of stoichiometric or rich air-fuel ratio to flow into the SOx absorbing material 17 for a short period of time (for example, less than five seconds). In this regard, the present applicant has ascsertained that when the amount of SOx absorbed in the SOx absorbing material 17 is small, no SOx is released from the SOx absorbing material with the duration time of the stoichiometric or rich air-fuel ratio for performing the lean/rich spike control for the purpose of releasing NOx from the main NOx catalyst 20. However, even when the amount of SOx absorbed in the SOx absorbing material 17 is small, SOx is released from the SOx absorbing material in the case in which the exhaust of stoichiometric or rich air-fuel ratio is caused to flow through the SOx absorbing material 17 for a long period of time.

However, when the amount of SOx absorbed in the SOx absorbing material 17 increases, the SOx adsorbing power of the SOx absorbing material 17 is weakened, so that SOx is leaked out from the SOx absorbing material 17 also when the exhaust of stoichiometric or rich air-fuel ratio is caused to flow through the SOx absorbing material 17 for a short period of time, threby there is the danger of the NOx catalyst 20 on the downstream side undergoing SOx poisoning.

In view of this, in this embodiment, the amount of SOx absorbed in the SOx absorbing material 17 is estimated from the operation history of the internal combustion engine 1, and the time when the estimated SOx absorption amount reaches a predetermined amount is determined to be the regeneration time for the SOx absorbing material 17, and regeneration processing is executed to cause SOx to be released from the SOx absorbing material 17.

In executing the regeneration processing for the SOx absorbing material 17, the ECU 30 determines the engine operating condition at that time from the engine RPM N and the engine load Q/N, and uses the exhaust temperature detected by the temperature sensor 29 as the temperature of the SOx absorbing material 17, and on the basis of the engine operating condition and the temperature of the SOx absorbing material 17, selects an air-fuel ratio condition and a processing time allowing efficient releasing of SOx while suppressing a deterioration in fuel efficiency to a minimum. The ECU 30 causes the exhaust of the selected air-fuel ratio condition to flow through the SOx absorbing material 17 for the selected processing time, thereby effecting regeneration processing of the SOx absorbing material 17.

On the other hand, it is known that, to release SOx from the SOx absorbing material 17, it is necessary for the SOx absorbing material 17 to be at a high temperature higher than a predetermined temperature (for example, 550° C.). During the execution of the regeneration processing of the SOx absorbing material 17, the ECU 30 controls the temperature of the exhaust by an appropriate means, and controls the temperature of the SOx absorbing material 17 to be higher than the predetermined temperature (hereinafter, this will be referred to as the SOx releasing temperature).

When the SOx absorbing material 17 is regenerated, the exhaust flowing out from the SOx absorbing material 17 (hereinafter referred to as the regenerated exhaust) contains a large amount of SOx released from the SOx absorbing material 17, so that when this regenerated exhaust flows into the main NOx catalyst 20, the SOx in the regenerated exhaust is absorbed by the main NOx catalyst 20, and the main NOx catalyst 20 undergoes SOx poisoning, which makes the provision of the SOx absorbing material 17 meaningless. In view of this, in this embodiment, to prevent the SOx released from the SOx absorbing material 17 at the time of regeneration of the SOx absorbing material 17 from being absorbed by the NOx catalyst 20, the regenerated exhaust flowing out from the SOx absorbing material 17 is guided into the bypass pipe 26 at the time of regeneration of the SOx absorbing material 17.

Next, the flow of exhaust when the SOx absorbing material 17 undergoes regeneration processing and when it undergoes no regeneration processing will be described.

First, the case in which the SOx absorbing material 17 undergoes no regeneration processing will be described. In this case, the NOx in the exhaust is reduced and purified through absorption and releasing by the main NOx catalyst 20, so that the lean/rich spike control is executed, and the exhaust switching valve 28 is retained at the bypass-closing position as indicated by the solid line in FIG. 1. Thus, at this time, the exhaust flowing out from the SOx absorbing material 17 flows into the main NOx catalyst 20. And, the SOx in the exhaust is absorbed by the SOx absorbing material 17, and only the NOx in the exhaust is absorbed and released by the main NOx catalyst 20 to undergo reduction and purification.

When the SOx absorbing material 17 undergoes no regeneration processing, the exhaust switching valve 28 is retained at the bypass closing position, so that no exhaust ought to flow to the bypass pipe 26. However, since the sealing property of the exhaust switching valve 28 is not perfect, some exhaust can leak to the bypass pipe 26 from the exhaust switching valve 28. However, in the exhaust emission purifying device of this embodiment, if the exhaust leaks to the bypass pipe 26, the leaking exhaust flows through the sub NOx catalyst 24 provided in the bypass pipe 26 at a very low spatial velocity (low SV), so that the HC and NOx in the exhaust are purified by the sub NOx catalyst 24. This is due to the fact that the sub NOx catalyst 24 consists of a selective reduction type NOx catalyst, and the selective reduction type NOx catalyst exhibits high NOx purifying ratio with a small amount of HC at low SV, and purifies HC and NOx at a purifying ratio of 70 to 80%. Further, at this time, the sub NOx catalyst 24 absorbs the SOx in the exhaust flowing through it as sulfuric acid.

In this way, if some exhaust leaks to the bypass pipe 26 when the SOx absorbing material undergoes no regeneration processing, the leaking exhaust is.also purified by the sub NOx catalyst 24, so that no exhaust is discharged to the atmosphere from the vehicle without having been purified, thereby achieving an improvement in reliability in exhaust emission purification.

Next, the case in which SOx is to be released from the SOx absorbing material 17, i.e., the case in which the SOx absorbing material 17 undergoes regeneration processing will be described. At this time, the air-fuel ratio control of the internal combustion engine 1 is switched from the lean/rich spike control to the stoichiometric control or rich air-fuel ratio control. At the same time, the exhaust switching valve 28 is switched from the bypass closing position to the bypass opening position indicated by the broken line in FIG. 1 and retained in this position. When the exhaust of stoichiometric or rich air-fuel ratio flows into the SOx absorbing material 17, SOx is released from the SOx absorbing material 17. However, at this time, the regenerated exhaust flowing out of the SOx absorbing material 17 does not flow into the main NOx catalyst 20 but flows into the bypass pipe 26. Thus, it is possible to prevent the main NOx catalyst 20 from undergoing SOx poisoning by the SOx in the regenerated exhaust.

Further, the exhaust of stoichiometric or rich air-fuel ratio flowing into the bypass pipe 26 passes through the sub NOx catalyst 24, so that, in this process, the SOx which has been absorbed by the sub NOx catalyst 24 in the form of sulfuric acid is also released from the sub NOx catalyst 24. This is because the selective reduction type NOx catalyst constituting the sub NOx catalyst 24 releases SOx as long as the air-fuel ratio of the exhaust flowing-in is stoichiometric or rich even if the sulfur concentration of the exhaust flowing-in is high.

And, the SOx released from the SOx absorbing material 17 and the sub NOx catalyst 24 is reduced by the unburned HC and CO in the exhaust and released as $SO_2$.

During the regeneration processing of the SOx absorbing material 17, the unburned HC and CO and NOx are discharged from the internal combustion engine 1. However, since the SOx absorbing material 17 and the sub NOx catalyst 24 have the 3-way purifying function, the unburned HC and CO and NOx are purified by the SOx absorbing material 17 and the sub NOx catalyst 24. Thus, also during the regeneration processing of the SOx absorbing material 17, there is no danger of unburned HC and CO and NOx being released to the atmosphere.

Next, when the regeneration processing of the SOx absorbing material 17 is to be stopped, the air-fuel ratio control of the internal combustion engine 1 is switched from the stoichiometric or rich air-fuel ratio control to the lean/rich spike control. At the same time, the exhaust switching valve 28 is switched from the bypass opening position to the bypass closing position indicated by the solid line in FIG. 1. When the air-fuel ratio of the exhaust becomes the air-fuel ratio corresponding to the lean/rich spike control, the releasing of SOx from the SOx absorbing material 17 is stopped.

Figure 5:
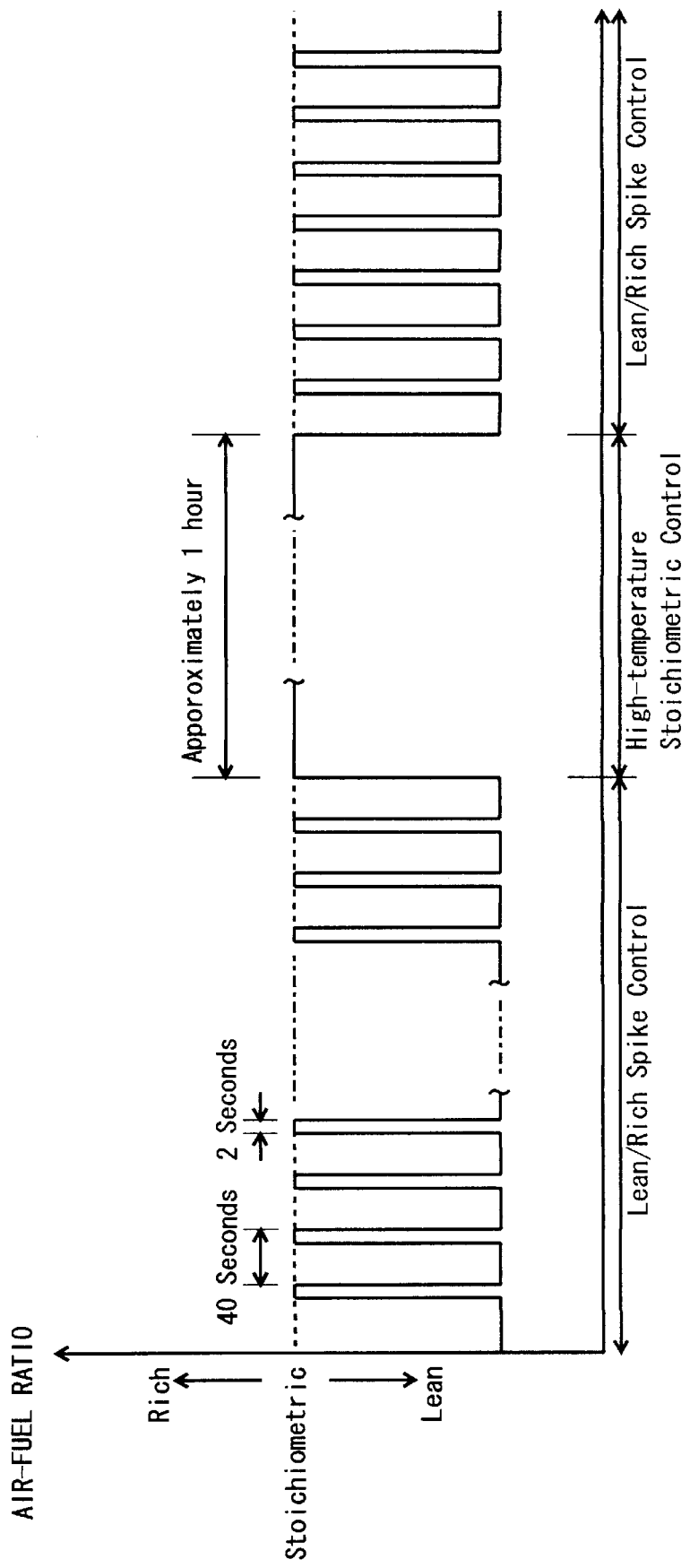
FIG. 5 is a diagram showing an example of the air-fuel ratio control in the first embodiment.

FIG. 5 shows an example of the air-fuel ratio control in this embodiment. In the lean/rich spike control of this embodiment, when, for example, the vehicle is running at a normal speed of 60 km/h, 40 seconds of lean air-fuel ratio operation and approximately two seconds of stoichiometric operation are alternately repeated. On the other hand, at the time of regeneration processing of the SOx absorbing material 17, the air-fuel ratio is controlled to stoichiometric, and the duration time thereof is sufficiently longer than the rich spike duration time of the lean/rich spike control, for example, approximately one hour.

Next, with reference to FIG. 6, the exhaust flow switching processing execution routine in this embodiment will be described. A flowchart comprising steps which constitute this routine is stored in the ROM 32 of the ECU 30, and the processing in each step of the flowchart is executed by the CPU 34 of the ECU 30.

(Step 101)

First, in Step 101, the ECU 30 determines whether the SOx absorbing material 17 is to be regenerated or not. In the flowchart of FIG. 6, the SOx absorbing material 17 is called "S trap".

When determined affirmative in Step 101, that is, when it is determined that the SOx absorbing material 17 is to be regenerated, the process by the ECU 30 advances to Step 102, in which it executes the exhaust temperature control such that the temperature of the SOx absorbing material 17 is higher than the SOx releasing temperature, and alwo selects the stoichiometric or rich condition and the regeneration processing time that allow most efficient releasing of SOx. In this embodiment, the temperature control of the exhaust is executed on the basis of the exhaust temperature at the outlet of the SOx absorbing material 17 detected by the temperature sensor 29.

Next, the process by the ECU 30 advances from Step 102 to Step 103, in which it executes the regeneration processing of the SOx absorbing material 17 in accordance with the stoichiometric or rich condition and the regeneration processing time selected in Step 102. Further, the exhaust switching valve 28 is retained at the bypass opening position indicated by the broken line in FIG. 1 to introduce the exhaust into the bypass pipe 26, and prevents it from flowing into the NOx catalyst 20. By causing the exhaust of the stoichiometric or rich air-fuel ratio to flow through the SOx absorbing material 17, SOx is released from the SOx absorbing material 17, and the regenerated exhaust passes through the bypass pipe 26 and the sub NOx catalyst 24 is released to the atmosphere. Thus, no regenerated exhaust flows into the main NOx catalyst 20, so that SOx poisoning of the main NOx catalyst 20 is prevented. As stated above, also during the regeneration processing of the SOx absorbing material 17, the exhaust is purified by the 3-way purifying function of the SOx absorbing material 17 and the sub NOx catalyst 24.

After the regeneration processing of the SOx absorbing material 17 has been executed for a predetermined period of time, the process by the ECU 30 advances to Step 104, and the regeneration processing of the SOx absorbing material 17 is completed, and the air-fuel ratio control of the internal combustion engine 1 is changed from the stoichiometric or rich air-fuel ratio control to the lean/rich spike control.

Next, the process by the ECU 30 advances to Step 105, in which the exhaust switching valve 28 is switched to the bypass closing position indicated by the solid line in FIG. 1 to introduce the exhaust into the main NOx catalyst 20, and prevents it from flowing into the bypass pipe 26. As a result, the exhaust passes through the SOx absorbing material 17 and the main NOx catalyst 20 to be released to the atmosphere. At this time, the SOx in the exhaust is absorbed by the SOx absorbing material 17, and only the NOx in the exhaust is absorbed and released by the main NOx catalyst 20 to be reduced and purified. Further, a small amount of exhaust leaking from the exhaust switching valve 28 to the bypass pipe 26 is purified when it passes through the sub NOx catalyst 24.

Further, also in the case in which the negative determination is made in Step 101, the process by the ECU 30 advances to Step 105, in which the exhaust is caused to flow through the main NOx catalyst 20. After Step 105, the process advances to the "return."

Thus, in this embodiment, at the time of regeneration processing of the SOx absorbing material 17, the exhaust flowing out of the SOx absorbing material 17 flows to the bypass pipe 26, and ceases to flow into the main NOx catalyst 20, so that it is possible to reliably prevent the main NOx catalyst 20 from undergoing SOx poisoning. As a result, it is possible to constantly maintain the NOx purifying ratio of the main NOx catalyst 20 at a high level. Further, when the SOx absorbing material undergoes no regeneration processing, that is, if, when the exhaust is flowing through the main NOx catalyst 20, some exhaust leaks from the exhaust switching valve 28 to the bypass pipe 26, the leaking exhaust is purified by the sub NOx catalyst 24, so that it does not contaminate the atmosphere. As a result, an improvement is achieved in terms of reliability in exhaust emission purification.

While in the above-described embodiment the exhaust switching valve 28 is controlled at the time of regeneration processing of the SOx absorbing material 17 so as to cause the exhaust to flow through the bypass pipe 26, if there is the danger of SOx being released from the SOx absorbing material 17 despite the regeneration processing of the SOx absorbing material 17, the exhaust switching valve 28 may be switched so as to cause the exhaust to flow through the bypass pipe 26.

That is, as stated above, in this internal combustion engine 1, during the high-load operation, the warming-up operation after startup, the acceleration operation, and the normal operation at a speed of higher than 120 km/h, the air-fuel ratio is controlled to be stoichiometric, and during the full-load operation, the air-fuel ratio is controlled to be rich. Thus, in these operating conditions, the air-fuel ratio of the exhaust is stoichiometric or rich, and the exhaust of stoichiometric or rich air-fuel ratio flows into the SOx absorbing material 17.

If the exhaust of stoichiometric or rich air-fuel ratio flows into the SOx absorbing material 17, no problem is involved as long as the flowing is in an extremely short duration. However, the exhaust flowing continues to some degree, there is the danger of SOx being released from the SOx absorbing material 17 when the exhaust temperature becomes higher than the SOx releasing temperature. When this exhaust flows into the main NOx catalyst 20 on the downstream side, there is the danger of the main NOx catalyst 20 undergoing SOx poisoning.

Thus, when the air-fuel ratio of the exhaust has become stoichiometric or rich due to the demand based on the operating condition of the internal combustion engine 1, such as the high-load operation, the warming-up operation after startup, the acceleration operation, the normal operation at a speed of higher than 120 km/h, and the full-load operation, it is possible to further reliably prevent SOx poisoning of the main NOx catalyst 20 by switching the exhaust switching valve 28 so as to introduce the exhaust into the bypass pipe 26.

Second Embodiment

Next, a second embodiment of the exhaust emission purifying device for an internal combustion engine of the present invention will be described. The difference between the second embodiment and the first embodiment is as follows.

In the second embodiment, as the sub NOx catalyst 24 provided in the bypass pipe 26, a selective reduction type NOx catalyst having a 3-way purifying function and HC adsorbing capacity at low temperature is used. The HC adsorbing capacity of the sub NOx catalyst 24 can be enhanced by, for example, increasing the amount of zeolite in the carrier of the sub NOx catalyst 24. The reason for providing the sub NOx catalyst 24 having such characteristics is as follows.

In the above-described first embodiment, when the exhaust is introduced into the bypass pipe 26 when there is the danger of SOx being released from the SOx absorbing material 17, the SOx absorbing material 17 has not attained the SOx releasing temperature even when the air-fuel ratio has become stoichiometric or rich in the low-temperature start or the like, so that it is determined that there is no danger of SOx being released from the SOx absorbing material 17, and the exhaust switching valve 28 is controlled so as to introduce the exhaust into the main NOx catalyst 20.

If, under this temperature condition, the exhaust is caused to flow through the SOx absorbing material 17, the HC in the exhaust is not purified and it only flows to the downstream side. Further, since the main NOx catalyst 20 has not attained the activation temperature yet, the exhaust is not purified by causing it to flow through the main NOx catalyst 20, the HC being allowed to pass along.

Thus, in the second embodiment, when the SOx absorbing material 17 has not reached the activation temperature at which HC can be purified, the exhaust switching valve 28 is retained at the bypass opening position so as to introduce the exhaust to the bypass pipe 26, and, by utilizing the HC absorbing capacity of the sub NOx catalyst 24 provided in the bypass pipe 26, the HC in the exhaust is adsorbed by the sub NOx catalyst 24. It has been ascertained by the present applicant that the HC adsorbed by the sub NOx catalyst 24 is changed to an HC which is highly reactive with NOx.

And, when the SOx absorbing material 17 has reached a temperature at which HC can be purified, the exhaust switching valve 28 is switched to the bypass closing position so as to introduce the exhaust to the main NOx catalyst 20. Even when the exhaust switching valve 28 is retained at the bypass closing position, it can happen that a small amount of exhaust leaks from the exhaust switching valve 28 to the bypass pipe 26. However, the leaking exhaust flows through the sub NOx catalyst 24 at a very low spatial velocity (low SV), and the HC and NOx in the exhaust are purified by the sub NOx catalyst 24. At the same time, the HC absorbed by the sub NOx catalyst 24 and made highly reactive with NOx reacts with the NOx in the exhaust, and with the oxygen in the exhaust, whereby it is separated from the sub NOx catalyst and purified.

Figure 7:
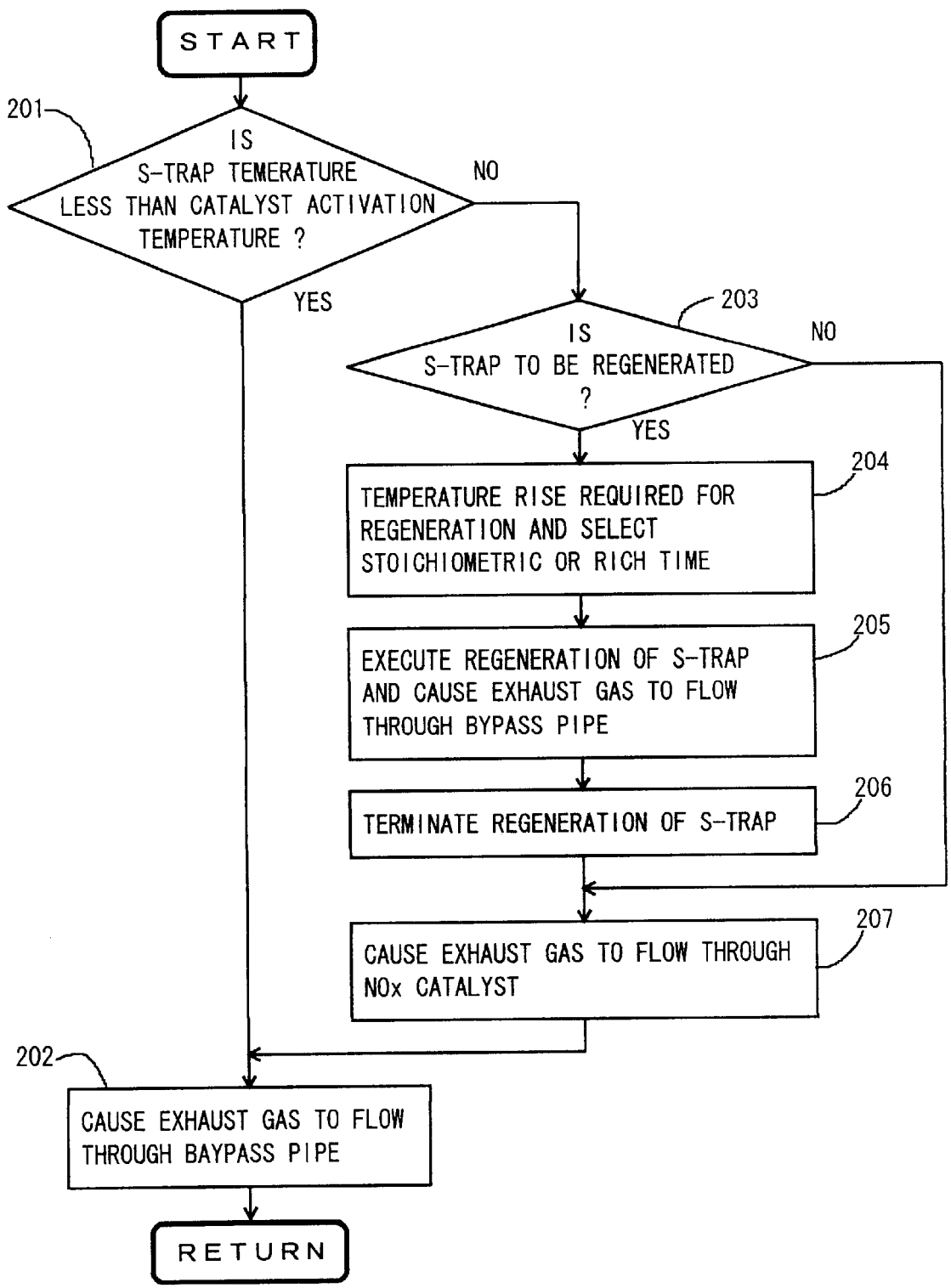
FIG. 7 is a flowchart showing the exhaust flow switching processing execution routine in a second embodiment of an exhaust emission purifying device for an internal combustion engine of the present invention.

Next, with reference to FIG. 7, the exhaust flow switching processing execution routine will be described. A flowchart comprising the steps which constitute this routine is stored in the ROM 32 of the ECU 30, and the processing in each step of the flowchart is all executed by the CPU 34 of the ECU 30.

(Step 201)

First, in Step 201, the ECU 30 determines whether the temperature of the SOx absorbing material 17 is less than the temperature at which HC can be purified (catalyst activation temperature) or not. In this embodiment, the exhaust temperature at the outlet of the SOx absorbing material 17 detected by the temperature sensor 29 is used as the temperature of the SOx absorbing material 17. In the flowchart of FIG. 7, the SOx absorbing material 17 is called "S trap".

(Step 202)

When determined affirmative in Step 201, that is, when it is determined that the temperature of the SOx absorbing material 17 is less than the temperature at which HC can be purified, the process by the ECU 30 advances to Step 202, in which it retains the exhaust switching valve 28 at the bypass opening position so as to introduce the exhaust to the bypass pipe 26, whereby the exhaust flows through the sub NOx catalyst 24, and the HC in the exhaust is adsorbed by the sub NOx catalyst 24.

(Step 203)

On the other hand, when determined negative in Step 201, that is, when it is determined that the temperature of the SOx absorbing material 17 has reached the temperature at which HC can be purified, the process of the ECU 30 advances to Step 203.

(Steps 203 through 207)

Figure 6:
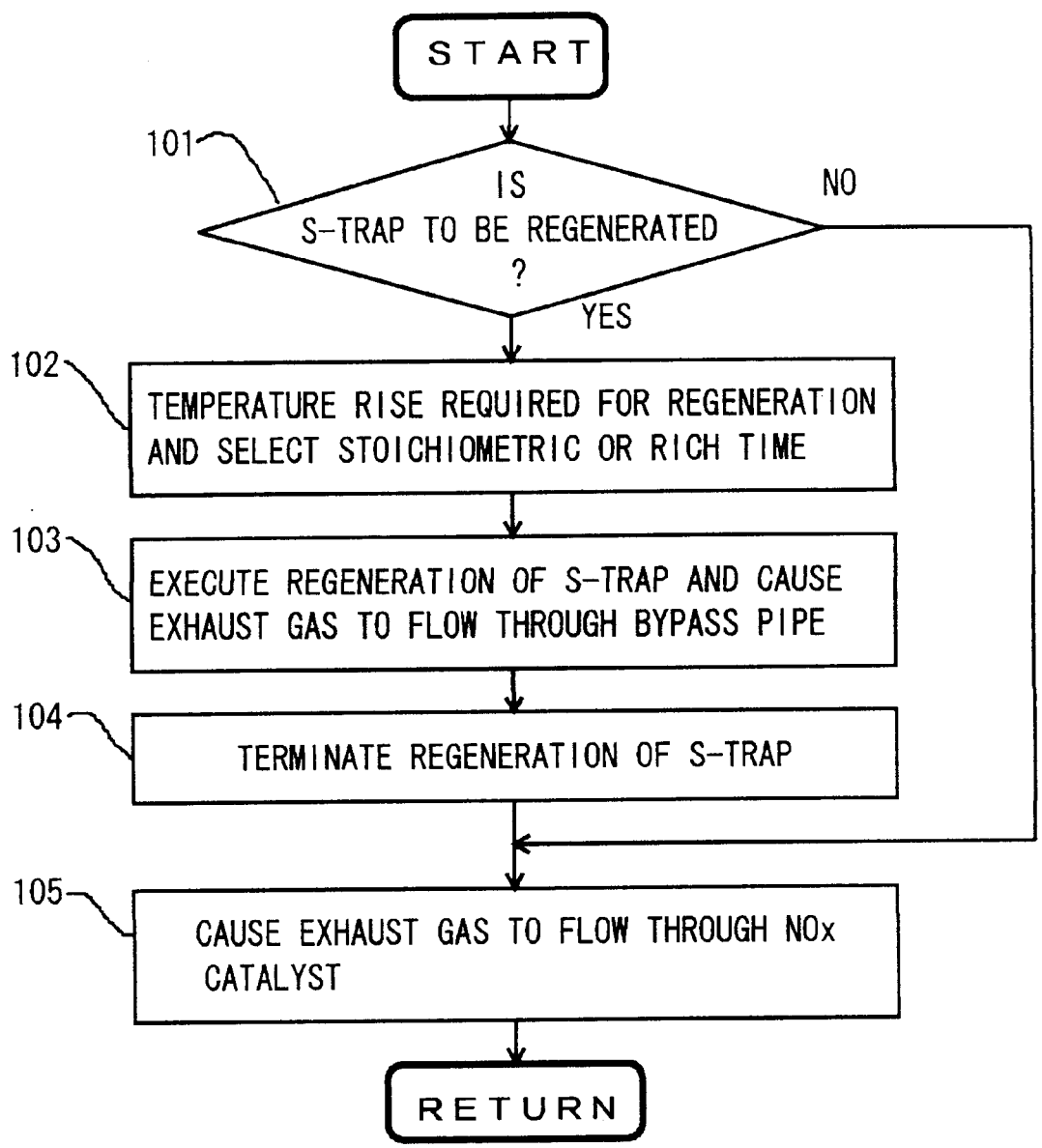
FIG. 6 is a flowchart showing the exhaust flow switching processing execution routine of the first embodiment.

Steps 203 through 207 are completely the same as Steps 101 through 105 of the flowchart of the first embodiment shown in FIG. 6, so that a description thereof will be omitted.

In this way, in the second embodiment, the exhaust is released to the atmosphere after having been purified also when the internal combustion engine is started at a low temperature, so that an improvement is achieved in terms of reliability in exhaust emission purification.

Third Embodiment

Next, a third embodiment of the exhaust emission purifying device for an internal combustion engine of the present invention will be described with reference to FIGS. 8 through 11.

Figure 8:
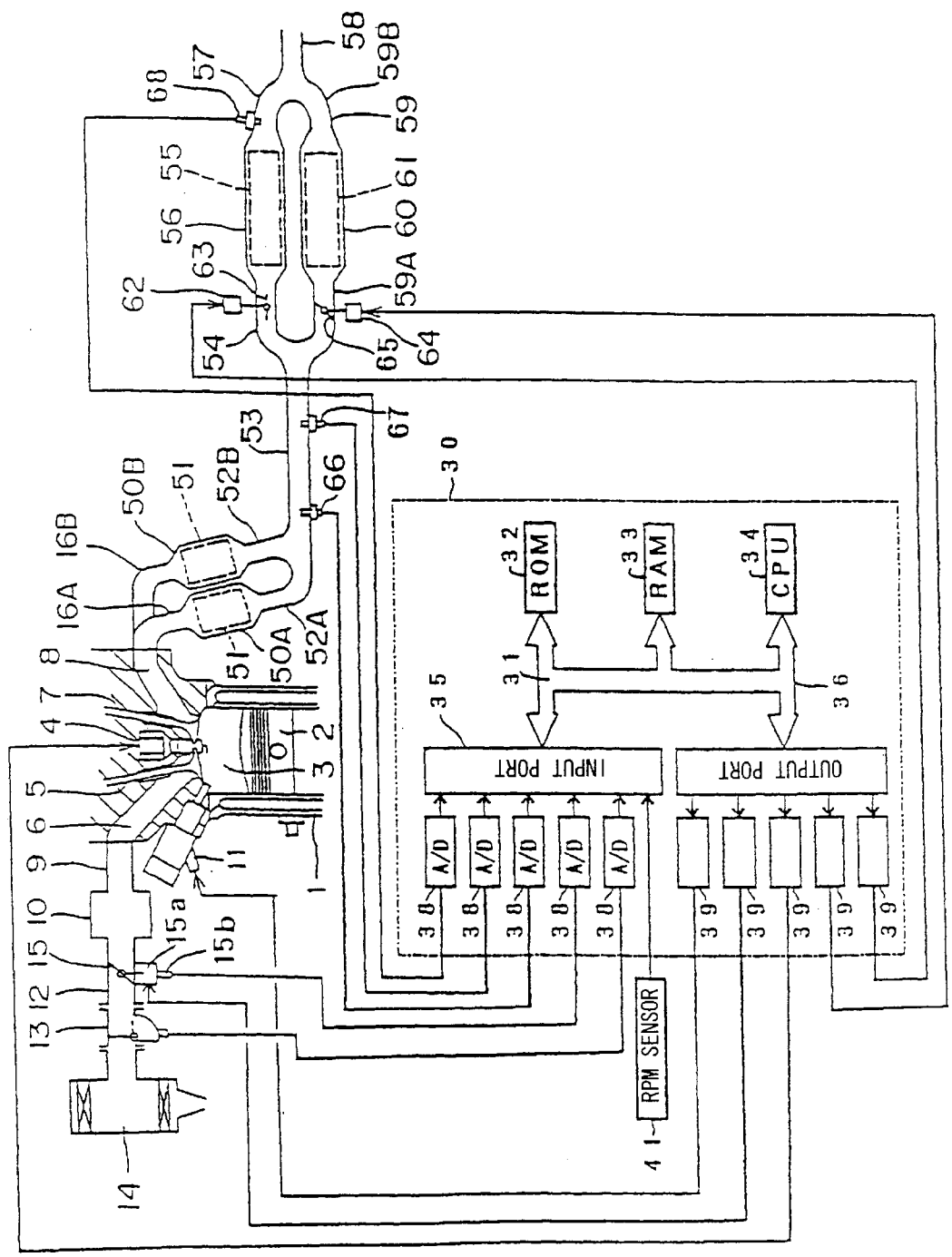
FIG. 8 is a schematic diagram showing the construction of a third embodiment of an exhaust emission purifying device for an internal combustion engine of the present invention.

FIG. 8 is a diagram schematically showing the construction of the exhaust emission purifying device of the third embodiment. In this embodiment, the present invention is applied to an in-cylinder injection type vehicle lean-burn gasoline engine capable of lean burning.

In the drawing, numeral 1 indicates a main body of an in-line four-cylinder internal combustion engine, numeral 2 indicates a piston, numeral 3 indicates a combustion chamber, numeral 4 indicates a sparking plug, numeral 5 indicates an intake valve, numeral 6 indicates an intake port, numeral 7 indicates an exhaust valve, numeral 8 indicates an exhaust port, and numeral 11 indicates a fuel injection valve. In this internal combustion engine 1, the fuel is directly injected into the combustion chamber 3 from the fuel injection valve 7.

The intake port 6 is connected to a surge tank 10 through each branch pipe of an intake manifold 9, and the surge tank 10 is connected to an intake duct 12. The intake duct 12 is connected to an airflow meter 13 adapted to output a voltage in proportion to the mass of intake air, and the airflow meter 13 is connected to an air cleaner 14.

Arranged at- some midpoint in the intake duct 12 is a throttle valve 15 for adjusting the intake flow rate in the intake duct 12. Mounted to this throttle valve 15 are a throttle motor 15a comprising a DC motor or the like for opening and closing the throttle valve 15 in accordance with the magnitude of the applied voltage and a throttle position sensor 15b for outputting an electric signal corresponding to the opening degree of the throttle valve 15.

The airflow meter 13 and the throttle position sensor 15b are electrically connected through respectively corresponding A/D converters 38 to an input port 35 of the ECU 30, and output signals of the sensors are input into the ECU 30.

Figure 9:
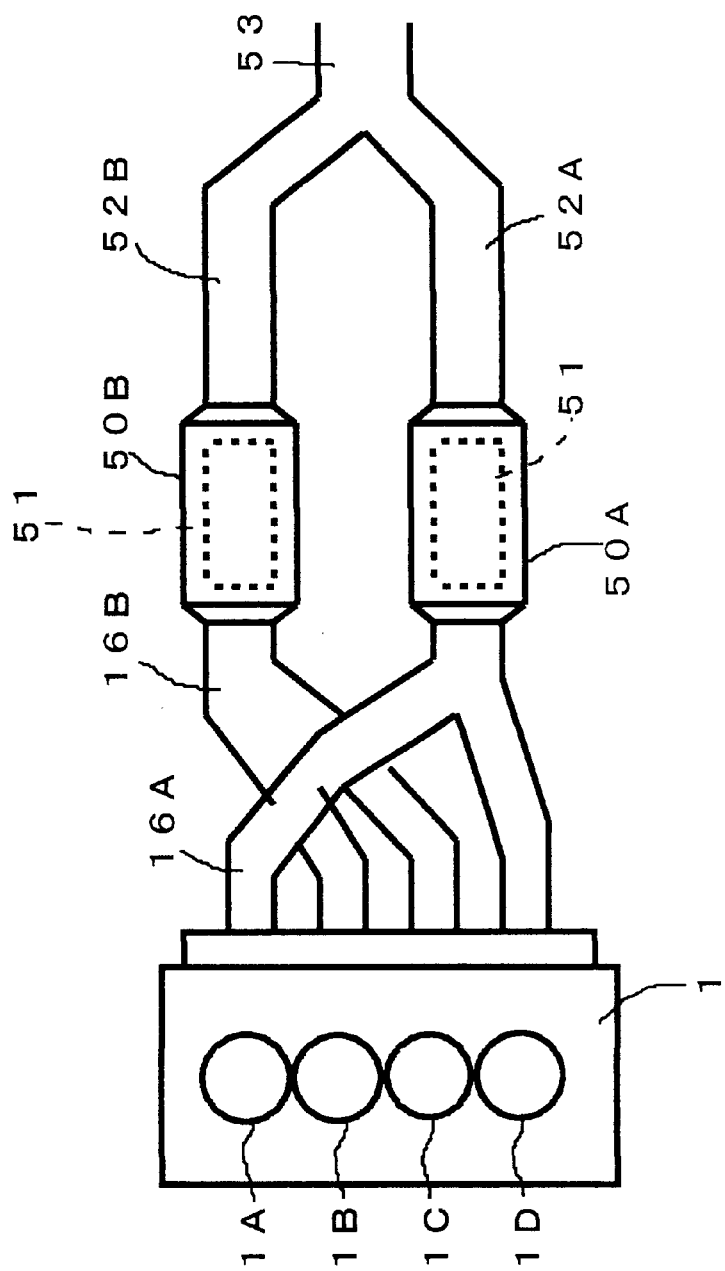
FIG. 9 is a diagram showing in detail the construction of an exhaust manifold in the third embodiment.

On the other hand, regarding the exhaust ports 8, the exhaust ports 8 of a first cylinder 1A and a fourth cylinder 1D are, as shown in FIG. 9, connected to a casing 50A of a first start converter through a first exhaust manifold 16A, and the exhaust ports 8 of a second cylinder 1B and a third cylinder 1C are connected to a casing 50B of a second start converter through a second exhaust manifold 16B. The casings 50A and 50B each contains a 3-way catalyst 51 having SOx absorbing capacity. That is, this 3-way catalyst 51 comprises an ordinary 3-way catalyst carrying thereon an SOx absorbing agent (for example, barium Ba, potassium K, or lanthanum La).

The casings 50A and 50B are connected to an exhaust pipe 53 through exhaust pipes 52A and 52B, and the exhausts from the cylinders join in the exhaust pipe 53. The exhaust pipe 53is connected through an exhaust pipe 54 to a casing 56 containing an occlusion reduction type NOx catalyst 55, and the casing 56 is connected to an exhaust pipe 58 through an exhaust pipe 57, the exhaust pipe 58 being connected to an unillussstrated muffler. In the following, this occlusion reduction type NOx catalyst 55 will be called the main NOx catalyst 55.

Further, the exhaust pipe 53 and the exhaust pipe 58 are also connected by a bypass path 59 bypassing the main NOx catalyst 55. The bypass path 59 is formed by a bypass pipe 59A connected to the exhaust pipe 53, a bypass pipe 59B connected to the exhaust pipe 58, and a casing 60 placed between the bypass paths 59A and 59B, and the casing 60 contains an occlusion reduction type NOx catalyst 61. In the following, this occlusion reduction type NOx catalyst 61 will be called the sub NOx catalyst 61. The construction of the main NOx catalyst 55 and the sub NOx catalyst 61 of the third embodiment is completely the same as that of the main NOx catalyst 20 of the first embodiment, and a description thereof will be omitted.

Provided in the exhaust pipe 54 situated on the upstream side of the main NOx catalyst 55 is a first exhaust switching valve 63 for opening and closing the flow passage of the exhaust pipe 54. Mounted to this first exhaust switching valve 63 is a first actuator 62 for opening and closing the first exhaust switching valve 63 in accordance with the magnitude of the applied current.

Provided in the bypass pipe 59A situated on the upstream side of the sub NOx catalyst 61 is a second exhaust switching valve 65 for opening and closing the exhaust passage in the bypass pipe 59A. Mounted to this second exhaust switching valve 65 is a second actuator 64 for opening and closing the second exhaust switching valve 65 in accordance with the magnitude of the applied current.

Mounted to the exhaust pipe 53 are a temperature sensor 66 for generating an output voltage in proportion to the temperature of the exhaust passing through the 3-way catalyst 51, and an oxygen concentration sensor 67 for generating an output voltage in proportion to the oxygen concentration of the exhaust. Mounted to the exhaust pipe 57 is an oxygen concentration sensor 68 for generating an output voltage in proportion to the oxygen concentration of the exhaust passing through the main NOx catalyst 55.

Next, the output voltages of the temperature sensor 66 and the oxygen concentration sensors 67 and 68 are input to the input port 35 of the ECU 30 through the corresponding A/D converters 38. Further, input from a RPM sensor 41 to the input port 35 of the ECU 30 is an output pulse indicating the engine RPM.

An output port 36 of the ECU 30 is electrically connected through corresponding driving circuits 39 to the sparking plug 4, the fuel injection valve 11, the throttle motor 15a, and the first actuator 62 and the second actuator 64 of the first and second exhaust switching valves 63 and 65.

In the third embodiment, the ECU 30 executes the lean air-fuel ratio control at the engine start, executes the lean air-fuel ratio control when the engined operating condition is in the low-middle load operating range, and executes the stoichiometric control when the engine operating condition is in the warming-up operating range and when the engine operating condition is in the acceleration operating range. Regarding the high-load operating range, the ECU 30 executes the stoichiometric control in the range where the engine load is particularly high and executes the lean air-fuel ratio control in the other range. Regarding the normal operation range, the ECU 30 performs the stoichiometric control in the range where the speed is particularly high, and performs the lean air-fuel ratio control in the other range.

In the third embodiment, the 3-way catalyst 51 contained in the casings 50A and S0B not only functions as a start converter for purifying the exhaust when the exhaust of stoichiometric air-fuel ratio is discharged in warming-up operation or the like after the engine start, but also functions as the SOx absorbing material 17 described with reference to the first embodiment. That is, when the exhaust of lean air-fuel ratio flows through the 3-way catalyst 51, the SOx in the exhaust is absorbed by the 3-way catalyst 51, and when the exhaust of stoichiometric or rich air-fuel ratio flows through the 3-way catalyst, the SOx absorbed by the 3-way catalyst 51 is released.

In the first embodiment, when it is determined that the amount of SOx absorbed by the SOx absorbing material 17 has reached a predetermined amount, the ECU 30 positively controls the internal combustion engine 1 so as to cause the SOx absorbed by the SOx absorbing material 17 to be released. In the third embodiment, in contrast, it does not positively control the internal combustion engine 1 so as to cause the SOx absorbed by the 3-way catalyst 51 to be released.

In this case, the SOx absorbing/releasing action of the 3-way catalyst 51 is effected in accordance with the engine operating condition. That is, when the operating condition of the internal combustion engine 1 is in the lean air-fuel ratio control execution range, the SOx in the exhaust is absorbed by the 3-way catalyst 51. When the operating condition of the internal combustion engine 1 is in the stoichiometric control execution range or the rich air-fuel ratio control execution range, the air-fuel ratio of the exhaust is stoichiometric or rich, so that the SOx absorbed by the 3-way catalyst 51 is released if the temperature of the 3-way catalyst 51 at that time satisfies the SOx releasing condition.

In the third embodiment, the ECU 30 controls the first and second exhaust switching valves 63 and 65 in accordance with the absorbing/releasing operation of the 3-way catalyst 51, in other words, according to changes in the operating condition of the internal combustion engine 1.

For example, when the engine operating condition is in the lean air-fuel ratio control execution range, the ECU 30 determines that the 3-way catalyst 51 is in the condition in which it can absorb the SOx in the exhaust, and retains the first exhaust switching valve 63 in the fully open state and retains the second exhaust switching valve 65 in the totally closed state, causing the exhaust to flow through the main NOx catalyst 55 and allowing no exhaust to flow through the sub NOx catalyst 61.

In this case, the SOx in the exhaust discharged from the internal combustion engine 1 is absorbed by the 3-way catalyst 51, and the exhaust from which SOx has been removed flows through the main NOx catalyst 55, so that the main NOx catalyst 55 does not undergo SOx poisoning. And, when the exhaust flows through the main NOx catalyst 55, the NOx in the exhaust is absorbed by the main NOx catalyst 55.

As stated above, in the third embodiment, when the lean air-fuel ratio control is being performed on the internal combustion engine 1, the first exhaust switching valve 63 and the second exhaust switching valve 65 are controlled such that the entire amount of exhaust discharged from the internal combustion engine 1 flows through the main NOx catalyst 55. When the stoichiometric control or rich air-fuel ratio control is being performed on the internal combustion engine 1, the first exhaust switching valve 63 and the second exhaust switching valve 65 are controlled such that the entire amount of exhaust discharged from the internal combustion engine 1 flows through the sub NOx catalyst 61. Thus, no exhaust of stoichiometric or rich air-fuel ratio flows through the main NOx catalyst 55, so that it is necessary to appropriately release and purify the NOx absorbed by the main NOx catalyst 55.

In view of this, in the third embodiment, the ECU 30 performs a so-called lean/rich spike control, in which, when the engine operating condition is in the lean air-fuel ratio control execution range, the internal combustion engine 1 is operated at the lean air-fuel ratio, and the amount of NOx absorbed by the main NOx catalyst 55 is estimated, and when the estimated value reaches a limit value of the NOx amount that can be absorbed by the main NOx catalyst 55, the rich spike control is executed to cause the NOx absorbed by the main NOx catalyst 55 to be released and reduced.

When the lean/rich spike control is being performed, the second exhaust switching valve 65 is retained in the totally closed state, and no exhaust ought to flow through the bypass path 59. However, since the sealing property of the exhaust switching valve 65 is not perfect, it can happen that some exhaust leaks from the second exhaust switching valve 65 and flows through the bypass path 59.

To cope with this problem, in the exhaust emission purifying device of the third embodiment, the sub NOx catalyst 61 is provided in the bypass path, so that, when the exhaust leaks into the bypass path 59, the leaking exhaust flows through the sub NOx catalyst 61 at a very low spatial velocity (low SV). Thus, the NOx in the exhaust is purified by the occlusion reduction type NOx catalyst constituting the sub NOx catalyst 61.

In this way, when the engine operating condition is in the lean/rich spike control execution range, any exhaust allowed to leak into the bypass path 59 is purified by the sub NOx catalyst 61, so that the exhaust is not discharged to the atmosphere without purification of the harmful gas components in the exhaust, thereby achieving an improvement in terms of reliability in exhaust purification.

On the other hand, when the operating condition of the internal combustion engine 1 is in the stoichiometric control execution range or the rich air-fuel ratio control execution range, and the temperature of the 3-way catalyst 51 satisfies the SOx releasing condition, the ECU 30 determines that the SOx absorbed by the 3-way catalyst 51 can be released, and retains the first exhaust switching valve 63 in the totally closed state and the second exhaust switching valve 65 in the fully open state thereby cause the exhaust to flow through the sub NOx catalyst 61 and allow no exhaust to flow through the main NOx catalyst 55.

In this case, the exhaust containing the SOx released from the 3-way catalyst 51 does not flow into the main NOx catalyst 55, but is led to the exhaust pipe 58 by way of the bypass path 59, so that the SOx poisoning of the main NOx catalyst 55 is prevented.

On the other hand, the exhaust containing the SOx released from the 3-way catalyst 51 flows through the sub NOx catalyst 61. With the exception of the low-temperature start, the exhaust temperature is sufficiently high at the time of acceleration operation, high-speed operation, and high-load operation, with the exhaust flow rate being high. Further, the occlusion reduction type NOx catalyst constituting the sub NOx catalyst 61 is also at a considerably high temperature (which is sometimes higher than the SOx releasing temperature). Thus, in this condition, even if the SOx concentration in the exhaust is high, SOx is not easily absorbed by the sub NOx catalyst 61. Thus, there is little possibility of the sub NOx catalyst 61 undergoing SOx poisoning. Further, the harmful gas components contained in the exhaust, such as HC, CO, and NOx, are purified by the 3-way purifying function of the 3-way catalyst 51 and the sub NOx catalyst 61.

Figure 10:
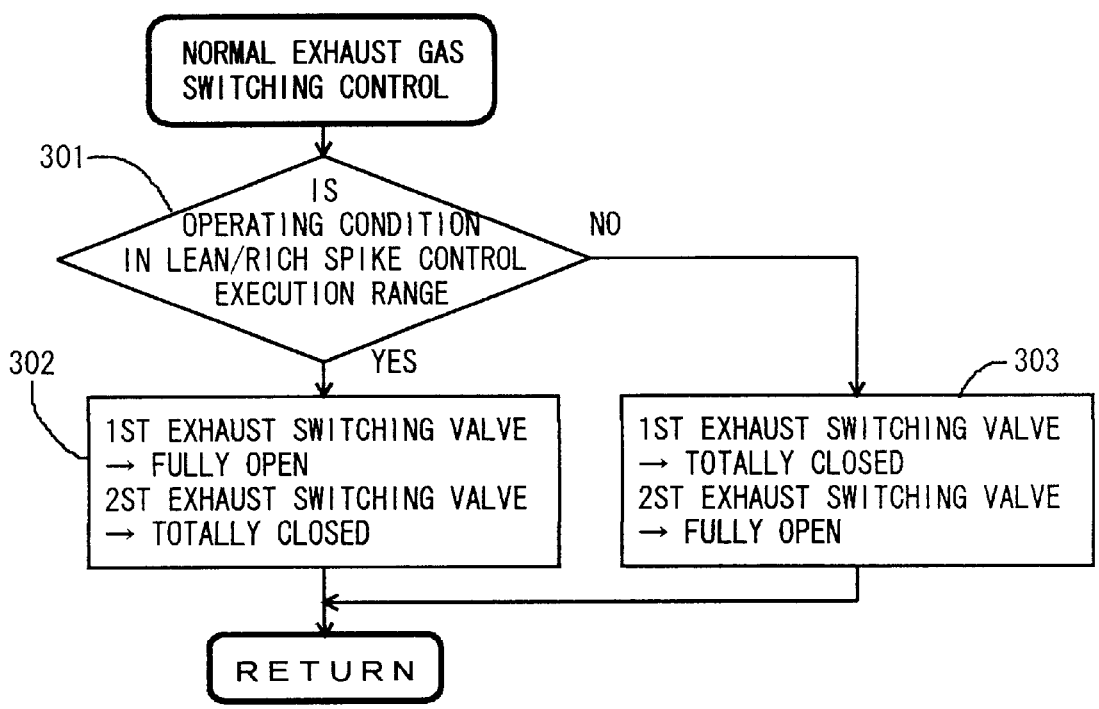
FIG. 10 is a flowchart showing the normal-time exhaust switching control routine in the third embodiment.

This control of the first and second exhaust switching valves 63 and 65 based on the SOx absorbing/releasing operation of the 3-way catalyst 51 will be referred to as the normal exhaust switching control. The normal exhaust switching control is executed in accordance with a normal exhaust switching control routine as shown in FIG. 10. The normal exhaust switching control routine as shown in FIG. 10 is stored in advance in the ROM 32 of the ECU 30; it is a routine repeated for each predetermined time.

(Step 301)

In the normal exhaust switching control routine, the ECU 30 first determines in Step 301 whether the engine operating condition is in the lean/rich spike control execution range or not.

(Step 302)

When determined affirmative in Step 301, the process by the ECU 30 advances to Step 302, in which it controls the first actuator 62 so as to retain the first exhaust switching valve 63 in the fully open state and controls the second actuator 64 so as to retain the second exhaust switching valve 65 in the totally closed state, thereby causing the exhaust to flow through the main NOx catalyst 55 and allowing no exhaust to flow through the sub NOx catalyst 61.

(Step 303)

When determined negative in Step 301, the process by the ECU 30 advances to Step 303, in which it controls the first actuator 62 so as to retain the first exhaust switching valve 63 in the totally closed state and controls the second actuator 64 so as to retain the second exhaust switching valve 65 in the fully open state, thereby causing the exhaust to flow through the sub NOx catalyst 61 and allowing no exhaust to flow through the main NOx catalyst 55.

On the other hand, while the first and second exhaust switching valves 63 and 65 are basically opened and closed in accordance with the above-described normal exhaust switching control routine, they are controlled in accordance with a control routine different from the normal exhaust switching control routine only in the following cases: (1) when the engine starts; and (2) when the exhaust temperature is high. These two cases will be individually described.

(1) When the Engine Starts

When the internal combustion engine 1 is started at a low temperature, to achieve early activation of the 3-way catalyst 51, the ECU 30 executes the following 3-way catalyst temperature raising control. That is, in addition to the fuel injection (main injection) for obtaining the engine output, the ECU 30 performs an expansion stroke sub injection in which the fuel is secondarily injected during the expansion stroke. Further, it places the first and second exhaust switching valves 63 and 65 substantially in the totally closed state to throttle the exhaust flow rate. In the process, the main injection is performed at the lean air-fuel ratio control.

In this case, since the main injection is performed at the lean air-fuel ratio control, the oxygen in the exhaust becomes excessive. Further, the first and second exhaust switching valves 63 and 65 are placed substantially in the totally closed state to throttle the exhaust flow rate, whereby the back pressure increases and the exhaust temperature rises. If, in this condition, the expansion stroke sub injection is effected, the sub injection fuel is easily burnt. As a result, the exhaust temperature rapidly increases, and it becomes possible to raise the temperature of the 3-way catalyst 51 in a short time, making it possible to effect early activation of the 3-way catalyst 51.

After the activation of the 3-way catalyst 51, the ECU 30 terminates the execution of the 3-way catalyst temperature raising control. And, the ECU 30 starts the execution of the above-described normal exhaust switching control, and starts the execution of the normal air-fuel ratio control.

(2) When the Exhaust Temperature is High

When the exhaust temperature is high and the exhaust flow rate is high as in the case in which the vehicle speed is high and in which the engine load is high, it is to be expected that the temperature of the main NOx catalyst 55 and the sub NOx catalyst 61 will become unnecessarily high.

Here, the occlusion reduction type NOx catalyst constituting the main NOx catalyst 55 and the sub NOx catalyst 61 is activated when the floor temperature or the atmosphere temperature of the occlusion reduction type NOx catalyst is in a predetermined catalyst purifying wind range (for example, 250 to 500° C.), making it possible to efficiently purify the NOx in the exhaust. Thus, when the quantity of heat of the exhaust increases as stated above, it is assumed that the temperature of the main NOx catalyst 55 and the sub NOx catalyst 61 will become higher than the catalyst purifying wind.

In this case, when the operating condition of the internal combustion engine 1 is in the lean/rich spike control execution range, it is assumed that the NOx in the exhaust will not be sufficiently purified by the main NOx catalyst 55 and the sub NOx catalyst 61, resulting in a deterioration in exhaust emission purification.

In view of this, when the temperature of the exhaust flowing into the main NOx catalyst 55 becomes higher than a pre-set upper limit value (for example, the upper limit value of the catalyst purifying wind) when the internal combustion engine 1 is being operated at the lean air-fuel ratio, the ECU 30 executes the NOx catalyst temperature rise restraining control as described below. That is, the ECU 30 controls the first actuator 62 and the second actuator 64 so as to fully open the first and second exhaust switching valves 63 and 65, causing the exhaust to flow through both the main NOx catalyst 55 and the sub NOx catalyst 61.

In this case, the amount of exhaust flowing through the main NOx catalyst 55 is reduced by half as compared with the case in which the exhaust from the internal combustion engine 1 is caused to flow solely through the main NOx catalyst 55, so that the quantity of heat the main NOx catalyst 55 receives from the exhaust is also reduced by half, and the catalyst temperature of the main NOx catalyst 55 is kept within the catalyst purifying wind. Similarly, the amount of exhaust flowing through the sub NOx catalyst 61 is substantially the same as the amount of exhaust flowing through the main NOx catalyst 55, so that the temperature of the sub NOx catalyst 61 does not rise excessively and is kept within the catalyst purifying wind.

Thus, in the above-described NOx catalyst temperature rise restraining control, the exhaust is purified by the main and sub NOx catalysts 55 and 61, so that the NOx purifying ratio is substantially improved as compared with the case in which the entire amount of exhaust is caused to flow through the main NOx catalyst 55.

Further, when the exhaust from the internal combustion engine 1 is caused to flow through both the main NOx catalyst 55 and the sub NOx catalyst 61, the spatial velocity of the exhaust is lowered with the reduction in the amount of exhaust flowing through the NOx catalysts 55 and 61, so that the NOx purifying ratio of the main and sub NOx catalysts is further improved.

Regarding the determination of the execution condition of the NOx catalyst temperature rise restraining control, it is possible, instead of performing it on the basis of the exhaust temperature, to provide a temperature sensor for detecting the catalyst temperature of the main NOx catalyst 55, making a determination on the basis of the detection value of this temperature sensor. Further, since the exhaust temperature can be estimated from the operating condition of the internal combustion engine 1, it is possible to make a determination according to whether the internal combustion engine 1 is in the predetermined operating condition or not. In the third embodiment, examples of the predetermined operating condition include the lean high-speed operating range and the lean high-load operating range.

Figure 11:
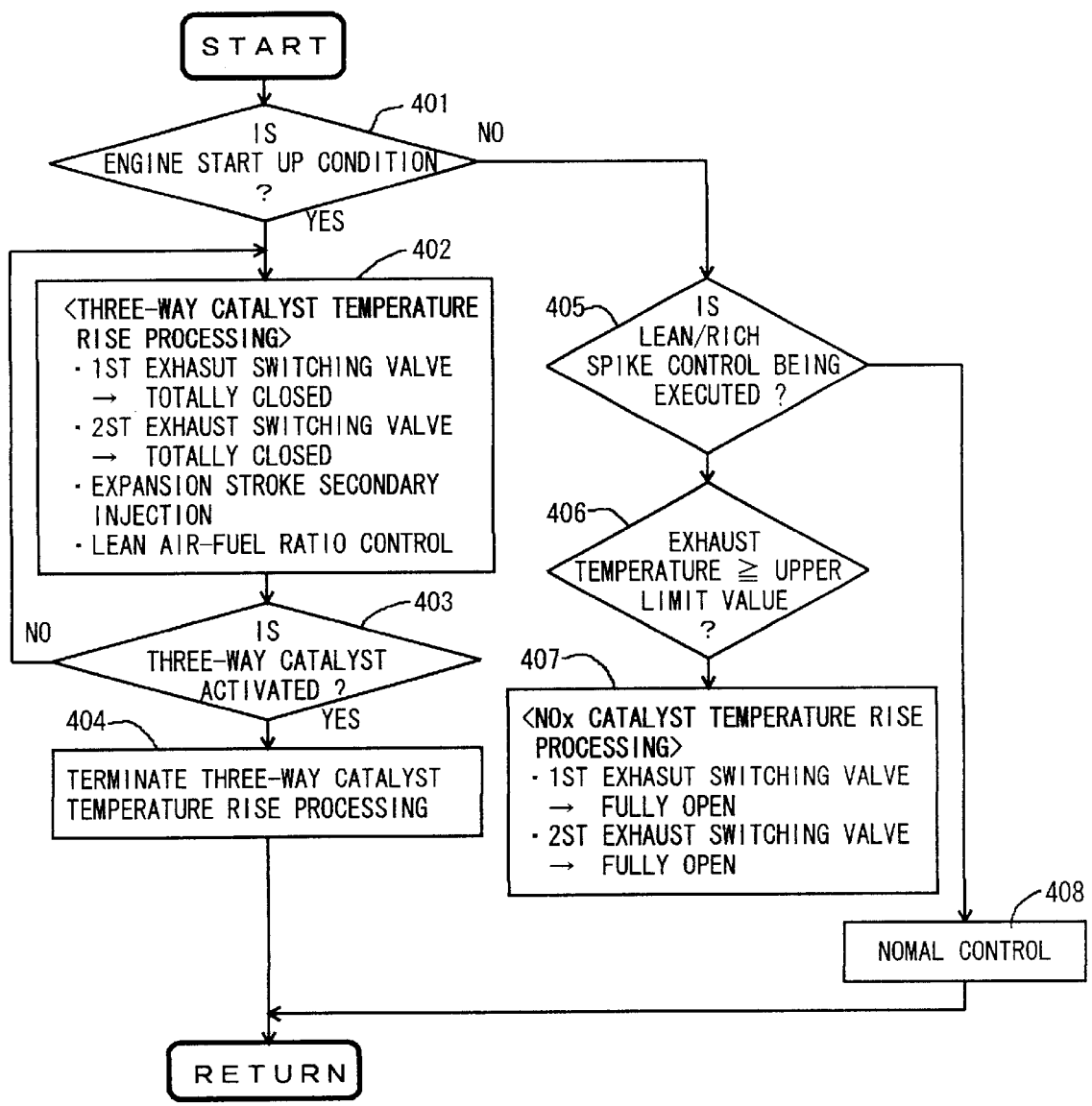
FIG. 11 is a flowchart showing the catalyst temperature rise control routine in the third embodiment.

The 3-way catalyst temperature rise control and the NOx catalyst temperature rise restraining control are realized through the execution of the catalyst temperature control routine, as shown in FIG. 11, by the ECU 30. The catalyst temperature control routine as shown in FIG. 11 is stored in advance in the ROM 32 of the ECU 30, and is a routine repeatedly executed for each predetermined time.

(Step 401)

In the catalyst temperature control routine, the ECU 30 first determines in Step 401 whether the internal combustion engine 1 is in the startup condition or not. Examples of the method for determining the startup condition of the internal combustion engine 1 includes a method of determining whether the starter switch is ON, whether the engine RPM is not higher than the predetermined speed, etc.

(Step 402)

When determined affirmative in Step 401, the process by the ECU 30 advances to Step 402, in which it executes the 3-way catalyst temperature rise processing so as to achieve early activation of the 3-way catalyst 51. That is, the ECU 30 controls the first actuator 62 and the second actuator 64 so as to make both the first and second exhaust switching valves 63 and 65 totally closed, executes the lean air-fuel ratio control of the main injection, and further executes the expansion stroke secondary injection.

(Step 403)

In Step 403, the ECU 30 determines whether the 3-way catalyst 51 has been activated or not. The activation determination of the 3-way catalyst 51 may, for example, be made as follows. When the exhaust temperature on the downstream side of the 3-way catalyst 51 as detected by the temperature sensor 66 has attained a predetermined temperature, the catalyst has been activated. When the predetermined temperature has not been reached yet, it is determined that the catalyst is not activated.

It is also possible to provide a catalyst temperature sensor for directly detecting the catalyst temperature of the 3-way catalyst 51, making the determination according to whether the catalyst temperature detected by the catalyst temperature sensor has reached the activation temperature or not.

When determined negative in Step 403, the process by the ECU 30 returns to Step 402, in which the execution of the 3-way catalyst temperature rise processing is continued. On the other hand, when determined affirmative in Step 403, the process by the ECU 30 advances to Step 404.

(Step 404)

In Step 404, the ECU 30 completes the execution of the 3-way catalyst temperature rise processing. After the execution of the processing of Step 404, the ECU 30 temporarily terminates the execution of this routine.

(Step 405)

On the other hand, when determined negataive in Step 401, the process by the ECU 30 advances to Step 405, in which it determines whether the lean/rich spike air-fuel ratio control is being executed or not.

(Step 406)

When determined affirmative in Step 405, the process by the ECU 30 advances to Step 406, in which it determines whether an output signal value (exhaust temperature) of the temperature sensor 66 is higher than the pre-set upper limit value or not.

(Step 407)

When determined affirmative in Step 406, the process by the ECU 30 advances to Step 407, in which the NOx catalyst temperature rise restraining processing is executed. That is, the ECU 30 controls the first actuator 62 and the second actuator 64 so as to retain the first and second exhaust switching valves 63 and 65 in the fully open state, and causes the exhaust to flow through the main NOx catalyst 55 and the sub NOx catalyst 61, purifying the exhaust by the main and sub NOx catalysts 55 and 61. After finishing the execution of the processing of Step 407, the ECU 30 temporarily terminates the execution of the routine.

When determined negative in Step 405, and when determined negative in Step 406, the process by the ECU 30 advances to Step 408.

(Step 408)

In Step 408, the ECU 30 controls the first and second exhaust switching valves 63 and 65 in accordance with the above-described normal exhaust switching control routine. After finishing the execution of the processing of Step 408, the ECU 30 temporarily terminates the execution of the routine.

In the third embodiment described above, if some exhaust leaks from the second exhaust switching valve 65 to the bypass pipe 60 when the engine operating condition is in the lean/rich spike control execution range, and the second exhaust switching valve 65 is totally closed so as to cause the exhaust to flow through the main NOx catalyst 55, the leaking exhaust is purified by the sub NOx catalyst 61, so that there is no deterioration in exhaust emission purification, thereby achieving an improvement in reliability in exhaust purifying.

Further, in the third embodiment, when the catalyst 51 is not activated yet as in the case in which the internal combustion engine 1 is started at the low temperature, it is possible to rapidly raise the exhaust temperature by executing the 3-way catalyst temperature rise control, whereby it is possible to achieve an early temperature rise of the 3-way catalyst 51 to the activation temperature range.

Further, in the third embodiment, when the temperature of the exhaust flowing into the main NOx catalyst 55 has become higher than the pre-set upper limit value, the amount of exhaust flowing through the main NOx catalyst 55 is reduced by half by executing the NOx catalyst temperature rise restraining control to thereby reduce by half the quantity of heat the main NOx catalyst 55 receives from the exhaust and restrain an excessive temperature rise in the main NOx catalyst 55, making it possible to retain the temperature of the main NOx catalyst 55 within the catalyst purifying wind.

In this process, the amount of exhaust flowing through the sub NOx catalyst 61 is substantially the same as the amount of exhaust flowing through the main NOx catalyst 55, so that the excessive temperature rise in the sub NOx catalyst 61 is restrained, making it possible to retain the temperature of the sub NOx catalyst 61 within the catalyst purifying wind.

As a result, the exhaust is purified by both the main and sub NOx catalysts 55 and 61 within the catalyst purifying wind, making it possible to substantially improve the NOx purifying ratio as compared with the case in which the entire amount of exhaust is caused to flow through the main NOx catalyst 55.

Further, by causing the exhaust to flow through both the main NOx catalyst 55 and the sub NOx catalyst 61, it is possible to reduce the spatial velocity of the exhaust in each NOx catalyst, making it possible to further improve the NOx purifying ratio of each NOx catalyst.

Fourth Embodiment

Next, a fourth embodiment of the exhaust emission purifying device for an internal combustion engine of the present invention will be described. Here, the construction different from that of the third embodiment will be described, and a description of the construction similar to that of the third embodiment will be omitted.

The fourth embodiment differs from the above-described third embodiment in that, in the fourth embodiment, the temperature rise control of the main NOx catalyst 55 is performed in addition to the 3-way catalyst temperature rise control and the NOx catalyst temperature rise restraining control described with reference to the third embodiment.

Here, when the engine operating condition is in the warming-up operating range after startup, the internal combustion engine 1 is operated at the stoichiometric air-fuel ratio so as to stabilize the combustion state of the internal combustion engine 1, and the first exhaust switching valve 63 is retained in the totally closed state so as to prevent the SOx released from the 3-way catalyst 51 from flowing into the main NOx catalyst 55, and the second exhaust switching valve 65 is retained in the fully open state.

In this case, the exhaust discharged from the internal combustion engine 1 passes through the sub NOx catalyst 61, and the activation of the sub NOx catalyst 61 is achieved along with the warming up of the internal combustion engine 1.

When the warming up of the internal combustion engine 1 and the activation of the sub NOx catalyst 61 are completed, the operating condition of the internal combustion engine 1 is switched from the stoichiometric operation to the lean/rich spike operation, and the first exhaust switching valve 63 is switched from the totally closed state to the fully open state, and the second exhaust switching valve 65 is switched to the totally closed state from the fully open state, so that the exhaust discharged from the internal combustion engine 1 passes through the main NOx catalyst 61.

In this process, the exhaust flows through the main NOx catalyst 61 for the first time after the engine start, so that it is assumed that the temperature of the main NOx catalyst 61 has not been raised to the catalyst purifying wind range.

When, in such a case, the exhaust of lean air-fuel ratio is discharged from the internal combustion engine 1, the HC and CO in the exhaust can be purified to some degree by the 3-way catalyst 51. However, the NOx in the exhaust cannot be sufficiently purified by the 3-way catalyst 51, and sufficient purification cannot be effected in the main NOx catalyst 61, either.

In view of this, in the fourth embodiment, the warming-up operating range of the internal combustion engine 1 is extended to the operating condition in which the NOx exhaust amount of the internal combustion engine 1 is reduced, preferably, to the operating condition in which the NOx exhaust amount is reduced to zero, after the completion of the warming up of the internal combustion engine 1 and the activation of the sub NOx catalyst 61.

That is, in the fourth embodiment, the stoichiometric air-fuel ratio operation of the internal combustion engine 1, the totally closed state of the first exhaust switching valve 63, and the fully open state of the second exhaust switching valve 65 are continued until the operating condition is attained in which the NOx exhaust amount of the internal combustion engine 1 is reduced, after the completion of the warming up of the internal combustion engine 1 and the activation of the sub NOx catalyst 61.

When the warming up of the internal combustion engine 1 and the activation of the sub NOx catalyst 61 have been completed and the internal combustion engine 1 has attained the condition in which the NOx exhaust amount is reduced, the operating condition of the internal combustion engine 1 is switched from the stoichiometric operation to the lean/rich spike operation, and the first exhaust switching valve 63 is switched from the totally closed state to the fully open state, and the second exhaust switching valve 65 is switched from the fully open state to the totally closed state.

The engine is in the operating condition in which the NOx exhaust amount is reduced when, for example, the vehicle is running at a decelerated speed, when the execution of the fuel injection control is inhibited, and when the execution of the sparking control is inhibited. In this fourth embodiment, the case will be described in which the vehicle is running at a deceleerated speed, as an example.

When the vehicle is in the decelerated running condition, the fuel injection amount of the internal combustion engine 1 is reduced, or the execution of the fuel injection is stopped (fuel cut), so that the amount of NOx generated is very small. Further, the exhaust discharaged from the internal combustion engine 1 when the vehicle is running at the decelerated speed receives the heat in the internal combustion engine 1 (for example, from the wall surfaces of the intake port, the combustion chamber 3, and the exhaust port) to become a gas with its temperature has been increased to some degree even when no combustion is being performed in the internal combustion engine 1.

Thus, when the exhaust as described above flows into the main NOx catalyst 55, there is no substantial deterioration in emission even if the main NOx catalyst 55 is not activated yet. Further, the main NOx catalyst 55 receives the heat from the exhaust to undergo temperature rise. That is, in the above-described main NOx catalyst temperature rise control, it is possible to activate the main NOx catalyst 55 while restraining the deterioration in the exhaust emission.

Examples of the method for determining the warming-up completion of the internal combustion engine 1 include a method of determining whether the temperature of the cooling water for the engine cooling is higher than a predetermined temperature or not. Examples of the method for determining the activation completion of the sub NOx catalyst 61 include a method of assuming the temperature from the operation history of the internal combustion engine 1 from the engine start (operating time, the integrated value of fuel injection amount, the integrated value of intake air amount, etc.), and a method providing a temperature sensor for directly detecting the catalyst floor temperature of the sub NOx catalyst 61 and deetermining whether the detection value of the temperature sensor is within the range of the catalyst purifying wind or not.

Figure 12:
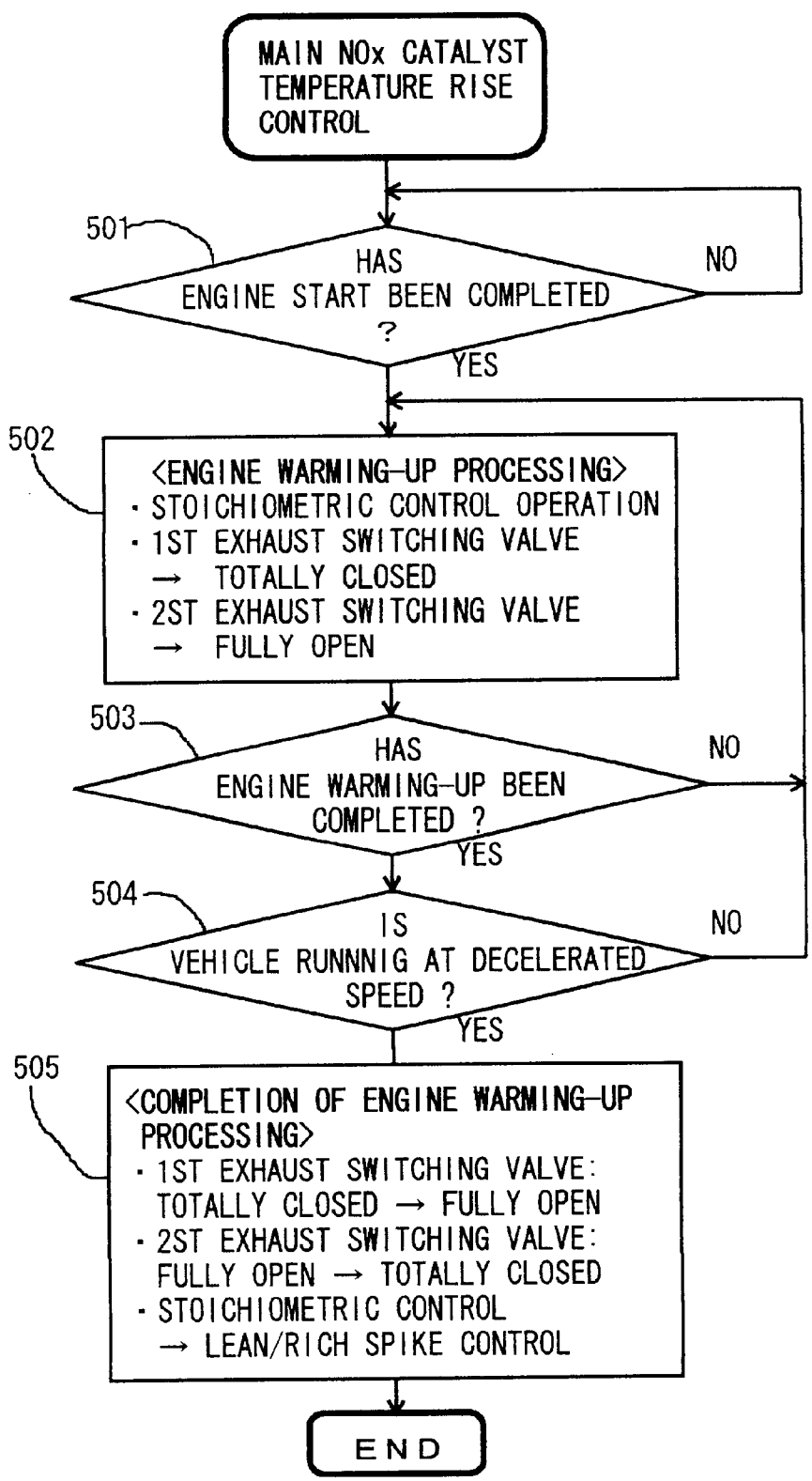
FIG. 12 is a flowchart showing the main NOx catalyst temperature rise control routine in a fourth embodiment.

In the following, the main NOx catalyst temperature rise control of the fourth embodiment will be described with reference to the flowchart of FIG. 12. The flowchart of FIG. 12 shows the main NOx catalyst temperature rise control routine. This main NOx catalyst temperature rise control routine is stored in advance in the ROM 32 of the ECU 30; it is a routine executed by the CPU 34 using the start completion of the internal combustion engine 1 as a trigger.

(Step 501)

In the main NOx catalyst temperature rise control routine, the ECU 30 first determines in Step 501 whether the starting of the internal combustion engine 1 has been completed or not.

When determined negative in Step 501, the ECU 30 executes the processing of Step 501 again. On the other hand, when determined affirmative in Step 501, the process by the ECU 30 advances to Step 502.

(Step 502)

In Step 502, the ECU 30 executes the warming up of the internal combustion engine 1. More specifically, the ECU 30 operates the internal combustion engine 1 at the stoichiometric air-fuel ratio, and controls the first actuator 62 and the second actuator 64 so as to retain the first exhaust switching valve 63 in the totally closed state, and the second exhaust switching valve 65 in the fully open state.

In this case, the exhaust of stoichiometric air-fuel ratio is discharged from the internal combustion engine 1, and the harmful gas components contained in the exhaust, such as HC, CO, and NOx, are purified by the 3-way catalyst 51 activated by the 3-way catalyst temperature rise control at the time of engine starting. The exhaust having the harmful gas components purified by the 3-way catalyst 51 passes through the sub NOx catalyst 61 in the bypass path 59 to be led to the exhaust pipe 58. In the process, the sub NOx catalyst 61 is not activated yet. However, as stated above, the harmful gas components in the exhaust have already been purified by the 3-way catalyst 51, so that there is no deterioration in exhaust emission. Further, the sub NOx catalyst 61 receives the heat from the exhaust to undergo temperatur rise.

(Step 503)

In Step 503, the ECU 30 determines whether the warming up of the internal combustion engine 1 (and the activation of the sub NOx catalyst 61) has been completed or not, by using the temperature of the engine cooling water, the operation history of the internal combustion engine 1 from the start, etc. as parameters.

When determined negative in Step 503, the process by the ECU 30 returns to Step 502, in which the execution of the warming up processing is continued. On the other hand, when determined affirmative in Step 503, the process by the ECU 30 advances to Step 504.

(Step 504)

In Step 504, the ECU 30 determines whether the vehicle is running at a decelleerated speed or not. Examples of the method of determining the decelerated speed running of the vehicle include a method of determining that the vehicle is running at the decelerated speed when the operating amount of an unilliustrated accelerator is "zero" and the vehicle speed is higher than a predetermined speed.

When determined negative in Step 504, the process by the ECU 30 returns to Step 502, in which the execution of the warming up processing is continued. On the other hand, when determined affirmative in Step 504, the process by the ECU 30 advances to Step 505.

(Step 505)

In Step 505, the ECU 30 terminates the execution of the warming up processing. More specifically, the ECU 30 switches the operating condition of the internal combustion engine 1 from the stoichiometric operation to the lean/rich spike operation, and controls the first actuator 62 and the second actuator 64 so as to switch the first exhaust switching valve 63 from the totally closed state to the fully open state, and switch the second exhaust switching valve 65 from the fully open state to the totally closed state.

In this process, the exhaust discharged from the internal combustion engine 1 flows out to the exhaust pipe 58 by way of the main NOx catalyst 55. However, the amount of NOx contained in the exhaust discharged from the internal combustion engine 1 during the decelerated speed running is very small, so that even if the main NOx catalyst 55 is not activated yet, there is no rapid deterioration in exhaust emission.

Further, the exhaust emitted from the internal combustion engine 1 during the decelerated speed running of the vehicle receives the heat from the interior of the internal combustion engine 1 even when no combustion is being effected in the internal combustion engine 1, so that when such exhaust passes through the main NOx catalyst 55, the main NOx catalyst receives the heat from the exhaust to undergo temperature rise.

Thus, in the exhaust emission purifying device of the fourth embodiment, in addition to the effect of the third embodiment, it is advantageously possible to activate the main NOx catalyst 55 while restraining deterioration in exhaust emission.

Fifth Embodiment

Next, a fifth embodiment of the exhaust emission purifying device for an internal combustion engine of the present invention will be described. Here, the construction different from that of the third embodiment will be described, and a description of the same construction will be omitted.

The fifth embodiment differs from the third embodiment in that, in the fifth embodiment, SOx poisoning regeneration control of the main NOx catalyst 55 and the sub NOx catalyst 61 is conducted in addition to the 3-way catalyst temperature rise control and the NOx catalyst temperature rise restraining control.

Here, in the third embodiment described above, the internal combustion engine 1 is not controlled so as to forcibly release the SOx absorbed by the 3-way catalyst 51, so that, depending upon the operating condition of the engine, the SOx absorbing capacity of the 3-way catalyst 51 is saturated, and the SOx in the exhaust enters the main NOx catalyst 55 without being removed by the 3-way catalyst 51, with the result that the main NOx catalyst 55 undergoes SOx poisoning.

Further, when the internal combustion engine 1 is in the stoichiometric operating condition or the rich air-fuel ratio operating condition, the SOx that has been absorbed by the 3-way catalyst 51 is released, and the first exhaust switching valve 63 is retained in the totally closed state, and the second exhaust switching valve 65 is retained in the fully open state, so that the SOx released from the 3-way catalyst 51 flows through the sub NOx catalyst 61 along with the exhaust. If in this process the temperature of the sub NOx catalyst 61 is not sufficiently high, it may happen that the SOx in the exhaust is absorbed by the sub NOx catalyst 61, causing SOx poisoning in the sub NOx catalyst 61.

In view of this, in the fifth embodiment, the degree of SOx poisoning of the main NOx catalyst 55 and the sub NOx catalyst 61 is determined, and, on the basis of the determination results, the SOx poisoning regeneration control of the main NOx catalyst 55 and the sub NOx catalyst 61 is performed.

To eliminate SOx poisoning, it is necessary to raise the temperature of the main and sub NOx catalysts 55 and 61 to a high temperature range (for example, 500° C. to 700° C.), and to make the exhaust air-fuel ratio in the main and sub NOx catalysts 55 and 61 stoichiometric or rich. Thus, if the SOx poisoning regeneration control is individually performed according to the degree of SOx poisoning in each of the main NOx catalyst 55 and the sub NOx catalyst 61, the execution frequency of the SOx poisoning regeneration control will increase, resulting in an increase in fuel consumption amount, etc. In view of this, in this fifth embodiment, the regeneration control is simultaneously performed on the main and sub NOx catalysts 55 and 61 when the degree of SOx poisoning of one of the main NOx catalyst 55 and the sub NOx catalyst 61 exceeds a predetermined standard.

Figure 13:
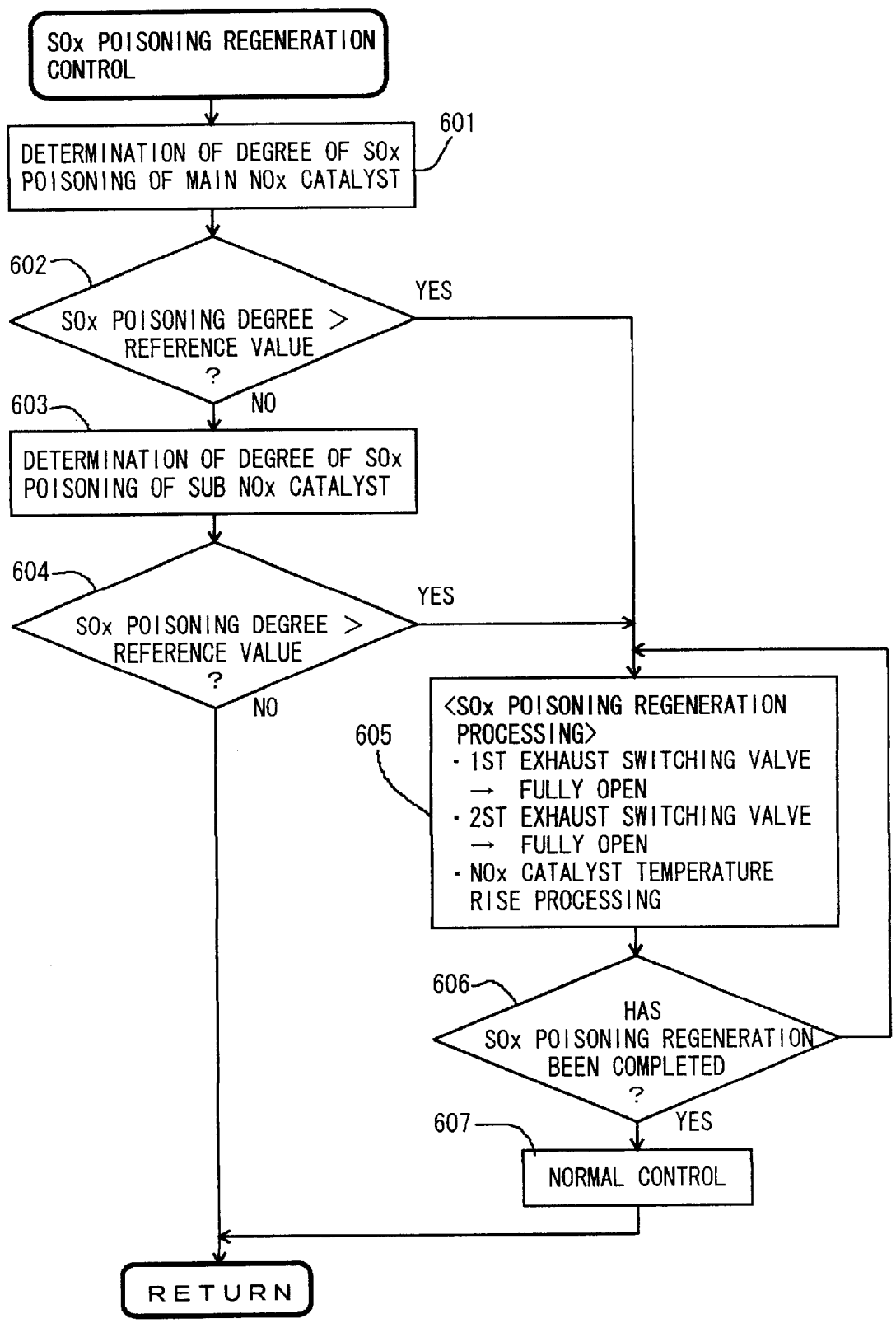
FIG. 13 is a flowchart showing a SOx poisoning regeneration control routine in a fifth embodiment.

In the following, the SOx poisoning regeneration control of the fifth embodiment will be described with reference to the flowchart of FIG. 13. The flowchart of FIG. 13 shows an SOx poisoning regeneration control routine. This SOx poisoning regeneration control routine is stored in advance in the ROM 32 of the ECU 30; it is a routine repeatedly executed by the CPU 34 for each predetermined time.

(Step 601)

In the SOx poisoning regeneration control routine, the ECU 30 first executes in Step 601 a SOx poisoning degree determination on the main NOx catalyst 55. Examples of the method for determining the degree of SOx poisoning of the main NOx catalyst 55 include one in which the air-fuel ratio of the exhaust flowing into the main NOx catalyst 55 is made lean and then switched to rich air-fuel ratio; a determination is made on the basis of the time it takes for the output signal value of the oxygen sensor (or air-fuel ratio sensor) 68 arranged on the downstream side of the main NOx catalyst 55 to be reversed from a value indicating lean air-fuel ratio to a value indicating rich air-fuel ratio, that is, the so-called rich reversal time.

(Step 602)

In Step 602, the ECU 30 determines whether the degree of SOx poisoning of the main NOx catalyst 55 determined in Step 601 is higher than a predetermined reference value. The reference value is a value obtained in advance by experiment, and is stored in the ROM 32, etc. of the ECU 30.

When determined negative Step 602, the ECU 30 determines that there is no need to perform SOx poisoning regeneration control on the main NOx catalyst 55, and the process advances to Step 603.

(Step 603)

In Step 603, the ECU 30 executes the SOx poisoning degree determining processing on the sub NOx catalyst 61. Examples of the method of determining the SOx poisoning degree of the sub NOx catalyst 61 include one in which estimation is made from the operation history of the internal combustion engine 1 or the like.

(Step 604)

In Step 604, the ECU 30 determines whether the degree of SOx poisoning of the sub NOx catalyst 61 determined in Step 603 is over a predetermined reference value or not. The reference value is a value obtained in advance by experiment, and is stored in the ROM 32, etc. of the ECU 30.

When determined negative in Step 604, the ECU 30 determines that there is no need to perform the SOx poisoning regeneration control on the sub NOx catalyst 61, and temporarily terminates the execution of the routine.

On the other hand, when determined affirmative in Step 602 or Step 604, the process by the ECU 30 advances to Step 605.

(Step 605)

In Step 605, the ECU 30 executes the SOx poisoning regeneration processing on the main and sub NOx catalysts 55 and 61. More specifically, it controls the first actuator 62 so as to retain the first exhaust switching valve 63 in the fully open state, controls the second actuator 64 so as to retain the second exhaust switching valve 65 in the fully open state, and executes NOx catalyst temperature raising processing to raise the temperature of the main and sub NOx catalysts 55 and 61 to a predetermined temperature range (500° C. to 700° C.).

Examples of the method of NOx catalyst temperature raising processing include the following methods: (1) The internal combustion engine 1 is operated at rich air-fuel ratio so as to make the air-fuel ratio of the exhaust rich, and a secondary air is supplied to the portion of the exhaust in the exhaust passage on the upstream side of the main and sub NOx catalysts 55 and 61, whereby a sufficient amount of unburned fuel components and oxygen is supplied to the main and sub NOx catalysts 55 and 61. The unburned fuel components and oxygen are caused to react (burn) in the main and sub NOx catalysts 55 and 61, thereby rapidly raising the temperature of the main and sub NOx catalysts 55 and 61. (2) The internal combustion engine 1 is operated at stoichiometric or rich air-fuel ratio and the main and sub NOx catalysts 55 and 61 are heated by a dedicated heater. (3) A part of the cylinders of the internal combustion engine 1 is operated at rich air-fuel ratio, and the rest of the cylinders is operated at lean air-fuel ratio, whereby a gas air-fuel mixture of an exhaust containing a sufficient amount of unburned fuel components and an exhaust containing a sufficient amount of oxygen is supplied to the main and sub NOx catalysts 55 and 61; the unburned fuel components and oxygen contained in the gas air-fuel mixture are caused to undergo oxidization in the main and sub NOx catalysts 55 and 61, thereby rapidly raising the temperature of the main and sub NOx catalysts 55 and 61.

When, in this hardware construction of the fifth embodiment, the above method (3) is adopted, it is desirable that the air-fuel ratio of the exhaust flowing into one of the two 3-way catalysts 51 be rich and that the air-fuel ratio of the exhaust flowing into the other be lean.

This is because when the exhaust from a cylinder operated at lean air-fuel ratio and the exhaust from a cylinder operated at rich air-fuel ratio flow into the same 3-way catalyst 51, the air-fuel ratio in 3-way catalyst 51 becomes substantially stoichiometric to cause the unburned fuel components and oxygen in the exhaust to undergo oxidization in the 3-way catalyst 51, making it impossible to cause them to undergo oxidization in the main and sub NOx catalysts 55 and 61.

When the above-described SOx poisoning regeneration processing is executed, the exhaust from the internal combustion engine 1 flows through both the main NOx catalyst 55 and the sub NOx catalyst 61, and the spatial velocity of the exhaust flowing through both the main and sub NOx catalysts 55 and 61 is less than that in the case in which the exhaust flows through only one of the main NOx catalyst 55 and the sub NOx catalyst 61, so that the SOx poisoning regeneration efficiency improves, thereby making it possible to reduce the execution time of the SOx poisoning regeneration control.

As a result, it is possible to reduce the fuel consumption amount related to the SOx poisoning regeneration control, and it is possible to reduce the time during which the main and sub NOx catalysts 55 and 61 are exposed to high temperature.

(Step 606)

In Step 606, the ECU 30 determines whether the SOx poisoning regeneration of the main and sub NOx catalysts 55 and 61 has been completed or not, in other words, whether the SOx poisoning of the main and sub NOx catalysts 55 and 61 has been eliminated or not.

Examples of the method for determining the SOx poisoning regeneration completion include the following methods: a method in which the relationship between the degree of SOx poisoning of the main and sub NOx catalysts 55 and 61 and the required time for the SOx poisoning regeneration (SOx poisoning regeneration time) is obtained in advance by experiment, and it is determined that the SOx poisoning of the main and sub NOx catalysts 55 and 61 has been eliminated when the execution time of the SOx poisoning regeneration control exceeds the SOx poisoning regeneration time; and a method in which SOx sensors adapted to output electric signals corresponding to the SOx concentration in the exhaust are arranged, in the exhaust pipe 57 on the downstream side of the main NOx catalyst 55 and in the bypass path 59 on the downstream side of the sub NOx catalyst 61, and it is determined that the SOx poisoning of the main and sub NOx catalysts 55 and 61 has been eliminated when the output signal values of the SOx sensors have become smaller than a predetermined value.

When determined negative in Step 606, the process by the ECU 30 returns to Step 605, and it continues the execution of the SOx poisoning regeneration processing. On the other hand, when determined affirmative in Step 606, the process by the ECU 30 advances to Step 607.

(Step 607)

In Step 607, the ECU 30 terminates the execution of the SOx poisoning regeneration processing, and returns the control of the internal combustion engine 1 and the control of the first and second exhaust switching valves 63 and 65 to normal. After the execution of the processing of Step 607, the ECU 30 temporarily terminates the execution of this routine.

In the fifth embodiment described above, when the degree of SOx poisoning of one of the main NOx catalyst 55 and the sub NOx catalyst 61 exceeds a predetermined reference value, the SOx poisoning regeneration is performed simultaneously on the main and sub NOx catalysts 55 and 61, so that as compared with the case in which the main NOx catalyst 55 and the sub NOx catalyst 61 are individually reactivated, it is possible to reduce the execution frequency of the SOx poisoning regeneration control.

Further, in the fifth embodiment, to simultaneously perform the SOx poisoning regeneration control on the main and sub NOx catalysts 55 and 61, the exhaust from the internal combustion engine 1 is caused to flow through both the main NOx catalyst 55 and the sub NOx catalyst 61, so that, as compared with the case in which the exhaust is caused to flow through only one of the main NOx catalyst 55 and the sub NOx catalyst 61, the spatial velocity of the exhaust in the NOx catalysts 55 and 61 is reduced, thereby improving the SOx regeneration efficiency and making it possible to reduce the execution time of the SOx poisoning regeneration control.

Thus, in the fifth embodiment, it is possible to reduce the execution frequency of the SOx poisoning regeneration control of the main and sub NOx catalysts 55 and 61, and it is possible to reduce the execution time of the SOx poisoning regeneration control, so that it is possible to reduce the fuel consumption amount related to the SOx poisoning regeneration control, and to restrain thermal deterioration of the main and sub NOx catalysts 55 and 61.

Sixth Embodiment

Next, a sixth embodiment of the exhaust emission purifying device for an internal combustion engine of the present invention will be described. Here, the construction differing from that of the fifth embodiment will be described, and a description of the construction which is the same as that of the fifth embodiment will be omitted.

The sixth embodiment differs from the fifth embodiment in that, while in the fifth embodiment the SOx poisoning regeneration control of the main NOx catalyst 55 and the the SOx poisoning regeneration control of the sub NOx catalyst 61 are started simultaneously and terminated simultaneously, in this sixth embodiment, while the SOx poisoning regeneration control of the main NOx catalyst 55 and the SOx poisoning of the sub NOx catalyst 61 are simultaneously started as in the fifth embodiment, the SOx poisoning regeneration control of the main NOx catalyst 55 is terminated when the SOx poisoning of the main NOx catalyst 55 has been eliminated, and the SOx poisoning regeneration control of the sub NOx catalyst 61 is terminated when the SOx poisoning of the sub NOx catalyst 61 has been eliminated.

This is because it is expected that when the SOx poisoning regeneration control of the main NOx catalyst 55 and the SOx poisoning regeneration control of the sub NOx catalyst 61 are simultaneously terminated, the NOx catalyst of which the SOx poisoning has been eliminated first is exposed to high temperature until the SOx poisoning of the other NOx catalyst is eliminated, thereby causing thermal deterioration of the catalyst.

Further, the sixth embodiment differs from the fifth embodiment in that, while in the fifth embodiment the control is returned to normal as soon as the SOx poisoning regeneration of the main and sub NOx catalysts 55 and 61 is completed, in this sixth embodiment, when the SOx poisoning regeneration of the main and sub NOx catalysts 55 and 61 is completed, the control is returned to normal after temporarily cooling the main and sub NOx catalysts 55 and 61.

When eliminating the SOx poisoning of the main and sub NOx catalysts 55 and 61, the temperature of the SOx poisoning of the main and sub NOx catalysts 55 and 61 is raised to a very high temperature range, so that when the control is returned to normal immediately after the elimination of the SOx poisoning and the flow of exhaust to the main NOx catalyst 55 and the sub NOx catalyst 61 is cut off, the the main NOx catalyst 55 and the sub NOx catalyst 61 are left at the high temperature, thereby causing thermal deterioration in the main NOx catalyst 55 and the sub NOx catalyst 61.

Figure 14:
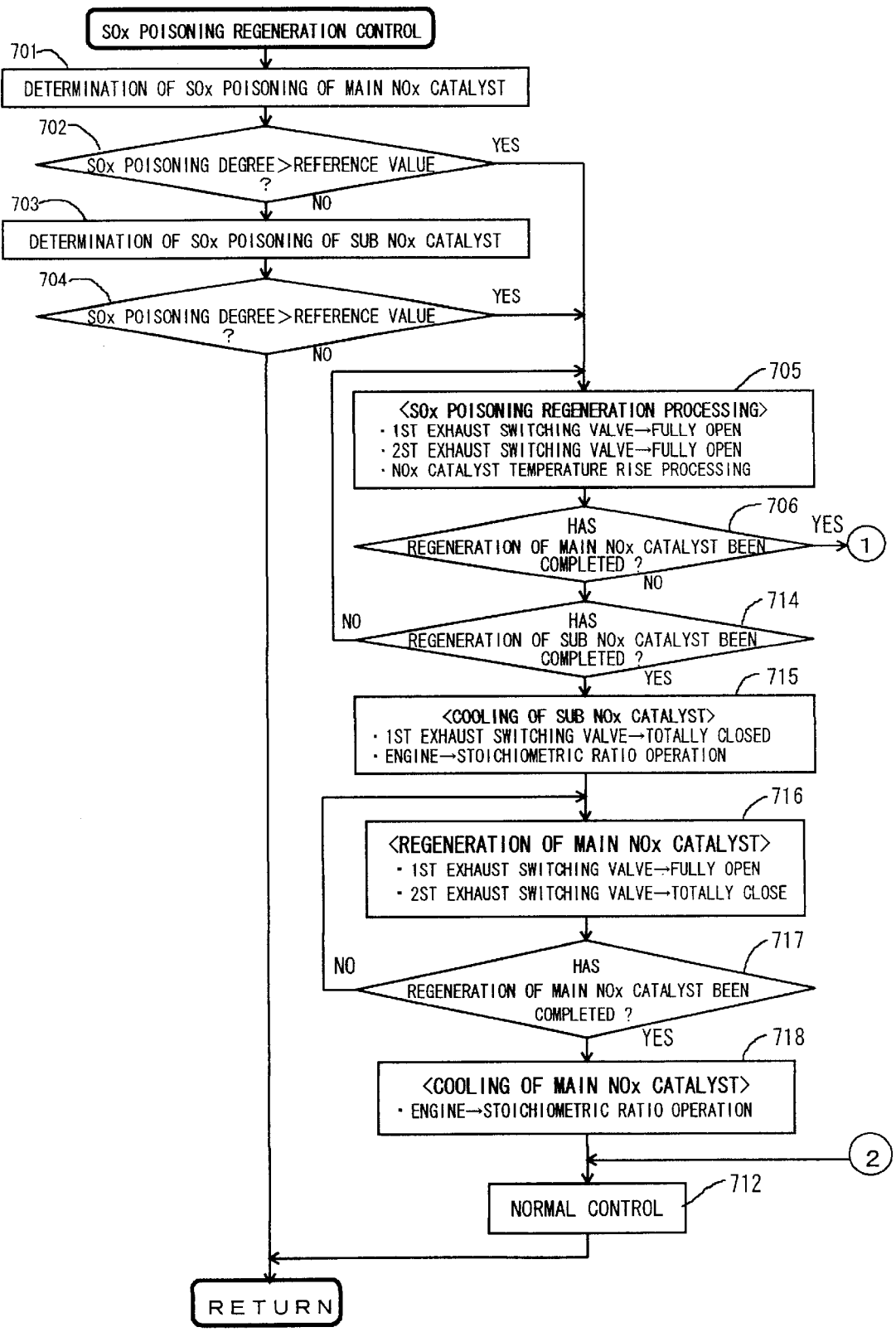
FIG. 14(A) is a flowchart (1) showing an SOx poisoning regeneration control routine in a sixth embodiment.
FIG. 14(B) is a flowchart (2) showing the SOx poisoning regeneration control routine in the sixth embodiment.
Figure 14:
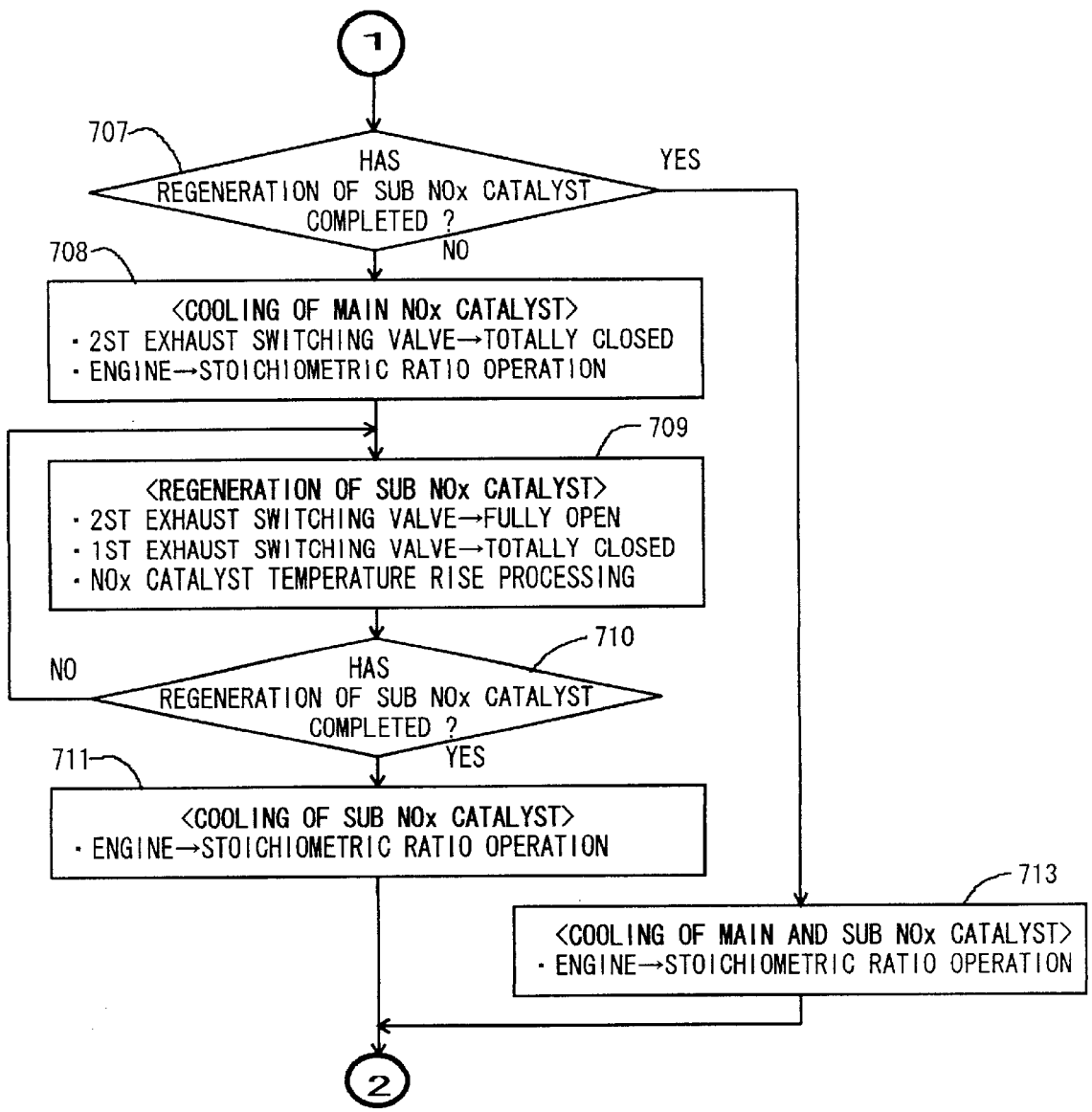

In the following, the SOx poisoning regeneration control of the sixth embodiment will be described with reference to the flowchart of FIG. 14. The flowchart of FIG. 14 shows a SOx poisoning regeneration control routine. This SOx poisoning regeneration control routine is stored in advance in the ROM 32 of the ECU 30, and is repeatedly executed by the CPU 34 for each predetermined time.

(Step 701)

In the SOx poisoning regeneration control routine, the ECU 30 first executes in Step 701 the SOx poisoning degree determination processing on the main NOx catalyst 55.

(Step 702)

In Step 702, the ECU 30 determines whether the degree of SOx poisoning of the main NOx catalyst 55 determined in step 701 exceeds a predetermined reference value or not.

When determined negative in Step 702, the ECU 30 determines that there is no need to execute SOx poisoning regeneration processing on the main NOx catalyst 55, and the process advances to Step 703.

(Step 703)

In Step 703, the ECU 30 executes the SOx poisoning degree determining processing on the sub NOx catalyst 61.

(Step 704)

In Step 704, the ECU 30 determines whether the degree of SOx poisoning of the sub NOx catalyst determined in Step 703 exceeds a predetermined reference value or not.

When determined negative in Step 704, the ECU 30 determines that there is no need to execute SOx poisoning regeneration processing on the sub NOx catalyst 61, and temporarily terminates the execution of the routine.

On the other hand, when determined affirmative in Step 702 or Step 704, that is, when it is determined that it is necessary to execute the SOx poisoning regeneration processing on the main NOx catalyst 55 or the sub NOx catalyst 61, the process by the ECU 30 advances to Step 705.

(Step 705)

In Step 705, the ECU 30 simultaneously starts the execution of SOx poisoning regeneration processing on the main NOx catalyst 55 and the execution of the SOx poisoning regeneration processing on the sub NOx catalyst 61. More specifically, the ECU 30 controls the first actuator 62 so as to retain the first exhaust switching valve 63 in the fully open state, controls the second actuator 64 so as to retain the second exhaust switching valve 65 in the fully open state, and further executes NOx catalyst temperature raising processing so as to raise the temperature of the main and sub NOx catalysts 55 and 61 to a predetermined temperature range (500° C. to 700° C.).

Examples of the method of NOx catalyst temperature raising processing include the following methods: (1) The internal combustion engine 1 is operated at rich air-fuel ratio so as to make the air-fuel ratio of the exhaust rich, and secondary air is supplied to the portion of the exhaust in the exhaust passage on the upstream side of the main and sub NOx catalysts 55 and 61, whereby a sufficient amount of unburned fuel components and oxygen is supplied to the main and sub NOx catalysts 55 and 61. The unburned fuel components and oxygen are caused to oxidize (burn) in the main and sub NOx catalysts 55 and 61, thereby rapidly raising the temperature of the main and sub NOx catalysts 55 and 61. (2) The internal combustion engine 1 is operated at stoichiometric or rich air-fuel ratio and the main and sub NOx catalysts 55 and 61 are heated by a dedicated heater. (3) Part of the cylinders of the internal combustion engine 1 is operated at rich air-fuel ratio, and the rest of the cylinders is operated at lean air-fuel ratio, whereby a gas air-fuel mixture of an exhaust containing a sufficient amount of unburned fuel components and an exhaust containing a sufficient amount of oxygen is supplied to the main and sub NOx catalysts 55 and 61; the unburned fuel components and oxygen contained in the gas air-fuel mixture are caused to undergo oxidization in the main and sub NOx catalysts 55 and 61, thereby raising the temperature of the main and sub NOx catalysts 55 and 61.

When the above-described SOx poisoning regeneration processing is executed, the exhaust from the internal combustion engine 1 flows through both the main NOx catalyst 55 and the sub NOx catalyst 61, and the spatial velocity of the exhaust flowing through the main and sub NOx catalysts 61 is reduced as compared with the case in which the exhaust is caused to flow through only one of the main NOx catalyst 55 and the sub NOx catalyst 61.

As a result, the SOx poisoning regeneration efficiency of the main and sub NOx catalysts 55 and 61 improves, so that it is possible to reduce the fuel consumption amount related to the SOx poisoning regeneration processing, and to reduce the length of time during which the main and sub NOx catalysts 55 and 61 are exposed to high temperature.

(Step 706)

In Step 706, the ECU 30 determines whether the SOx poisoning regeneration of the main NOx catalyst 55 has been completed or not. Examples of the method for determining the SOx poisoning regeneration completion of the main NOx catalyst 55 include the following methods: (1) a method in which the relationship between the degree of SOx poisoning of the main NOx catalyst 55 and the required time for the SOx poisoning regeneration (main NOx catalyst SOx poisoning regeneration time) is obtained in advance by experiment, and it is determined that the SOx poisoning of the main NOx catalyst 55 has been eliminated when the execution time of the SOx poisoning regeneration processing exceeds the SOx poisoning regeneration time for the main NOx catalyst; and (2) a method in which SOx sensors adapted to output an electric signal corresponding to the SOx concentration in the exhaust is arranged in the exhaust pipe 57 on the downstream side of the main NOx catalyst 55, and it is determined that the SOx poisoning of the main NOx catalyst 55 has been eliminated when the output signal value of the SOx sensor has become smaller than a predetermined value.

(Step 707)

When determined affirmative in Step 706, the process by the ECU 30 advances to Step 707, in which whether the SOx poisoning regeneration of the sub NOx catalyst 61 has been completed or not is determined.

Examples of the method for determining the SOx poisoning regeneration completion of the sub NOx catalyst 61 include the following methods: (1) a method in which the relationship between the degree of SOx poisoning of the sub NOx catalyst 61 and the required time for the SOx poisoning regeneration (sub NOx catalyst SOx poisoning regeneration time) is obtained in advance by experiment, and it is determined that the SOx poisoning of the sub NOx catalyst 61 has been eliminated when the execution time of the SOx poisoning regeneration processing exceeds the SOx poisoning regeneration time for the sub NOx catalyst; and (2) a method in which and the SOx sensor adapted to output an electric signal corresponding to the SOx concentration in the exhaust is arranged in the bypass path 59 on the downstream side of the sub NOx catalyst 61, and it is determined that the SOx poisoning of the sub NOx catalyst 61 has been eliminated when the deatection output signal value of the SOx sensor has become smaller than a predetermined value.

(Step 708)

When determined negative in Step 707, that is, when the SOx poisoning regeneration of the main NOx catalyst 55 has been completed and the SOx poisoning regeneration of the sub NOx catalyst 61 has not been completed yet, the process by the ECU 30 advances to Step 708, in which the execution of the SOx poisoning regeneration processing on the sub NOx catalyst 61 is temporarily terminated, and the cooling of the main NOx catalyst 55 is executed for a predetermined period of time.

More specifically, the ECU 30 interrupts the execution of the NOx catalyst temperature rise processing, and controls the second actuator 64 so as to change only the second exhaust switching valve 65 of the first and second exhaust switching valves 63 and 65, which are in the fully open state, from the fully open state to the totally closed state.

In this case, the exhaust discharged from the internal combustion engine 1 flows through the main NOx catalyst 55, and does not flow through the sub NOx catalyst 61. When the exhaust passes through the main NOx catalyst 55, the heat of the main NOx catalyst 55 is taken by the exhaust, resulting in a reduction in the temperature of the main NOx catalyst 55.

In the process, it might be possible to operate the internal combustion engine 1 at the lean air-fuel ratio to lower the temperature of the exhaust. However, immediately after the execution of the SOx poisoning regeneration processing, the temperature of the main NOx catalyst 55 can be higher than the catalyst purifying wind. If in such a condition the internal combustion engine 1 is operated at lean air-fuel ratio, the NOx in the exhaust is not purified by the main NOx catalyst 55, resulting in a deterioration in exhaust emission.

In view of this, in the sixth embodiment, when cooling the main NOx catalyst 55 after the execution of the SOx poisoning regeneration processing, the internal combustion engine 1 is operated at the stoichiometric air-fuel ratio, and the main NOx 55 is cooled while restraining the deterioration in exhaust emission.

(Step 709)

When the ECU 30 executed the above main NOx catalyst cooling processing for a predetermined period of time, the process advances to Step 709. In Step 709, the ECU 30 terminates the main NOx catalyst cooling processing, and resumes the SOx poisoning regeneration processing of the sub NOx catalyst 61.

More specifically, the ECU 30 controls the first actuator 62 so as to switch the first exhaust switching valve 63 from the fully open state to the totally closed state, and controls the second actuator 64 so as to switch the second exhaust switching valve 65 from the totally closed state to the fully open state, and further resumes the execution of the NOx catalyst temperature rise processing so as to raise the temperature of the sub NOx catalyst 65.

(Step 710)

In Step 710, the ECU 30 determines whether the SOx poisoning regeneration of the sub NOx catalyst 61 has been completed or not.

When determined negative in Step 710, the process by the ECU 30 is returned to Step 709 in order to continuously execute the SOx poisoning regeneration processing on the sub NOx catalyst 61. On the other hand, when determined affirmative in Step 710, the process by the ECU 30 advances to Step 711.

(Step 711)

In Step 711, the ECU 30 terminates the execution of the SOx poisoning regeneration processing on the sub NOx catalyst 61, and executes the cooling of the sub NOx catalyst 61 for a predetermined period of time. More specifically, the ECU 30 terminates the execution of the NOx catalyst temperature raising processing, and switches the operating condition of the internal combustion engine 1 to the stoichiometric operation while retaining the first exhaust switching valve 63 in the totally closed state, and the second exhaust switching valve 65 in the fully open state.

In this case, the exhaust discharged from the internal combustion engine 1 flows through the sub NOx catalyst 61, and does not flow through the main NOx catalyst 55. When the exhaust passes through the sub NOx catalyst 61, the heat of the sub NOx catalyst 61 is taken by the exhaust, and the temperature of the sub NOx catalyst 61 is lowered.

(Step 712)

When the ECU 30 has executed the above-described sub NOx catalyst cooling processing for a predetermined period of time, the process advances to Step 712. In Step 712, the ECU 30 returns the control of the internal combustion engine 1 and the control of the main and sub NOx catalysts 55 and 61 to normal. After the execution of the processing of Step 712, the ECU 30 temporarily terminates the execution of the routine.

On the other hand, when determined affirmative in Step 707, that is, when the SOx poisoning regeneration of both the main NOx catalyst 55 and the sub NOx catalyst 61 is completed substantially simultaneously, the process by the ECU 30 advances to Step 713.

(Step 713)

In Step 713, the ECU 30 terminates the execution of the SOx poisoning regeneration processing of the main and sub NOx catalysts 55 and 61, and executes the cooling of the main NOx catalyst and the sub NOx catalyst for a predetermined period of time in order to simultaneously cool the main and sub NOx catalysts 55 and 61. More specifically, the ECU 30 terminates the execution of the NOx catalyst temperature raising processing, and switches the operating condition of the internal combustion engine 1 to the stoichiometric operation while retaining the first exhaust switching valve 63 in the fully open state, and the second exhaust switching valve 65 in the fully open state.

In this case, the exhaust discharged from the internal combustion engine 1 flows through both the main NOx catalyst 55 and the sub NOx catalyst 61. When the exhaust passes through the main and sub NOx catalysts 55 and 61, the heat of the main and sub NOx catalysts 55 and 61 is taken by the exhaust, and the temperature of the main and sub NOx catalysts 55 and 61 is lowered.

When the ECU 30 has executed the cooling of the main NOx catalyst and the sub NOx catalyst for a predetermined period of time, the process advances to Step 712, in which the control of the internal combustion engine 1 and the control of the first and second exhaust switching valves 63 and 65 are returned to normal, and the execution of the routine is temporarily terminated.

(Step 714)

Next, when determined negative in Step 706, the process by the ECU 30 advances to Step 714, in which whether the SOx poisoning regeneration of the main NOx catalyst 55 has been completed or not is determined.

When determined negative Step 714, that is, when the SOx poisoning regeneration of both the main and sub NOx catalysts 55 and 61 has not been completed yet, the process by the ECU 30 returns to Step 705, and the SOx poisoning regeneration processing on the main and sub NOx catalysts 55 and 61 is continued. On the other hand, when determined affirmative in Step 714, that is, when the SOx poisoning regeneration of the main NOx catalyst 55 has not been completed yet, and the SOx poisoning regeneration of the sub NOx catalyst 61 has been completed, the process by the ECU 30 advances to Step 715.

(Step 715)

In Step 715, the ECU 30 temporarily interrupts the execution of the SOx poisoning regeneration processing on the main NOx catalyst 55, and executes the cooling of the sub NOx catalyst 61 for a predetermined period of time. More specifically, the ECU 30 interrupts the execution of the NOx catalyst temperature raising processing, and controls the first actuator 62 in order to switch only the first exhaust switching valve 63 of the first and second exhaust switching valves 63 and 65, which are in the fully open state, to the totally closed state, and switches the operating condition of the internal combustion engine 1 to the stoichiometric operation.

In this case, the exhaust discharged from the internal combustion engine 1 flows through the sub NOx catalyst 61, and does not flow through the main NOx catalyst 55. When the exhaust flows through the sub NOx catalyst 61, the heat of the sub NOx catalyst 61 is taken by the exhaust, and the temperature of the sub NOx catalyst 61 is lowered.

(Step 716)

When the ECU 30 has executed the cooling of the sub NOx catalyst for a predetermined period of time, the procedure advances to Step 716. In Step 716, the ECU 30 terminates the execution of the cooling of the sub NOx catalyst, and resumes the execution of the SOx poisoning regeneration processing on the main NOx catalyst 55. More specifically, the ECU 30 controls the second actuator 64 so as to switch the second exhaust switching valve 65 from the fully open state to the totally closed state, and controls the first actuator 62 so as to switch the first exhaust switching valve 63 from the totally closed state to the fully open state, and further re-starts the execution of the NOx catalyst temperature raising processing so as to raise the temperature of the main NOx catalyst 55.

(Step 717)

In Step 717, the ECU 30 determines whether the SOx poisoning regeneration of the main NOx catalyst 55 has been completed or not.

When determined negative in Step 717, the process by the ECU 30 returns to Step 716 in order to continuously execute the SOx poisoning regeneration processing on the main NOx catalyst 55. On the other hand, when determined affirmative in Step 717, the process by the ECU 30 advances to Step 718.

(Step 718)

In Step 718, the ECU 30 completes the execution of the SOx poisoning regeneration processing on the main NOx catalyst 55, and executes the cooling of the main NOx catalyst 55 for a predetermined period of time. More specifically, the ECU 30 terminates the NOx catalyst temperature raising processing, and switches the operating condition of the internal combustion engine 1 to the stoichiometric operation while retaining the first exhaust switching valve 63 in the fully open state, and the second exhaust switching valve 65 in the totally closed state.

In this case, the exhaust discharged from the internal combustion engine 1 flows through the main NOx catalyst 55, and does not flow through the sub NOx catalyst 61. When the exhaust flows through the main NOx catalyst 55, the heat of the main NOx catalyst 55 is taken by the exhaust, and the temperature of the main NOx catalyst is lessed.

When the ECU 30 executes the main NOx catalyst cooling processing for a predetermined period of time, the procedure advances to Step 712, and the control of the internal combustion engine 1 and the control of the main and sub NOx catalysts 55 and 61 are returned to normal, and the execution of the routine is temporarily terminated.

In the sixth embodiment described above, when the SOx poisoning degree of at least one of the main NOx catalyst 55 and the sub NOx catalyst 61 exceeds a predetermined reference value, the SOx poisoning regeneration control of the main NOx catalyst 55 and the SOx poisoning regeneration control of the sub NOx catalyst 61 are simultaneously conducted, so that, as compared with the case in which the main NOx catalyst 55 and the sub NOx catalyst 61 are individually regenerated, it is possible to reduce the execution frequency of the SOx poisoning regeneration control.

Further, in the sixth embodiment, in the SOx poisoning regeneration control of the main and sub NOx catalysts 55 and 61, the exhaust from the internal combustion engine 1 is caused to flow through both the main and sub NOx catalysts 55 and 61, so that, as compared with the case in which the exhaust is caused to flow only through one of the main NOx catalyst 55 and the sub NOx catalyst 61, the spatial velocity of the exhaust in the NOx catalysts 55 and 61 is reduced, and the SOx regeneration efficiency is improved, making it possible to reduce the execution time of the SOx poisoning regeneration control.

Further, in the sixth embodiment, the SOx poisoning regeneration control of the main NOx catalyst 55 is terminated when the SOx poisoning of the main NOx catalyst is eliminated, and the SOx poisoning regeneration control of the sub NOx catalyst 61 is terminated when the SOx poisoning of the sub Nox catalyst 61 is eliminated, so that there is no danger of the NOx catalyst of which SOx poisoning is eliminated earlier being unnecessarily exposed to high temperature.

Further, in the sixth embodiment, when the SOx poisoning regeneration of the main NOx catalyst 55 and the sub NOx catalyst 61 is completed, the main NOx catalyst 55 and the sub NOx catalyst 61 are cooled, so that the main NOx catalyst 55 and the sub NOx catalyst 61 are not left at high temperature, thereby preventing thermal deterioration in the main and sub NOx catalysts 55 and 61.

Thus, in this sixth embodiment, in addition to the effect of the fifth embodiment described above, it is advantageously possible to prevent thermal deterioration of the main and sub NOx catalysts 55 and 61 due to the SOx poisoning regeneration control.

Seventh Embodiment

Next, a seventh embodiment of the exhaust emission purifying device for an internal combustion engine of the present invention will be described. Here, the construction differing from that of the third embodiment will be described, and a description of the construction similar to that of the third embodiment will be omitted.

The seventh embodiment differs from the third embodiment in that, while in the third embodiment when the temperature of the main NOx catalyst 55 becomes higher than a predetermined temperature when the engine operating condition is in the lean/rich spike control execution range, the NOx catalyst temperature rise restraining control is immediately executed in order to prevent excessive temperature rise in the main NOx catalyst 55, in this seventh embodiment, when the temperature of the main NOx catalyst 55 becomes higher than a predetermined temperature when the engine operating condition is in the lean/rich spike control execution range, the NOx catalyst temperature rise restraining control is executed after the SOx poisoning regeneration control of the sub NOx catalyst 61 is executed.

In normal control of the exhaust emission purifying device, when the engine operating condition is in the stoichiometric control execution range or the rich air-fuel ratio control execution range, and the temperature of the 3-way catalyst 51 satisfies the SOx releasing condition, the first exhaust switching valve 63 is retained in the totally closed state, and the second exhaust switching valve 65 is retained in the fully open state so as to prevent the SOx released from the 3-way catalyst 51 from flowing into the main NOx catalyst 55, and the entire amount of exhaust flows through the sub NOx catalyst 61, so that the sub NOx catalyst 61 is more subject to the SOx poisoning than the main NOx catalyst 55, and when the NOx catalyst temperature rise restraining control is executed with the sub NOx catalyst 61 undergoing the SOx poisoning, the NOx contained in the exhaust flowing through the sub NOx catalyst 61 is not sufficiently purified, resulting in a deterioration in exhaust emission.

Figure 15:
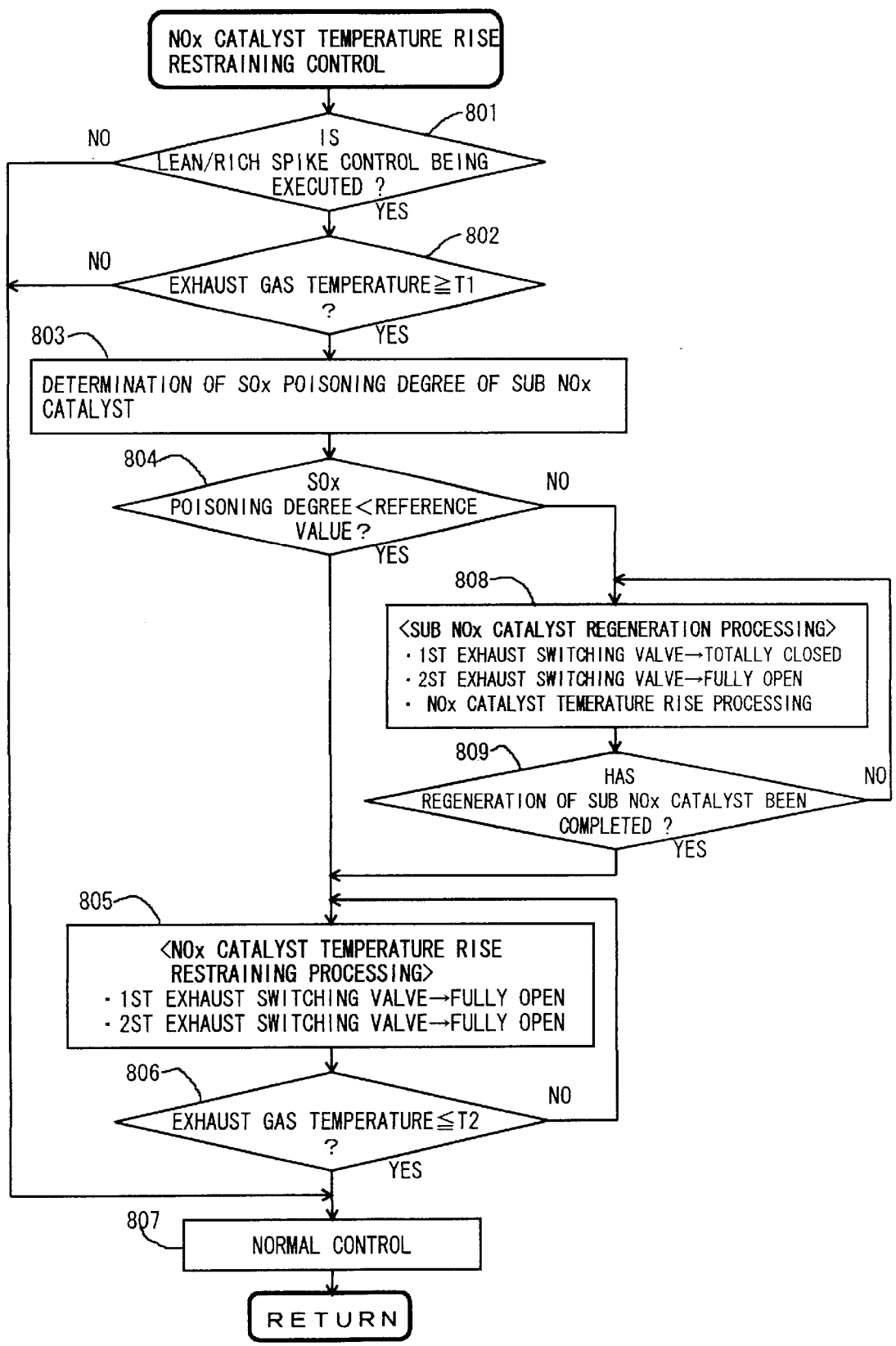
FIG. 15 is a flowchart showing a NOx catalyst temperature rise restraining control routine in a seventh embodiment.

In the following, the catalyst temperature rise restraining control of the seventh embodiment will be described with reference to the flowchart of FIG. 15. The flowchart of FIG. 15 shows a NOx catalyst temperature rise restraining control routine. This NOx catalyst temperature rise restraining control routine is stored in the ROM 32 of the ECU 30 in advance, and is repeatedly executed by the CPU 34 for each predetermined time.

(Step 801)

In the catalyst temperature rise restraining control routine, the ECU 30 first determines in Step 801 whether the operating condition of the internal combustion engine 1 is in the lean/rich spike control execution range or not.

(Step 802)

When determined affirmative in Step 801, the process by the ECU 30 advances to Step 802, in which a determination is made as to whether the output signal value (exhaust temperature) of the temperature sensor 66 is higher than a pre-set upper limit value $T_1$ (for example, the upper limit value of the catalyst purification wind of the main NOx catalyst 55) or not.

(Step 803)

When determined affirmative in Step 802, the ECU 30 determines that it is necessary to execute NOx catalyst temperature rise restraining processing so as to prevent excessive temperature rise in the main NOx catalyst 55, and the procedure advances to Step 803. In Step 803, the ECU 30 executes the SOx poisoning degree determining processing on the sub NOx catalyst 61. Examples of the method of determining the SOx poisoning degree of the sub NOx catalyst 61 include one in which estimation is made from the operation history of the internal combustion engine 1, etc.

(Step 804)

In Step 804, the ECU 30 determines whether the SOx poisoning degree of the sub NOx catalyst 61 is less than a predetermined reference value or not. The reference value is a value obtained in advance by experiment, and is stored in the ROM 32.

(Step 805)

When determined affirmative in Step 804, the ECU 30 determines that there is no need to perform the SOx poisoning regeneration of the sub NOx catalyst 61, and the procedure advances to Step 805. In Step 805, the ECU 30 executes NOx catalyst temperature rise restraining processing on the main NOx catalyst 55.

More specifically, the ECU 30 controls the first actuator 62 and the second actuator 64 so as to retain the first and second exhaust switching valves 63 and 65 in the fully open state, causing the exhaust to flow through the main NOx catalyst 55 and the sub NOx catalyst 61.

In this case, the exhaust from the internal combustion engine 1 flows through both the main NOx catalyst 55 and the sub NOx catalyst 61, and the amount of exhaust flowing through the main NOx catalyst 55 is smaller than that in the case in which the exhaust from the internal combustion engine 1 flows solely through the main NOx catalyst 55, so that the quantity of heat the main NOx catalyst 55 receives from the exhaust decreases, and there is no excessive temperature rise in the main NOx catalyst 55.

Further, when the amount of exhaust flowing through the main NOx catalyst 55 decreases as a result of the exhaust from the internal combustion engine 1 flowing through both the main NOx catalyst 55 and the sub NOx catalyst 61, the spatial velocity of the exhaust in the main NOx catalyst 55 is reduced, so that the NOx purification ratio of the main NOx catalyst 55 improves. Similarly, the amount of exhaust flowing through the sub NOx catalyst 61 is smaller than that in the case in which the exhaust from the internal combustion engine 1 flows solely through the sub NOx catalyst 61, so that the spatial velocity of the exhaust in the sub NOx catalyst 61 is also reduced, and the NOx purification ratio of the sub NOx catalyst 61 is also improved.

(Step 806)

In Step 806, the ECU 30 determines whether the output signal value (exhaust temperature) of the temperature sensor 66 has become lower than a predetermined temperature $T_2$ or not. The predetermined temperature $T_2$ is a value smaller than the upper limit value $T_1$ and not smaller than the lower limit value of the catalyst purification wind of the main NOx catalyst 55.

When determined negative in Step 806, the process by the ECU 30 returns to Step 805 to continue the execution of the NOx catalyst temperature rise restraining processing. On the other hand, when determined affirmative in Step 806, the process by the ECU 30 advances to Step 807.

(Step 807)

In Step 807, the ECU 30 terminates the execution of the NOx catalyst temperature rise restraining processing, and returns the control of the first and second exhaust switching valves 63 and 65 to normal. When the processing of Step 807 has been executed, the ECU 30 temporarily terminates the execution of the routine.

On the other hand, when determined negative in Step 804, the ECU 30 determines that it is necessary to perform the SOx poisoning regeneration on the sub NOx catalyst 61 before executing the NOx catalyst temperature rise restraining processing, and the procedure advances to Step 808.

(Step 808)

In Step 808, the ECU 30 executes the SOx poisoning regeneration processing on the sub NOx catalyst 61. More specifically, the ECU 30 controls the first actuator 62 so as to bring the first exhaust switching valve 63 into the totally closed state, and controls the second actuator 64 so as to bring the second exhaust switching valve 65 into the fully open state, and further executes the NOx catalyst temperature raising processing so as to raise the temperature of the sub NOx catalyst 61 to a predetermined temperature range (500° C. to 700° C.).

Examples of the method of NOx catalyst temperature raising processing include the following methods: (1) The internal combustion engine 1 is operated at rich air-fuel ratio so as to make the air-fuel ratio of the exhaust rich, and the secondary air is supplied to the portion of the exhaust in the exhaust passage on the upstream side of the main and sub NOx catalysts 55 and 61, whereby a sufficient amount of unburned fuel components and oxygen is supplied to the main and sub NOx catalysts 55 and 61. The unburned fuel components and oxygen are caused to oxidize (burn) in the main and sub NOx catalysts 55 and 61, thereby rapidly raising the temperature of the main and sub NOx catalysts 55 and 61. (2) The internal combustion engine 1 is operated at stoichiometric or rich air-fuel ratio and the main and sub NOx catalysts 55 and 61 are heated by a dedicated heater. (3) Part of the cylinders of the internal combustion engine 1 is operated at rich air-fuel ratio, and the rest of the cylinders is operated at lean air-fuel ratio, whereby a gas air-fuel mixture of an exhaust containing a sufficient amount of unburned fuel components and an exhaust containing a sufficient amount of oxygen is supplied to the main and sub NOx catalysts 55 and 61; the unburned fuel components and oxygen contained in the gas air-fuel mixture are caused to undergo oxidization in the main and sub NOx catalysts 55 and 61, thereby raising the temperature of the main and sub NOx catalysts 55 and 61.

(Step 809)

In Step 809, the ECU 30 determines whether the SOx poisoning regeneration of the sub NOx catalyst 61 has been completed or not. Examples of the method for determining the SOx poisoning regeneration completion of the sub NOx catalyst 61 include the following methods: (1) a method in which the relationship between the degree of SOx poisoning of the sub NOx catalyst 61 and the required time for the SOx poisoning regeneration (sub NOx catalyst SOx poisoning regeneration time) is obtained in advance by experiment, and it is determined that the SOx poisoning of the sub NOx catalyst 61 has been eliminated when the execution time of the SOx poisoning regeneration processing exceeds the SOx poisoning regeneration time for the sub NOx catalyst 61; and (2) a method in which a SOx sensor adapted to output an electric signal corresponding to the SOx concentration in the exhaust is arranged in the bypass pipe 59 on the downstream side of the sub NOx catalyst 61, and it is determined that the SOx poisoning of the sub NOx catalyst 61 has been eliminated when the detected output signal value of the SOx sensor has become smaller than a predetermined value.

When determined negative in Step 809, the process by the ECU 30 returns to Step 808, in which the execution of the SOx poisoning regeneration processing of the sub NOx catalyst 61 is continued. On the other hand, when determined affirmative in Step 809, the ECU 30 successively executes the processings of Step 805, Step 806, and Step 807 to prevent exececssive temperature rise in the main NOx catalyst 55.

In the seventh embodiment described above, in addition to the effect of the above-described third embodiment, it is possible to improve the NOx purification ratio of the main NOx catalyst 55 and the sub NOx catalyst 61 while preventing excessive temperature rise in the main NOx catalyst 55.

Eighth Embodiment

Figure 16:
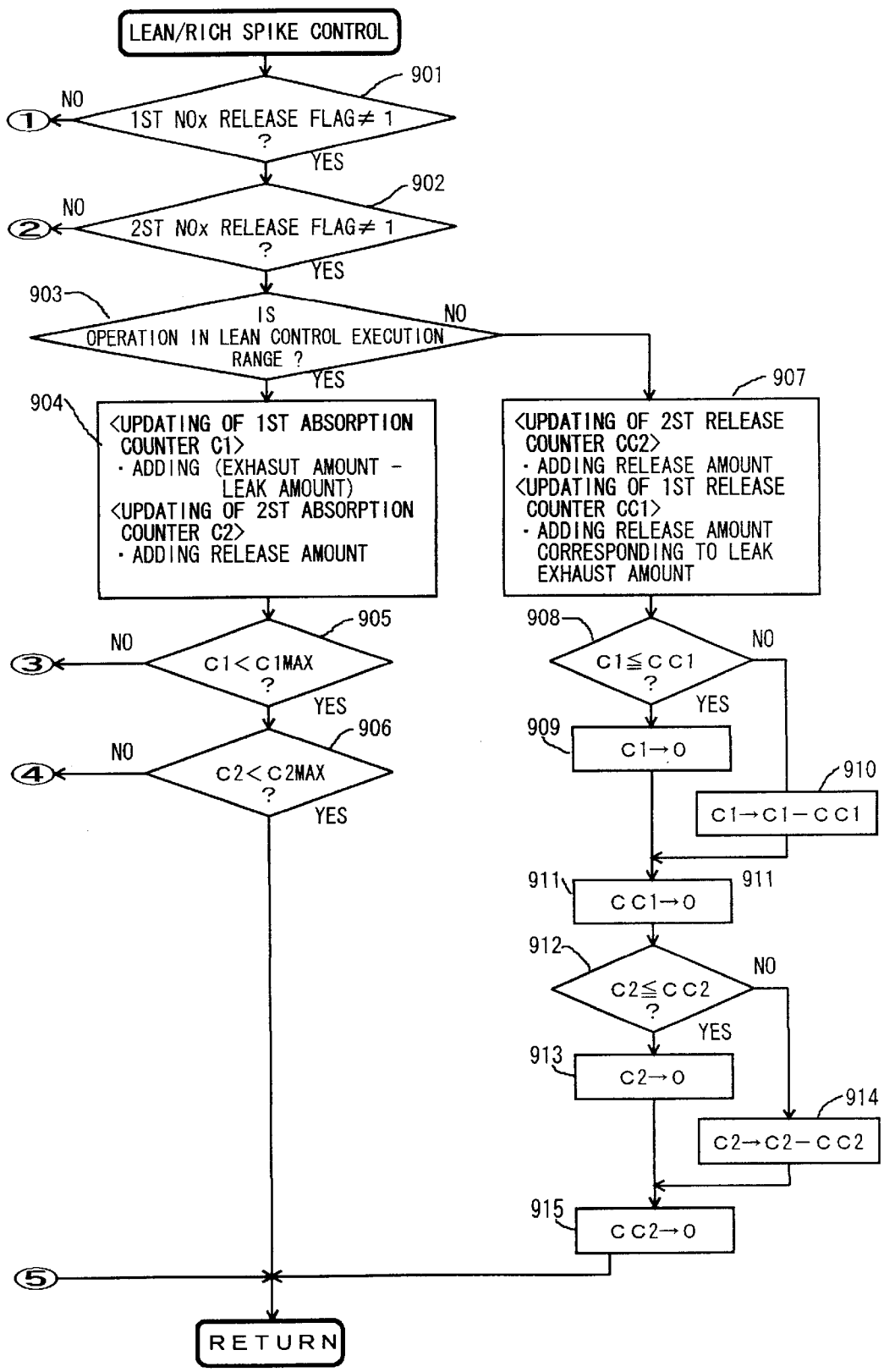
FIG. 16(A) is a flowchart (1) showing the rich spike control routine in an eighth embodiment.
FIG. 16(B) is a flowchart (2) showing the rich spike control routine in the eighth embodiment.

Next, an eighth embodiment of the exhaust emission purifying device for an internal combustion engine of the present invention will be described with reference to FIG. 16. Here, the construction differing from that of the third embodiment will be described, and a description of the construction similar to the third embodiment will be omitted.

The eighth embodiment differs from the third embodiment in that, while in the third embodiment the exhaust leaking to the sub NOx catalyst 61 through the second exhaust switching valve 65 is not taken into account when estimating the amount of NOx absorbed by the main NOx catalyst 55 in the lean/rich spike control, in this eighth embodiment, the amount of NOx absorbed by the main NOx catalyst 55 is estimated while taking into account the exhaust leaked to the sub NOx catalyst 61.

When the amount of NOx absorbed by the main NOx catalyst 55 is estimated without taking into account the exhaust leaking to the sub NOx catalyst 61, it is to be expected that the estimated value will be larger than the actual NOx absorption amount. If the lean/rich spike control is executed on the basis of such an estimated value, rich spike control is executed despite the fact that the NOx absorbing capacity of the main NOx catalyst 55 is not saturated yet, so that it is impossible to efficiently utilize the NOx absorbing capacity of the main NOx catalyst 55, unnecessarily increasing the execution frequency of the rich spike control to thereby cause a deterioration in the fuel consumption amount.

Further, the eighth embodiment differs from the third embodiment in that, while in the third embodiment the lean/rich spike control is executed solely for the main NOx catalyst 55, in this eighth embodiment, the lean/rich spike control is executed for both the main NOx catalyst 55 and the sub NOx catalyst 61.

This is because of the fact when the engine operating condition is in the lean/rich spike control execution range, part of the exhaust leaks to the sub NOx catalyst 61 through the second exhaust switching valve 65 to cause NOx in the exhaust to be absorbed by the sub NOx catalyst 61, so that it is necessary to release and clean the NOx absorbed by the sub NOx catalyst 61.

In the following, the lean/rich spike control in the eighth embodiment will be specifically described. The flowchart of FIG. 16 shows a lean/rich spike control routine. This lean/rich spike control routine is stored in advance in the ROM 32 of the ECU 30, and is repeatedly executed for each predeterrmined time by the CPU 34.

(Step 901)

In the lean/rich spike control routine, the ECU 30 first gains access in Step 901 to a first NOx release flag storage region set previously in a predetermined region of the RAM 33, and determines whether "1" is stored or not.

The first NOx release flag storage region is a region in which "1" is stored when the amount of NOx absorbed by the main NOx catalyst 55 is higher than the NOx limit value that can be absorbed by the main NOx catalyst 55, and in which "0" is stored when the amount of NOx absorbed by the main NOx catalyst 55 is lower than the limit value.

(Step 902)

When determined affirmative in Step 901, that is, when it is determined that "0" is stored in the first NOx release flag storage region of the RAM 33, the ECU 30 proceeds to Step 902. In Step 902, the ECU 30 gains access to a second NOx release flag storage region previously set in a predetermined region of the RAM 33, and determines whether "1" is stored or not.

A second NOx release flag storage region is a region in which "1" is stored when the amount of NOx absorbed by the sub NOx catalyst 61 is higher than the NOx limit value that can be absorbed by the sub NOx catalyst 61, and in which "0" is stored when the amount of NOx absorbed by the sub NOx catalyst 61 is less than the limit value.

(Step 903)

When determined affirmative in Step 902, that is, when it is determined that "0" is stored in the second NOx release flag storage region of the RAM 33, the process by the ECU 30 advances to Step 903. In Step 903, the ECU 30 determines whether the engine operating condition is in the lean air-fuel ratio control execution range or not.

(Step 904)

When determined affirmative in Step 903, the ECU 30 proceeds to Step 904. In Step 904, the entire amount of NOx absorbed by the main NOx catalyst 55 and the entire amount of NOx absorbed by the sub NOx catalyst 61 are computed on the basis of the amount of exhaust leaking to the sub NOx catalyst 61 through a second exhaust switching valve 65.

More specifically, the ECU 30 first calculates the amount of NOx discharged from the internal combustion engine 1 during a fixed period (hereinafter referred to as engine discharge NOx amount) using the engine speed, fuel injection amount, etc. as parameters. An example of a method for calculating the engine discharge NOx amount is that calculation is made using the engine speed, intake air amount, and fuel injection amount as parameters. It is also possible to obtain a relationship between the engine speed, intake air amount, fuel injection amount, and the engine discharge NOx amount in advance by experiment, and store the relationship in the ROM 32 in the form of a map.

Subsequently, the ECU 30 calculates the amount of NOx leaked to the sub NOx catalyst 61 in a fixed period of time (hereinafter referred to as NOx leak amount). An example of a method for calculating the NOx leak amount is that calculation is made using an exhaust flow rate and the engine exhaust NOx amount as parameters since the NOx leak amount is considered to vary according to the exhaust flow rate (exhaust pressure) and the engine exhaust NOx amount.

It is also possible to obtain the relationship between the exhaust flow rate, the engine exhaust NOx amount, and the NOx leak amount in advance by experiment, storing the relationship in the ROM 32 in the form of a map. Further, since the exhaust pressure and the exhaust flow rate can be estimated from the parameters indicating the engine operating condition, such as engine speed and intake air amount, the above-mentioned map may be one showing the relationship between the engine operating condition, the engine exhaust NOx amount, and the NOx leak amount.

The ECU 30 calculates the engine exhaust NOx amount and the NOx leak amount by the above-described method. The ECU 30 subtracts the NOx leak amount from the engine exhaust NOx amount to thereby calculate the NOx absorption amount of the main NOx catalyst 55. The ECU 30 adds the thus calculated NOx absorption amount to a counter value of a first absorption counter C1.

The first absorption counter C1 is formed by a storage region set in a predetermined region of the RAM 33, or a register or the like contained in the CPU 34, and retains the integrated value of the amount of NOx absorbed by the main NOx catalyst 55, in other words, the entire amount of NOx absorbed by the main NOx catalyst 55.

On the other hand, the ECU 30 adds the NOx leak amount to the counter value of a second absorption counter C2. The second absorption counter C2 is formed of a storage region set in a predetermined region of the RAM 33, a register contained in the CPU 34 or the like, and retains the integrated value of the amount of NOx absorbed by the sub NOx catalyst 61, that is, the entire amount of NOx absorbed by the sub NOx catalyst 61.

(Step 905)

The ECU 30 reads the counter value :C1 of the first absorption counter C1 updated in Step 904, and compares the counter value :C1 with the limit value :C1MAX of the amount of NOx that can be absorbed by the main NOx catalyst 55. More specifically, the ECU 30 determines whether the counter value :C1 is less than the limit value : C1MAX or not.

(Step 906)

When determined affirmative in Step 905, the ECU 30 determines that the entire NOx absorption amount of the main NOx catalyst 55 has not reached the limit value and that there is no need to execute rich spike control on the main NOx catalyst 55, and the procedure advances to Step 906. In Step 906, the ECU 30 reads the counter value :C2 of the second absorption counter C2 updated in Step 904, and compares the counter value :C2 with the limit value :C2MAX of the amount of NOx that can be absorbed by the sub NOx catalyst 61. More specifically, the ECU 30 makes a determination as to whether the counter value :C2 is less than the limit value :C2MAX.

When determined affirmative in Step 906, the ECU 30 determines that the entire NOx absorption amount of the sub NOx catalyst 61 has not reached the limit value yet, and that there is no need to execute the rich spike control on the sub NOx catalyst 61, and temporarily terminates the execution of the routine.

(Step 907)

Next, when determined negaative in Step 903, the ECU 30 determines that the engine operating condition is not in the lean air-fuel ratio control execution range, in other words, the engine operating condition is in the stoichiometric control execution range (or rich air-fuel ratio control execution range), and that the first exhaust switching valve 63 is retained in the totally closed state and the second exhaust switching valve 65 in the fully open state, and the procedure advances to Step 907. In Step 907, the ECU 30 computes the entire amount of NOx released from the main NOx catalyst 55 and the entire amount of NOx released from the sub NOx catalyst 61 on the basis of the amount of exhaust leaked to the main NOx catalyst 55 through the first exhaust switching valve 63.

That is, when the engine operating condition is in the stoichiometric control execution range (or the rich air-fuel ratio control execution range), the first exhaust switching valve 63 is retained in the totally closed state and the second exhaust switching valve 65 is retained in the fully open state, so that the exhaust of stoichiometric or rich air-fuel ratio discharged from the internal combustion engine 1 mainly flows through the sub NOx catalyst 61. However, since the sealing property of the first exhaust switching valve 63 is not perfect, a small amount of exhaust leaks to the main NOx catalyst 55 through the first exhaust switching valve 63.

Thus, it is assumed that when the engine operating condition is in the stoichiometric control or rich air-fuel ratio control execution range, most of the exhaust flows through the sub NOx catalyst 61, so that the NOx that has been absorbed by the sub NOx catalyst 61 is released and reduced, and the remaining small amount of exhaust flows through the main NOx catalyst 55, and the NOx that has been absorbed by the main NOx catalyst 55 is released and reduced.

Thus, the ECU 30 first calculates the amount of unburned fuel components discharged from the internal combustion engine 1 during a fixed period of time (herein after referred to as the engine exhaust fuel component amount) by using the engine speed, intake air amount, etc. as parameters. An example of a method for calculating the engine exhaust fuel component amount is that calculation is performed by using the engine speed, intake air amount, and fuel injection amount as parameters. It is also possible to obtain a relationship between the engine speed, intake air amount, and fuel injection amount in advance by experiment, and to store the relationship in the ROM 32 in the form of a map.

Subsequently, the ECU 30 calculates the amount of unburned fuel components leaking to the main NOx catalyst 55 during a fixed period of time, that is, the amount of unburned fuel components flowing into the main NOx catalyst 55 during a fixed period of time (hereinafter referred to as the main fuel component amount). The ECU 30 subtracts the main fuel component amount from the engine exhaust fuel component amount to thereby calculate the amount of unburned fuel components (sub fuel component amount) flowing into the sub NOx catalyst 61.

The ECU 30 calculates the amount of NOx released and reduced when the main fuel component amount flows into the main NOx catalyst 55 (hereinafter referred to as the first NOx release amount), and the amount of NOx released and reduced when the sub fuel component amount flows into the sub NOx catalyst 61 (hereinafter referred to as the second NOx release amount).

The ECU 30 adds the first NOx release amount calculated as described above to the counter value of a first release counter CC1, and adds the second NOx release amount to a second release counter CC2.

The first release counter CC1 is formed by a storage region set in a predetermined region of the PAM 33, a register contained in the CPU 34 or the like, and retains the integrated value of the amount of NOx released and reduced in the main NOx catalyst 55, in other words, the entire amount of NOx released and reduced in the main NOx catalyst 55. On the other hand, the second release counter CC2 is formed by a storage region set in a predetermined region of the RAM 33, a register contained in the CPU 34 or the like, and retains the integrated value of the amount of NOx released and reduced in the sub NOx catalyst 61, that is, the entire amount of NOx released and reduced in the sub NOx catalyst 61.

(Step 908)

The ECU 30 reads the counter value :CC1 of the first release counter CC1 updated in Step 907, and reads the counter value :C1 of the above-described first absorption counter C1, and determines whether the counter value :CC1 of the first release counter CC1 is not smaller than the counter value :C1 of the above-described first absorption counter C1.

(Step 909)

When determined affirmative in Step 908, the ECU 30 proceeds to Step 909, and resets the counter value :C1 of the first absorption counter C1 to "0".

(Step 910)

When determined negative in Step 908, the ECU 30 proceeds to Step 910, and the value (C1–CC1) obtained by subtracting the counter value :CC1 of the first release counter CC1 from the counter value :C1 of the first absorption counter C1, is regarded as the new counter value of the first absorption counter C1.

(Step 911)

After the execution of the processing of Step 909 or Step 910, the ECU 30 proceeds to Step 911. In Step 911, the ECU 30 resets the counter value :CC1 of the first release counter CC1 to "0".

(Step 912)

The ECU 30 reads the counter value :CC2 of the second release counter CC2 updated in Step 907, and reads the counter value :C2 of the second release counter C2, and makes a determination as to whether the counter value :CC2 of the second release counter CC2 is higher than the counter value :C2 of the second absorption counter C2.

(Step 913)

When determined affirmative in Step 912, the ECU 30 proceeds to Step 913, and resets the counter value :C2 of the second absorption counter C2 to "0".

(Step 914)

When determined negative in Step 912, the ECU 30 proceeds to Step 914, and the value (C2–CC2) obtained by subtracting the second counter value :CC2 of the second release counter C2 from the counter value :C2 of the second absorption counter C2, is regarded as the new counter value of the second absorption counter C2.

(Step 915)

After the execution of the processing of Step 913 or Step 914, the ECU 30 proceeds to Step 915. In Step 915, the ECU 30 resets the counter value :CC2 of the second release counter CC2 to "0". After the execution of the processing of Step 915, the ECU 30 temporarily terminates the execution of the routine.

(Step 916)

On the other hand, when determined negative in Step 905, the ECU 30 proceeds to Step 916. In Step 916, the ECU 30 changes the value of the first NOx release flag storage region from "0" to "1".

(Step 917)

When the execution of the processing of Step 916 is completed, or when determined negative in Step 901, the ECU 30 proceeds to Step 917. In Step 917, the ECU 30 executes the rich spike control on the main NOx catalyst 55. More specifically, the ECU 30 controls the first actuator 62 and the second actuator 64 so as to retain the first exhaust switching valve 63 in the fully open state and retain the second exhaust switching valve 65 in the totally closed state, and switches the operating condition of the internal combustion engine 1 to the rich air-fuel ratio operation.

(Step 918)

In Step 918, the ECU 30 calculates the amount of NOx released and reduced in the main NOx catalyst 55 on the basis of the amount of unburned fuel components discharged from the internal combustion engine 1, and updates the counter value :CC1 of the first release counter CC1 on the basis of the NOx amount calculated.

(Step 919)

In Step 919, the ECU 30 reads the counter value :CC1 of the first release counter CC1 updated in Step 918, and reads the counter value :C1 of the first absorption counter C1, and determines whether the counter value :CC1 of the first release counter CC1 is higher than the counter value :C1 of the first absorption counter C1.

When determined negative in Step 919, the ECU 30 returns to Step 917, and continues the rich spike control to the main NOx catalyst 55. On the other hand, when deternubed affirmative in Step 919, the ECU 30 proceeds to Step 920.

(Step 920)

In Step 920, the ECU 30 terminates the execution of rich spike control to the main NOx catalyst 55. More specifically, the ECU 30 returns the control of the first exhaust switching valve 63 and the second exhaust switching valve 65 and the control of the internal combustion engine 1 to normal. Subsequently, the ECU 30 changes the value of the first release flag storage region from "1" to "0", and resets the counter values of the first absorption counter C1 and the first release counter CC1 to "0". After the execution of the processing of Step 920, the ECU 30 temporarily terminates the execution of the routine.

(Step 921)

Further, when determined negative in Step 906, the ECU 30 proceeds to Step 921, and changes the value of the second release flag storage region from "0" to "1".

(Step 922)

When the execution of the processing of Step 921 is completed, or when determined negative in Step 902, the ECU 30 proceeds to Step 922. In Step 922, the ECU 30 executes the rich spike control to the sub NOx catalyst 61. More specifically, the ECU controls the first actuator 62 and the second actuator 64 so as to retain the first exhaust switching valve 63 in the totally closed state and the second exhaust switching valve 65 in the fully open state, and switches the operating condition of the internal combustion engine 1 to the rich air-fuel ratio operation.

(Step 923)

In Step 923, the ECU 30 updates the counter value :CC2 of the second release counter CC2 on the basis of the amount of unburned fuel components discharged from the internal combustion engine 1.

(Step 924)

In Step 924, the ECU 30 reads the counter value :CC2 of the second release counter CC2 updated in Step 923, and reads the counter value :C2 of the second absorption counter C2, and determines whether the counter value :CC2 of the second release counter CC2 is higher than the counter value :C2 of the second absorption counter C2.

When determined negative in Step 924, the ECU 30 returns to Step 922, and continues the rich spike control on the sub NOx catalyst 61. On the other hand, when determined affirmative in Step 924, the process by the ECU 30 advances to Step 925.

(Step 925)

In Step 925, the ECU 30 terminates the execution of the rich spike control on the sub NOx catalyst 61. More specifically, the ECU 30 returns the control of the first exhaust switching valve 63 and the second exhaust switching valve 65 and the control of the internal combustion engine 1 to normal. Subsequently, the ECU 30 changes the value of the second NOx release flag storage region from "1" to "0", and resets the values of the second absorption counter C2 and the second release counter CC2 to "0". After the execution of the processing of Step 925, the ECU 30 temporarily terminates the execution of the routine.

In the eighth embodiment described above, the NOx absorption amount of the main NOx catalyst 55 is estimated taking into account the amount of exhaust leaking from the first exhaust switching valve 63 and the second exhaust switching valve 65, so that it is possible to accurately estimate the NOx absorption amount of the main NOx catalyst 55, whereby it is possible to execute the rich spike control with high accuracy on the main NOx catalyst 55.

Further, in the eighth embodiment, the NOx absorption amount of the sub NOx catalyst 61 is estimated taking into account the amount of exhaust leaking from the first exhaust switching valve 63 and the second exhaust switching valve 65, and it is possible to execute the rich spike control on the sub NOx catalyst 61 on the basis of the estimated value, so that it is possible to reliably reduce the NOx inadvertently absorbed by the sub NOx catalyst 61, thereby making it possible to achieve an improvement in exhaust emission control.

In the eighth embodiment described above, the NOx absorption amounts of the main NOx catalyst 55 and the sub NOx catalyst 61 are estimated taking into account the amount of exhaust leaking from the first exhaust switching valve 63 and the second exhaust switching valve 65. In some cases, however, there is a response delay of the first exhaust switching valve 63 and the second exhaust switching valve 65, that is, it takes some time from the point when the first actuator 62 or the second actuator 64 is controlled so as to switch the first exhaust switching valve 63 or the second exhaust switching valve 65 from the fully open state to the totally closed state (or from the totally closed state to the fully open state) to the point when the first exhaust switching valve 63 or the second exhaust switching valve 65 is actually brought into the totally closed state (or fully open state). In such a case, it is desirable to estimate the NOx absorption amount taking into account the amount of exhaust flowing through the main NOx catalyst 55 or the sub NOx catalyst 61 during the response delay period of the first exhaust switching valve 63 and the second exhaust switching valve 65.

Ninth Embodiment

Next, a ninth embodiment of the exhaust emission purifying device for an internal combustion engine of the present invention will be described. Here, the construction differing from that of the eighth embodiment is described, and a description of the construction similar to that of the eighth embodiment will be omitted.

The ninth embodiment differs from the eighth embodiment in the following point. In the eighth embodiment, the rich spike control on the main NOx catalyst 55 and the rich spike control on the sub NOx catalyst 61 are executed independently of each other. In the ninth embodiment, in contrast, the rich spike control on the main NOx catalyst 55 and the rich spike control on the sub NOx catalyst 61 are executed in synchronism with each other only when the NOx catalyst temperature rise restraining control is executed, in other words, only when the exhaust purification is effected by using both the main NOx catalyst 55 and the sub NOx catalyst 61.

This is because when, at the time of execution of the NOx catalyst temperature rise restraining control, the execution time of the rich spike control on the main NOx catalyst 55 differs from the execution time of the rich spike control on the sub NOx catalyst 61, it is to be expected that the execution frequency of the rich spike control will increase, resulting in an increase in the fuel consumption amount.

However, since it may happen that at the start of the execution of the NOx catalyst temperature rise restraining control the NOx absorption amount of the main NOx catalyst 55 differs from the NOx absorption amount of the sub NOx catalyst 61, the ninth embodiment adopts an arrangement in which immediately before the execution of the NOx catalyst temperature rise restraining control, all the NOx absorbed by the main NOx catalyst 55 and the sub NOx catalyst 61 is temporarily released and reduced.

Further, when the limit value of the amount of NOx that can be absorbed by the main NOx catalyst 55 (hereinafter referred to as the first NOx absorption limit value) differs from the limit value of the amount of NOx that can be absorbed by the sub NOx catalyst 61 (hereinafter referred to as the second NOx absorption limit value), even if all the NOx absorbed by the main NOx catalyst 55 and the sub NOx catalyst 61 is released and reduced immediately before the execution of the NOx catalyst temperature rise restraining control, the timing with which the NOx absorbing capacity of the main NOx catalyst 55 is saturated is deviated from the timing with which the Nox absorbing capacity of the sub NOx catalyst 61 is saturated, making it impossible to synchronize the execution times of the rich spike control. Thus, in the ninth embodiment, the rich spike control is executed by using, as a reference, of the main NOx catalyst 55 and the sub NOx catalyst 61, the one whose NOx absorbing capacity is less.

In the example described below, lean/rich spike control is conducted when the NOx absorbing capacity of the main NOx catalyst 55 is higher than the NOx absorbing capacity of the sub NOx catalyst 61, that is, when the first NOx absorption limit value is higher than the second NOx absorption limit value.

Figure 17:
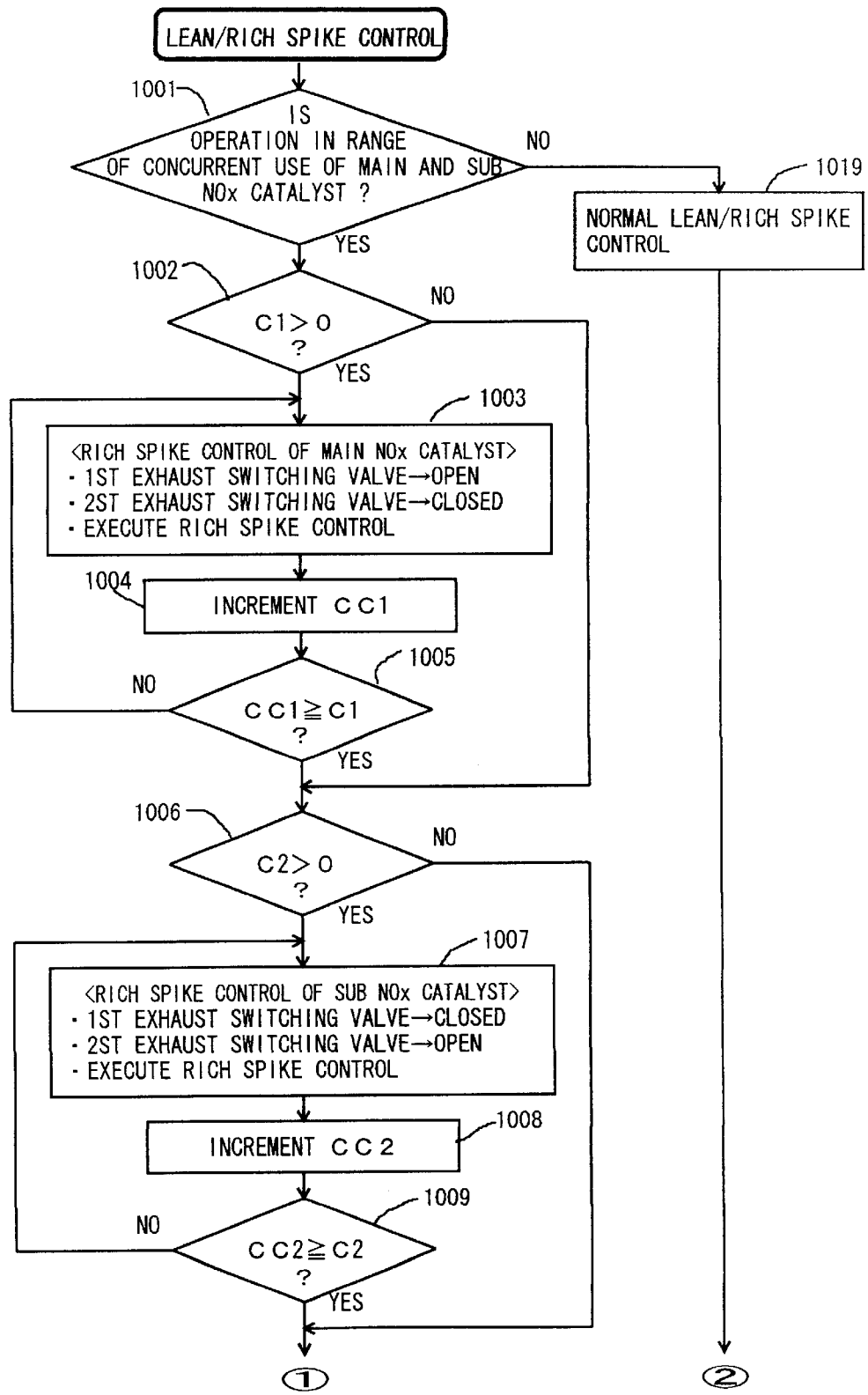
FIG. 17(A) is a flowchart (1) showing the rich spike control routine in a ninth embodiment.
FIG. 17(B) is a flowchart (2) showing the rich spike control routine in the ninth embodiment.

In the ninth embodiment, when executing lean/rich spike control, the ECU 30 executes lean/rich spike control in accordance with the lean/rich spike control routine shown in FIG. 17. The lean/rich spike control routine shown in FIG. 17 is stored in advance in the ROM 32 of the ECU 30, and is a routine repeatedly executed by the CPU 34 for each predetermined time.

(Step 1001)

In the lean/rich spike control routine, the ECU 30 first determines in Step 1001 whether the exhaust is in the condition in which it is to be caused to flow through both the main NOx catalyst 55 and the sub NOx catalyst 61, in other words, whether the engine operating condition is in the lean/rich spike control execution range and the exhaust temperature is higher than a predetermined temperature.

(Step 1019)

When determined negative in Step 1001, that is, when the exhaust is not in the condition in which it is to be caused to flow through both the main NOx catalyst 55 and the sub NOx catalyst 61, the ECU 30 proceeds to Step 1019, in which the normal lean/rich spike control is executed. Here, the normal lean/rich spike control is the same as the lean/rich spike control described with reference to the eighth embodiment.

(Step 1002)

When determined affirmative in Step 1001, that is, when the exhaust is in the condition in which it is to be caused to flow through both the main NOx catalyst 55 and the sub NOx catalyst 61, the ECU 30 proceeds to Step 1002, in which a determination is made as to whether the counter value :C1 of the first absorption counter C1 is larger than "0", that is, whether NOx has been absorbed by the main NOx catalyst 55.

(Step 1003)

When determined affirmative in Step 1002, the process by the ECU 30 advances to Step 1003, and executes the rich spike control so as to release and reduce all the NOx absorbed by the main NOx catalyst 55. More specifically, the ECU 30 controls the first actuator 62 and the second actuator 64 so as to retain the first exhaust switching valve 63 in the fully open state and retain the second exhaust switching valve 65 in the totally closed state, and switches the engine operating condition to the rich air-fuel ratio operation.

(Step 1004)

In Step 1004, the ECU calculates the amount of NOx released and reduced by the main NOx catalyst 55 on the basis of the amount of unburned fuel components discharged from the internal combustion engine 1, and updates the counter value :CC1 of the first release counter CC1 on the basis of the calculated NOx amount.

(Step 1005)

In Step 1005, the ECU 30 reads the counter value :CC1 of the first release counter CC1 updated in Step 1004, and reads the counter value C1 of the first absorption counter C1, making a determination as to whether the counter value :CC1 of the first release counter CC1 is higher than the counter value :C1 of the first absorption counter C1.

When determined negative in Step 1005, the ECU 30 returns to Step 1003, and continues the execution of the rich spike control on the main NOx catalyst 55. On the other hand, when determined affirmative in Step 1005, the ECU 30 proceeds to Step 1006.

(Step 1006)

In Step 1006, the ECU 30 determines whether the counter value :C2 of the second absorption counter C2 is larger than "0", that is, whether NOx has been absorbed by the sub NOx catalyst 61.

(Step 1007)

When determined affirmative in Step 1006, the ECU 30 proceeds to Step 1007, and executes the rich spike control so as to release and reduce all the NOx absorbed by the sub NOx catalyst 61. More specifically, the ECU 30 controls the first actuator 62 and the second actuator 64 so as to retain the first exhaust switching valve 63 in the totally closed state and retain the second exhaust switching valve 65 in the fully open state, and switches the engine operating condition to the rich air-fuel ratio operation.

(Step 1008)

In Step 1008, the ECU calculates the amount of NOx released and reduced by the sub NOx catalyst 61 on the basis of the amount of unburned fuel components discharged from the internal combustion engine 1, and updates the counter value :CC2 of the second release counter CC2 on the basis of the NOx amount calculated.

(Step 1009)

In Step 1009, the ECU 30 reads the counter value :CC2 of the second release counter CC2 updated in Step 1008, and reads the counter value :C2 of the second absorption counter C2, and determines whether the counter value :CC2 of the second release counter CC2 is higher than the counter value :C2 of the second absorption counter C2.

When determined negative in Step 1009, the ECU 30 returns to Step 1007, and continues the rich spike control on the sub NOx catalyst 61. On the other hand, when determined affirmative in Step 1009, the ECU 30 proceeds to Step 1010.

(Step 1010)

In Step 1010, the ECU 30 controls the first actuator 62 and the second actuator 64 so as to retain both the first exhaust switching valve 63 and the second exhaust switching valve 65 in the fully open state, and switches the engine operating condition to the lean air-fuel ratio operation.

(Step 1011)

In Step 1011, the ECU 30 gains access to a third NOx release flag storage region pre-set in a predetermined region of the RAM 33, and determines whether "1" is stored or not.

The third NOx release flag storage region is a region which stores "1" when the amount of NOx absorbed by the main NOx catalyst 55 and the sub NOx catalyst 61 is higher than double the second NOx absorption limit value (double the first NOx absorption limit value when the first NOx absorption limit value>the second NOx absorption limit value), and stores "0" when the amount of NOx absorbed by the main NOx catalyst 55 and the sub NOx catalyst 61 is less than double the second NOx absorption limit value.

(Step 1012)

When determined afirmative in Step 1011, that is, when it is determined that "0" is stored in the third NOx release flag storage region of the RAM 33, the ECU 30 proceeds to Step 1012. In Step 1012, the ECU 30 calculates the engine exhaust NOx amount by using the engine speed, fuel injection amount, etc. as parameters, and adds the engine exhaust NOx amount to a counter value :C3 of a third absorption counter C3.

The third absorption counter C3 is formed by a storage region set in a predetermined region of the RAM 33, a register contained in the CPU 34, etc., and retains the integrated value of the amount of NOx absorbed by the main NOx catalyst 55 and the sub NOx catalyst 61, in other words, the entire amount of NOx absorbed by the main NOx catalyst 55 and the sub NOx catalyst 61.

(Step 1013)

The ECU 30 reads the counter value :C3 of the third absorption counter C3 updated in Step 1013, and compares the counter value :C3 with double the second NOx absorption limit value :C3MAX. More specifically, the ECU 30 determines whether the counter value :C3 is higher than double the second NOx absorption limit value :C3MAX.

When determined negative in Step 1013, the ECU 30 returns to Step 1012. On the other hand, when determined affirmative in Step 1013, the ECU 30 proceeds to Step 1014.

(Step 1014)

In Step 1014, the ECU 30 changes the value of the third release flag storage region from "0" to "1".

Here, when determined affirmative in Step 1011, or when the ECU 30 has completed the execution of the processing of Step 1014, the ECU 30 proceeds to Step 1015.

(Step 1015)

In Step 1015, the ECU 30 switches the engine operating condition from the lean air-fuel ratio operation to the rich air-fuel ratio operation, whereby the exhaust of rich air-fuel ratio is caused to flow through both the main NOx catalyst 55 and the sub NOx catalyst 61, thereby releasing and reducing the NOx absorbed by the main NOx catalyst 55 and the sub NOx catalyst 61.

(Step 1016)

In Step 1016, the ECU 30 calculates the amount of NOx released and reduced by the main NOx catalyst 55 and the sub NOx catalyst 61 on the basis of the amount of unburned fuel components discharged from the internal combustion engine 1, and updates the counter value :CC3 of the third release counter CC3 on the basis of the NOx amount calculated.

The third release counter CC3 is formed of a storage region set in a predetermined region of the RAM 33, a register contained in the CPU 34 or the like, and retains the integrated value of NOx released and reduced by the main NOx catalyst 55 and the sub NOx catalyst 61, in other words, the entire amount of NOx released and reduced by the main NOx catalyst 55 and the sub NOx catalyst 61.

(Step 1017)

In Step 1017, the ECU 30 reads the counter value :CC3 of the third release counter CC3 updated in Step 1016, and the counter value :C3 of the third absorption counter C3, and makes a determination as to whether the counter value :CC3 of the third release counter CC3 is higher than the counter value :C3 of the third absorption counter C3, that is, whether all the NOx absorbed by the main NOx catalyst 55 and the sub NOx catalyst 61 has been released or cleaned.

When determined negative in Step 1017, the ECU returns to Step 1015, and continues the rich spike control on the main NOx catalyst 55 and the sub NOx catalyst 61. On the other hand, when determined affirmative in Step 1017, the ECU 30 proceeds to Step 1018.

(Step 1018)

In Step 1018, the ECU 30 terminates the execution of the rich spike control on the main NOx catalyst 55 and the sub NOx catalyst 61. More specifically, the ECU 30 switches the engine operating condition from the rich air-fuel ratio operation to the lean air-fuel ratio operation. Further, the ECU 30 changes the value of the third NOx release flag storage region from "1" to "0", and resets the counter value :C3 of the third absorption counter C3 and the counter value :CC3 of the third release counter CC3 to "0". After the execution of the processing of Step 1018, the ECU 30 temporarily terminates the execution of the routine.

In the ninth embodiment described above, when the exhaust flows through both the main NOx catalyst 55 and the sub NOx catalyst 61, it is possible to execute the rich spike control on the main NOx catalyst 55 in synchronism with the rich spike control on the sub NOx catalyst 61, so that the execution frequency of the rich spike control decreases, with the result that it is possible to reduce the fuel consumption amount related to the rich spike control.

Tenth Embodiment

Next, a tenth embodiment of the exhaust emission purifying device for an internal combustion engine of the present invention will be described. Here, the construction differing from that of the fourth embodiment described above will be described, and a description of the construction similar to that of the fourth embodiment will be omitted.

The tenth embodiment differs from the fourth embodiment in that in the main NOx catalyst temperature rise control in the fourth embodiment the main NOx catalyst 55 is activated after the completion of the warming up of the internal combustion engine 1, while in the tenth embodiment, the main NOx catalyst 55 is activated when the internal combustion engine 1 is warmed up.

In the fourth embodiment, the engine warming-up control, that is the stoichiometric operation of the internal combustion engine is continued until the amount of NOx discharged from the internal combustion engine 1 becomes smaller than a predetermined amount after the completion of the warming up of the internal combustion engine, so that when the time from the point when the warming up of the internal combustion engine 1 is completed to the point when the amount of NOx discharged from the internal combustion engine 1 becomes smaller than a predetermined amount is rather long, it is to be expected that the fuel consumption amount will be increased.

In view of this, in the tenth embodiment, the opening and closing of the first exhaust switching valve 63 and the second exhaust switching valve 65 are controlled such that, in the warming-operation of the internal combustion engine 1, while the air-fuel ratio of the exhaust is stoichiometric, the entire amount of exhaust flows through the sub NOx catalyst 61, and while the amount of NOx in the exhaust is smaller than a predetermined amount, the entire amount of exhaust flows through the main NOx catalyst 55, whereby the warming up of the internal combustion engine 1 and the activation of the main NOx catalyst 55 are conducted in parallel.

Examples of the amount of NOx in the exhaust is smaller than a predetermined amount are that, when the vehicle is running at reduced speed, when the execution of the fuel injection control is inhibited, and the execution of sparking control is inhibited. The tenth embodiment will be described with reference to the case in which the vehicle is running at reduced speed.

Figure 18:
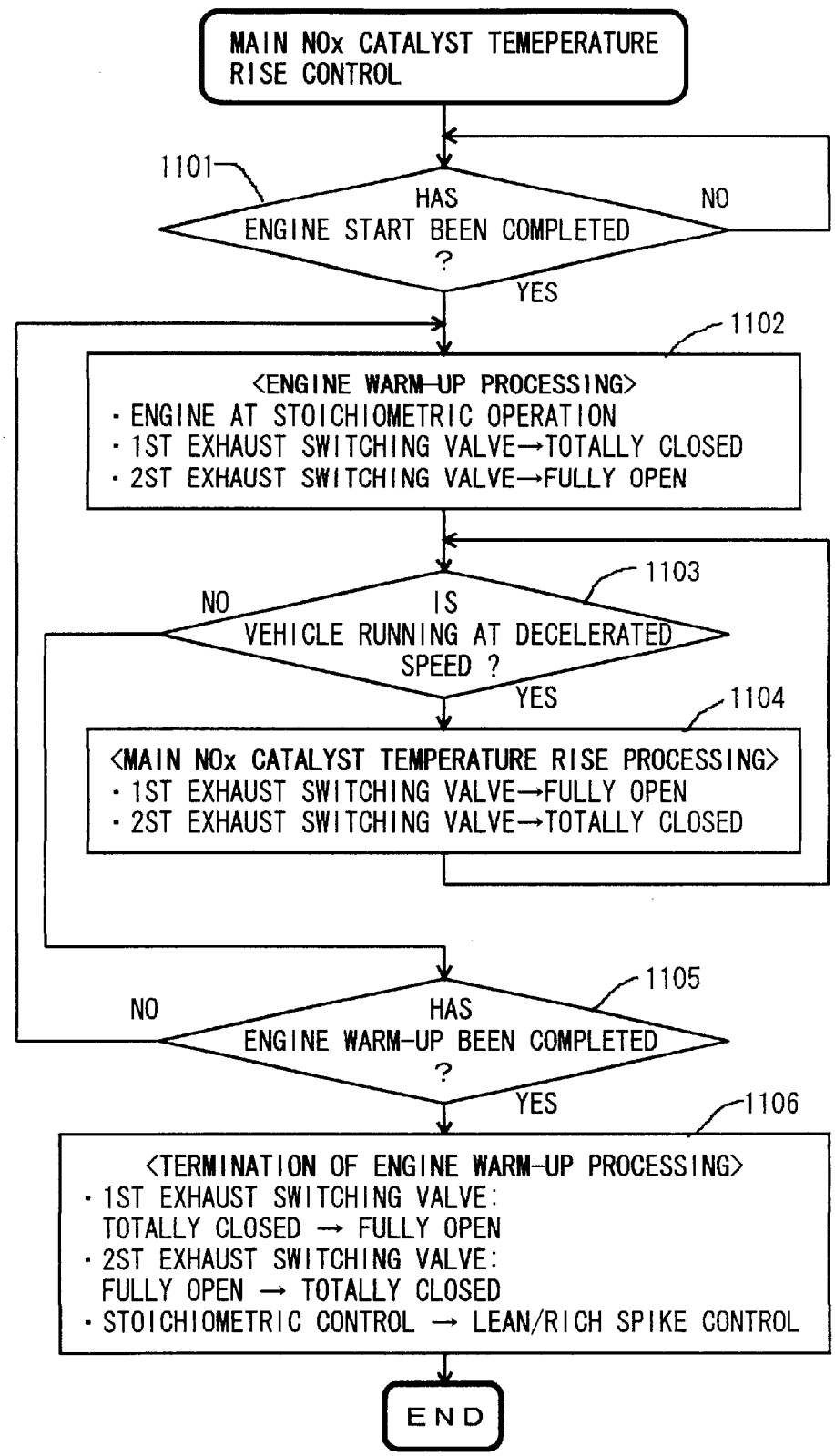
FIG. 18 is a flowchart showing the main NOx catalyst temperature rise control routine in a tenth embodiment.

In the following, the main NOx catalyst temperature rise control will be described with reference to the flowchart of FIG. 18. The flowchart of FIG. 18 shows a main NOx catalyst temperature rise control routine. This main NOx catalyst temperature rise control routine is stored in advance in the ROM 32 of the ECU 30, and is a routine executed by the CPU 34, using the starting completion of the internal combustion engine 1.

(Step 1101)

In the main NOx catalyst temperature rise control routine, the ECU 30 first determines in Step 1101 hether the starting of the internal combustion engine 1 has been completed or not.

When determined negative in Step 1101, the ECU 30 executes the processing of Step 1101 again. On the other hand, when determined affirmative in Step 1101, the ECU 30 proceeds to Step 1102.

(Step 1102)

In Step 1102, the ECU 30 executes the engine warming-up processing. More specifically, the ECU 30 operates the internal combustion engine 1 at the stoichiometric air-fuel ratio, and controls the first actuator 62 and the second actuator 64 so as to retain the first exhaust switching valve 63 in the totally closed state and retain the second exhaust switching valve 65 in the fully open state.

In this case, the exhaust of stoichiometric air-fuel ratio is discharged from the internal combustion engine 1, and the harmful gas components contained in the exhaust, such as HC, CO, and NOx, are purified by the 3-way catalyst 51 activated by the 3-way catalyst temperature rise control at the time of engine start-up. The exhaust of which the harmful gas components have been purified by the 3-way catalyst 51 is led to the exhaust pipe 58 by way of the sub NOx catalyst 61 in the bypass path 59. In the process, the sub NOx catalyst 61 is not activated yet. However, since the harmful gas components in the exhaust have been purified by the 3-way catalyst 51 as stated above, there is no deterioration in exhaust emission. Further, the sub NOx catalyst 61 receives heat from the exhaust and undergoes temperature rise.

(Step 1103)

In Step 1103, the ECU 30 determines whether the vehicle is running at decelerated speed or not. An example of a method for determining the running of the vehicle at decelerated speed is that it is determined under the conditions that the vehicle is running at deceleerated speed when the operating amount of the accelerator (not shown) is "zero" and the vehicle speed is higher than a predetermined speed.

(Step 1104)

When determined affirmative in Step 1103, the ECU 30 determines that the amount of NOx in the exhaust is less than a predetermined amount, and the temperature rise processing is executed on the main NOx catalyst 55. More specifically, the ECU 30 controls the first actuator 62 so as to switch the first exhaust switching valve 63 from the totally closed state to the fully open state, and controls the second actuator 64 so as to switch the second exhaust switching valve 65 from the fully open state to the totally closed state, causing the entire amount of exhaust to flow through the main NOx catalyst 55.

In the process, the exhaust discharged from the internal combustion engine 1 flows to the exhaust pipe 58 by way of the main NOx catalyst 55. However, since the amount of NOx contained in the exhaust discharged from the internal combustion engine 1 during the decelerated-speed running is very small, there is no rapid deterioration in exhaust emission even when the main NOx catalyst 55 is not activated yet.

Further, even when no combustion is conducted in the internal combustion engine 1, the exhaust discharged from the internal combustion engine 1 when the vehicle is running at decelerated speed receives heat from the interior of the engine, so that when such an exhaust passes through the main NOx catalyst 55, the main NOx catalyst 55 receives heat from the exhaust and undergoes temperature rise.

After the execution of the processing of Step 1104 as described above, the ECU 30 returns to Step 1103, in which a determination is made as to whether the running state of the vehicle at decelerted speed is being continued or not. When determined affirmative in Step 1103, that is, when it is determined that the running of the vehicle at decelerated speed is being continued, the ECU 30 proceeds to Step 1104, and continues the temperature raising processing on the main NOx catalyst 55. On the other hand, when determined negative in Step 1103, that is, when it is determined that the running state of the vehicle at decelerated speed has been completed, the ECU 30 proceeds to Step 1105.

(Step 1105)

In Step 1105, the ECU 30 determines whether the warming up of the internal combustion engine 1 has been completed or not. Examples of a method for determining the completion of the warming up of the internal combustion engine 1 include one in which it is determined that the warming up of the internal combustion engine 1 has been completed when the temperature of the engine cooling water is higher than a predetermined temperature, and one in which a determination as to whether the warming up of the internal combustion engine 1 (and the activation of the sub NOx catalyst 61) has been completed or not, using the operation history since the starting of the internal combustion engine 1, etc. as parameters.

When determined negative in Step 1105, the processs by the ECU 30 returns to Step 1102, and continues the execution of the engine warming up processing. On the other hand, when determined affirmative in Step 1105, the ECU 30 proceeds to Step 1106.

(Step 1106)

In Step 1106, the ECU 30 terminates the execution of engine warming up processing. More specifically, the ECU 30 switches the operating condition of the internal combustion engine 1 from the stoichiometric operation to the lean/rich spike operation, and controls the first actuator 62 and the second actuator 64 so as to switch the first exhaust switching valve 63 from the totally closed state to the fully open state and switch the second exhaust switching valve 65 from the fully open state to the totally closed state. After the execution of the processing of Step 1106, the ECU 30 terminates the execution of the routine.

As described above, in the exhausted mission purifying device of the tenth embodiment, it is possible to raise the temperature of the main NOx catalyst 55 without involving a deterioration in exhaust emission during the warming up operation of the internal combustion engine 1, so that it is possible to activate the NOx catalyst 55 while suppressing the execution range of the engine warming up control to a minimum.

When causing the entire amount of exhaust to flow through the main NOx catalyst 55 during the running of the vehicle at reduced speed, it is also possible to increase the degree of opening of the throttle valve 15, thereby increasing the quantity of heat transmitted from the exhaust to the main NOx catalyst 55. Alternately, it is also possible to secondarily inject the fuel from the fuel injection valve 11 to burn the fuel at the 3-way catalyst 51 to thereby raise the temperature of the exhaust, thereby increasing the quantity of heat transmitted from the exhaust to the main NOx catalyst 55.

Other Embodiments

Figure 19:
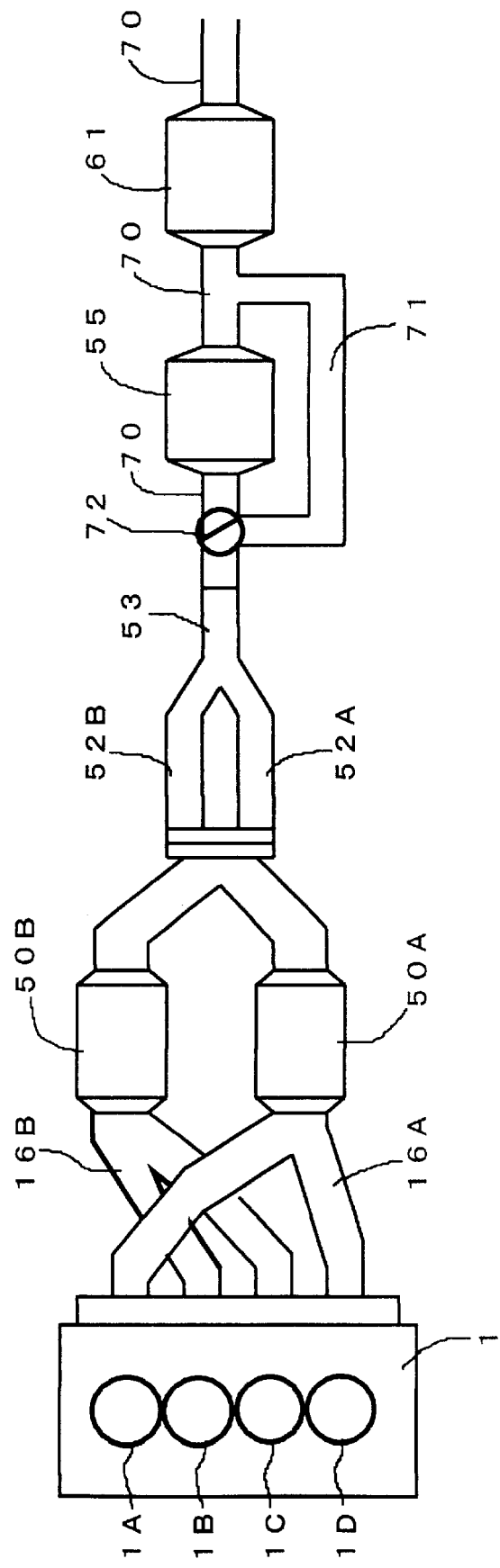
FIG. 19 is a diagram showing the hardware construction of an exhaust emission purifying device for an internal combustion engine according to another embodiment.

In the third to tenth embodiments, the exhaust emission purifying device for an internal combustion engine of the present invention is described in which the sub NOx catalyst 61 is arranged in the bypass path 59 bypassing the main NOx catalyst 55, that is, the main NOx catalyst 55 and the sub NOx catalyst 61 are arranged in parallel. It is also possible, as shown in FIG. 19, to arrange the main NOx catalyst 55 and the sub NOx catalyst 61 in series in an exhaust passage 70 such that the main NOx catalyst 55 is situated on the upstream than the sub NOx catalyst 61, wherein there are provided a bypass path 71 communicating an exhaust passage 70 which is on the upstream side of the main NOx catalyst 55 with the exhaust passage 70 which is on the upstream side of the sub NOx catalyst 61 and on the downstream side of the main NOx catalyst 55, and an exhaust switching valve 72 provided in the branching portion between the bypass path 71 and the main NOx catalyst 55 and adapted to switch the exhaust flow between the bypass path 71 and the main NOx catalyst 55.

Further, while in the first to tenth embodiments described above the present invention is applied to a gasoline engine, the present invention is also applicable to a diesel engine. In the case of a diesel engine, the combustion in the combustion chamber is effected at an air-fuel ratio which is much higher than the stoichiometric air-fuel ratio, so that, in the normal engine operating condition, the exhaust flowing into the SOx absorbing material 17 and the main NOx catalyst 20 is very lean, and, while the absorption of SOx and NOx is effected, little or no releasing of SOx and NOx is effected.

Further, as described above, in the case of a gasoline engine, it is possible to make the air fuel ratio of the exhaust flowing. into the SOx absorbing material 17 and the main NOx catalyst 20 stoichiometric or rich by making the air-fuel ratio of the air-fuel mixture supplied to the combustion chamber 3 stoichiometric or rich, and to release the SOx and NOx absorbed by the SOx absorbing material 17 and the main NOx catalyst 20. In the case of a diesel engine, making the air-fuel ratio of the air-fuel mixture supplied to the combustion engine stoichiometric or rich leads to the generation of soot, etc. at the time of combustion, so that this method cannot be adopted.

Thus, when applying the present invention to a diesel engine, to make the air-fuel ratio of the exhaust flowing in stoichiometric or rich, it is necessary to supply a reducing agent (e.g., diesel oil serving as fuel) to the exhaust apart from the burning of the fuel for obtaining engine output. The supply of a reducing agent to the exhaust can be effected through the secondary injection of fuel into the cylinder during the intake stroke, expansion stroke, or exhaust stroke, or by supplying the reducing agent to the exhaust passage on the upstream side of the SOx absorbing material 17.

If the diesel engine is provided with an exhaust recirculating device (so-called EGR device), it is possible to make the air-fuel ratio of the exhaust stoichiometric or rich by introducing a large amount of exhaust recirculation gas into the combustion chamber.

What is claimed is:

1. An exhaust emission purifying device of an internal combustion engine, comprising:

a lean-burn type internal combustion engine capable of burning an air-fuel mixture with excessive oxygen;

an NOx absorbing material which is arranged in an exhaust passage of the internal combustion engine and which is adapted to absorb nitrogen oxides in the exhaust when an air-fuel ratio of the exhaust flowing is lean and to release the nitrogen oxides it has absorbed when the oxygen concentration of the exhaust flowing in is low;

a bypass path branching off from the portion of the exhaust passage on the upstream side of the NOx absorbing material and adapted to cause the exhaust to bypass the NOx absorbing material;

an exhaust flow switching means for selectively switching the flow of the exhaust between the NOx absorbing material and the bypass path;

an SOx absorbing material which is arranged in the portion of the exhaust passage on the upstream side of the exhaust flow switching means and which is adapted to absorb sulfur oxides when the air-fuel ratio of the exhaust flowing-in is lean and to release the sulfur oxides it has absorbed when the oxygen concentration of the exhaust flowing in is low; and an NOx catalyst provided in the bypass path and adapted to purify nitrogen oxides when the air-fuel ratio of the exhaust flowing in is lean;

wherein the exhaust flow switching means causes all the exhaust to flow through the NOx absorbing material when the air-fuel ratio of the exhaust is controlled to be lean, and causes all the exhaust to flow through the bypass path when the air-fuel ratio of the exhaust is controlled to be stoichiometric or rich.

2. An exhaust emission purifying device of an internal combustion engine according to claim 1, wherein the NOx catalyst provided in the bypass path is a selective reduction type NOx catalyst adapted to reduce or decompose nitrogen oxides in an oxygen-excessive atmosphere in the presence of hydrocarbon.

3. An exhaust emission purifying device of an internal combustion engine according to claim 1, wherein the NOx catalyst provided in the bypass path is an occlusion reduction type NOx catalyst which absorbs nitrogen oxides in the exhaust when the air-fuel ratio of the exhaust is lean and which releases the nitrogen oxides it has absorbed to reduce or decompose them when the oxygen concentration of the exhaust is less and there exists a reducing agent.

4. An exhaust emission purifying device of an internal combustion engine according to claim 1, further comprising a temperature rise restraining means for controlling the exhaust flow switching means so as to cause the exhaust to flow through both the NOx absorbing material and the NOx catalyst when the temperature of the NOx absorbing material becomes higher than a predetermined temperature when the exhaust flow switching means is being controlled to cause all the exhaust to flow through the NOx absorbing material.

5. An exhaust emission purifying device of an internal combustion engine according to claim 3, further comprising an NOx absorption amount detection means for detecting the amount of NOx absorbed by the NOx absorbing material and the amount of NOx absorbed by the NOx catalyst.

6. An exhaust emission purifying device of an internal combustion engine, comprising:

a lean-burn type internal combustion engine capable of burning an air-fuel mixture with excessive oxygen;

an NOx absorbing material which is arranged in an exhaust passage of the internal combustion engine and which is adapted to absorb nitrogen oxides in the exhaust when an air-fuel ratio of the exhaust flowing is lean and to release the nitrogen oxides it has absorbed when the oxygen concentration of the exhaust flowing in is low;

a bypass path branching off from the portion of the exhaust passage on the upstream side of the NOx absorbing material and adapted to cause the exhaust to bypass the NOx absorbing material;

an exhaust flow switching means for selectively switching the flow of the exhaust between the NOx absorbing material and the bypass path;

an SOx absorbing material which is arranged in the portion of the exhaust passage on the upstream side of the exhaust flow switching means and which is adapted to absorb sulfur oxides when the air-fuel ratio of the exhaust flowing-in is lean and to release the sulfur oxides it has absorbed when the oxygen concentration of the exhaust flowing in is low; and an NOx catalyst provided in the bypass path and adapted to purify nitrogen oxides when the air-fuel ratio of the exhaust flowing in is lean, wherein the NOx catalyst provided in the bypass path has a 3-way purifying function and HC adsorbing capacity at low temperature, and wherein the exhaust flow switching means causes all the exhaust to flow through the bypass path when the temperature of the exhaust is less than a predetermined temperature, and causes all the exhaust to flow through the NOx absorbing material when the temperature of the exhaust is higher than the predetermined temperature.

7. An exhaust emission purifying device of an internal combustion engine, comprising:

a lean-burn type internal combustion engine capable of burning an air-fuel mixture with excessive oxygen;

an NOx absorbing material which is arranged in an exhaust passage of the internal combustion engine and which is adapted to absorb nitrogen oxides in the exhaust when an air-fuel ratio of the exhaust flowing is lean and to release the nitrogen oxides it has absorbed when the oxygen concentration of the exhaust flowing in is low;

a bypass path branching off from the portion of the exhaust passage on the upstream side of the NOx absorbing material and adapted to cause the exhaust to bypass the NOx absorbing material;

an exhaust flow switching means for selectively switching the flow of the exhaust between the NOx absorbing material and the bypass path;

an SOx absorbing material which is arranged in the portion of the exhaust passage on the upstream side of the exhaust flow switching means and which is adapted to absorb sulfur oxides when the air-fuel ratio of the exhaust flowing-in is lean and to release the sulfur oxides it has absorbed when the oxygen concentration of the exhaust flowing in is low; and an NOx catalyst provided in the bypass path and adapted to purify nitrogen oxides when the air-fuel ratio of the exhaust flowing in is lean, wherein when the internal combustion engine is an in-cylinder injection type internal combustion engine which is provided with a fuel injection vale for directly injecting the fuel in a combustion chamber of the internal combustion engine, wherein the SOx absorbing material has a 3-way function, and wherein, when starting the internal combustion engine, the exhaust flow switching means is controlled so as to throttle the amount of exhaust flowing through the NOx absorbing material and the NOx catalyst, and the fuel injection valve is controlled so as to secondarily inject fuel during the expansion stroke of each cylinder in addition to the injection of the fuel to be burnt.

8. An exhaust emission purifying device of an internal combustion engine, comprising:

a lean-bum type internal combustion engine capable of burning an air-fuel mixture with excessive oxygen;

an NOx absorbing material which is arranged in an exhaust passage of the internal combustion engine and which is adapted to absorb nitrogen oxides in the exhaust when an air-fuel ratio of the exhaust flowing is lean and to release the nitrogen oxides it has absorbed when the oxygen concentration of the exhaust flowing in is low;

a bypass path branching off from the portion of the exhaust passage on the upstream side of the NOx absorbing material and adapted to cause the exhaust to bypass the NOx absorbing material;

an exhaust flow switching means for selectively switching the flow of the exhaust between the NOx absorbing material and the bypass path;

an SOx absorbing material which is arranged in the portion of the exhaust passage on the upstream side of the exhaust flow switching means and which is adapted to absorb sulfur oxides when the air-fuel ratio of the exhaust flowing-in is lean and to release the sulfur oxides it has absorbed when the oxygen concentration of the exhaust flowing in is low; and an NOx catalyst provided in the bypass path and adapted to purify nitrogen oxides when the air-fuel ratio of the exhaust flowing in is lean, wherein, when the temperature of the NOx absorbing material becomes higher than a predetermined temperature when the exhaust flow switching means is being controlled so as to cause all the exhaust to flow through the NOx absorbing material, a temperature rise restraining means controls the exhaust flow switching means so as to cause the exhaust to flow through both the NOx absorbing material and the NOx catalyst after executing an SOx poisoning regenerative processing on the NOx catalyst.

9. An exhaust emission purifying device of an internal combustion engine, comprising:

a lean-bum type internal combustion engine capable of burning an air-fuel mixture with excessive oxygen;

an NOx absorbing material which is arranged in an exhaust passage of the internal combustion engine and which is adapted to absorb nitrogen oxides in the exhaust when an air-fuel ratio of the exhaust flowing is lean and to release the nitrogen oxides it has absorbed when the oxygen concentration of the exhaust flowing in is low;

a bypass path branching off from the portion of the exhaust passage on the upstream side of the NOx absorbing material and adapted to cause the exhaust to bypass the NOx absorbing material;

an exhaust flow switching means for selectively switching the flow of the exhaust between the NOx absorbing material and the bypass path;

an SOx absorbing material which is arranged in the portion of the exhaust passage on the upstream side of the exhaust flow switching means and which is adapted to absorb sulfur oxides when the air-fuel ratio of the exhaust flowing-in is lean and to release the sulfur oxides it has absorbed when the oxygen concentration of the exhaust flowing in is low; and an NOx catalyst provided in the bypass path and adapted to purify nitrogen oxides when the air-fuel ratio of the exhaust flowing in is lean, wherein, when the internal combustion engine is performing warming-up operation, the exhaust flow switching means is controlled so as to cause all the exhaust to flow through the NOx catalyst, and after completion of the warming-up operation of the internal combustion engine, is switched so as to cause all the exhaust to flow through the NOx absorbing material at a point in time when the amount of NOx discharged from the internal combustion engine has become smaller than a predetermined amount.

10. An exhaust emission purifying device of an internal combustion engine according to claim 9, wherein when the amount of NOx discharged from the internal combustion engine is smaller than a predetermined amount, the vehicle in which the internal combustion is mounted is running at a decelerated speed.

11. An exhaust emission purifying device of an internal combustion engine according to claim 9, wherein when the amount of NOx discharged from the internal combustion engine is smaller than a predetermined amount, the load of the internal combustion engine is less than a predetermined value.

12. An exhaust emission purifying device of an internal combustion engine, comprising:
a lean-burn type internal combustion engine capable of burning an air-fuel mixture with excessive oxygen;
an NOx absorbing material which is arranged in an exhaust passage of the internal combustion engine and which is adapted to absorb nitrogen oxides in the exhaust when an air-fuel ratio of the exhaust flowing is lean and to release the nitrogen oxides it has absorbed when the oxygen concentration of the exhaust flowing in is low;
a bypass path branching off from the portion of the exhaust passage on the upstream side of the NOx absorbing material and adapted to cause the exhaust to bypass the NOx absorbing material;
an exhaust flow switching means for selectively switching the flow of the exhaust between the NOx absorbing material and the bypass path;
an SOx absorbing material which is arranged in the portion of the exhaust passage on the upstream side of the exhaust flow switching means and which is adapted to absorb sulfur oxides when the air-fuel ratio of the exhaust flowing-in is lean and to release the sulfur oxides it has absorbed when the oxygen concentration of the exhaust flowing in is low; and
an NOx catalyst provided in the bypass path and adapted to purify nitrogen oxides when the air-fuel ratio of the exhaust flowing in is lean,
wherein the NOx catalyst provided in the bypass path is an occlusion reduction type NOx catalyst which absorbs nitrogen oxides in the exhaust when the air-fuel ratio of the exhaust is lean and which releases the nitrogen oxides it has absorbed to reduce or decompose them when the oxygen concentration of the exhaust is less and there exists a reducing agent,
further comprising an SOx poisoning regenerative means which, when SOx poisoning of at least one of the NOx absorbing material and the NOx catalyst is detected, controls the exhaust flow switching means so as to cause all the exhaust to flow through both the NOx absorbing material and the NOx catalyst and executes the SOx poisoning regenerative processing simultaneously on the NOx absorbing material and the NOx catalyst.

13. An exhaust emission purifying device of an internal combustion engine according to claim 12, further comprising a regeneration completion determination means for determining the completion of the SOx poisoning regeneration of the NOx absorbing material and the NOx catalyst, and
wherein when it is determined by the regeneration completion determination means that the SOx poisoning regeneration of one of the NOx absorbing material and the NOx catalyst has been completed, the SOx poisoning regeneration means controls the exhaust flow switching means so as to prevent the exhaust from flowing into the substance of which the SOx poisoning regeneration has been completed.

14. An exhaust emission purifying device of an internal combustion engine according to claim 12, further comprising a regeneration completion determination means for determining the completion of the SOx poisoning regeneration of the NOx absorbing material and the NOx catalyst,
wherein when it is determined by the regeneration completion determination means that the SOx poisoning regeneration of one of the NOx absorbing material and the NOx catalyst has been completed, the SOx poisoning regeneration means interrupts the SOx poisoning regeneration processing, and cools the substance of which the SOx poisoning regeneration has been completed, and
wherein after the completion of the cooling of the substance of which the SOx poisoning regeneration has been completed, SOx poisoning regeneration processing is resumed only on the substance of which the SOx poisoning regeneration has not been completed yet.

15. An exhaust emission purifying device of an internal combustion engine, comprising:
a lean-burn type internal combustion engine capable of burning an air-fuel mixture with excessive oxygen;
an NOx absorbing material which is arranged in an exhaust passage of the internal combustion engine and which is adapted to absorb nitrogen oxides in the exhaust when an air-fuel ratio of the exhaust flowing is lean and to release the nitrogen oxides it has absorbed when the oxygen concentration of the exhaust flowing in is low;
a bypass path branching off from the portion of the exhaust passage on the upstream side of the NOx absorbing material and adapted to cause the exhaust to bypass the NOx absorbing material;
an exhaust flow switching means for selectively switching the flow of the exhaust between the NOx absorbing material and the bypass path;
an SOx absorbing material which is arranged in the portion of the exhaust passage on the upstream side of the exhaust flow switching means and which is adapted to absorb sulfur oxides when the air-fuel ratio of the exhaust flowing-in is lean and to release the sulfur oxides it has absorbed when the oxygen concentration of the exhaust flowing in is low; and
an NOx catalyst provided in the bypass path and adapted to purify nitrogen oxides when the air-fuel ratio of the exhaust flowing in is lean,
wherein the NOx catalyst provided in the bypass path is an occlusion reduction type NOx catalyst which absorbs nitrogen oxides in the exhaust when the air-fuel ratio of the exhaust is lean and which releases the nitrogen oxides it has absorbed to reduce or decompose them when the oxygen concentration of the exhaust is less and there exists a reducing agent,
further comprising an NOx absorption amount detection means for detecting the amount of NOx absorbed by the NOx absorbing material and the amount of NOx absorbed by the NOx catalyst, wherein the NOx absorption amount detection means estimates the NOx absorption amount of the NOx absorbing material and of the NOx catalyst on the basis of the amount of exhaust leaking from the exhaust flow switching means.

16. An exhaust emission purifying device of an internal combustion engine, comprising:

a lean-burn type internal combustion engine capable of burning an air-fuel mixture with excessive oxygen;

an NOx absorbing material which is arranged in an exhaust passage of the internal combustion engine and which is adapted to absorb nitrogen oxides in the exhaust when an air-fuel ratio of the exhaust flowing is lean and to release the nitrogen oxides it has absorbed when the oxygen concentration of the exhaust flowing in is low;

a bypass path branching off from the portion of the exhaust passage on the upstream side of the NOx absorbing material and adapted to cause the exhaust to bypass the NOx absorbing material;

an exhaust flow switching means for selectively switching the flow of the exhaust between the NOx absorbing material and the bypass path;

an SOx absorbing material which is arranged in the portion of the exhaust passage on the upstream side of the exhaust flow switching means and which is adapted to absorb sulfur oxides when the air-fuel ratio of the exhaust flowing-in is lean and to release the sulfur oxides it has absorbed when the oxygen concentration of the exhaust flowing in is low; and an NOx catalyst provided in the bypass path and adapted to purify nitrogen oxides when the air-fuel ratio of the exhaust flowing in is lean, wherein the NOx catalyst provided in the bypass path is an occlusion reduction type NOx catalyst which absorbs nitrogen oxides in the exhaust when the air-fuel ratio of the exhaust is lean and which releases the nitrogen oxides it has absorbed to reduce or decompose them when the oxygen concentration of the exhaust is leseless and there exists a reducing agent, further comprising an NOx purifying means which, when it becomes necessary to control the exhaust flow switching means so as to cause the exhaust to flow through both the NOx absorbing material and the NOx catalyst, controls the exhaust flow switching means so as to cause the exhaust to flow through both the NOx absorbing material and the NOx catalyst after releasing and purifying all the NOx absorbed by the NOx absorbing material and the NOx catalyst.

17. An exhaust emission purifying device of an internal combustion engine according to claim 16, wherein when the exhaust flow switching means is controlled so as to cause the exhaust to flow through both the NOx absorbing material and the NOx catalyst, the NOx purifying means simultaneously releases and purifies the NOx absorbed by the NOx absorbing material and the NOx absorbed by the NOx catalyst, using, of the NOx absorbing material and the NOx catalyst, the one whose NOx absorbing capacity is lower as a reference.

18. An exhaust emission purifying device of an internal combustion engine, comprising:

a lean-burn type internal combustion engine capable of burning an air-fuel mixture with excessive oxygen;

an NOx absorbing material which is arranged in an exhaust passage of the internal combustion engine and which is adapted to absorb nitrogen oxides in the exhaust when an air-fuel ratio of the exhaust flowing is lean and to release the nitrogen oxides it has absorbed when the oxygen concentration of the exhaust flowing in is low;

a bypass path branching off from the portion of the exhaust passage on the upstream side of the NOx absorbing material and adapted to cause the exhaust to bypass the NOx absorbing material;

an exhaust flow switching means for selectively switching the flow of the exhaust between the NOx absorbing material and the bypass path;

an SOx absorbing material which is arranged in the portion of the exhaust passage on the upstream side of the exhaust flow switching means and which is adapted to absorb sulfur oxides when the air-fuel ratio of the exhaust flowing-in is lean and to release the sulfur oxides it has absorbed when the oxygen concentration of the exhaust flowing in is low; and an NOx catalyst provided in the bypass path and adapted to purify nitrogen oxides when the air-fuel ratio of the exhaust flowing in is lean, wherein the exhaust flow switching means is controlled so as to cause the exhaust to be led to the NOx catalyst and as to prevent the exhaust from flowing into the NOx absorbing material when during the warming-up operation of the internal combustion engine the air-fuel ratio of the exhaust is being controlled to be stoichiometric or rich, and is controlled so as to cause the exhaust to be led to the NOx absorbing material and to prevent the exhaust from flowing into the NOx catalyst when, during the warning-up operation of the internal combustion engine, the amount of NOx discharged from the internal combustion engine is smaller than a predetermined amount.

19. An exhaust emission purifying device of an internal combustion engine, comprising:

a lean-burn type internal combustion engine capable of burning an air-fuel mixture with excessive oxygen;

an NOx absorbing material which is provided in an exhaust passage of the internal combustion engine and which is adapted to absorb nitrogen oxides in the exhaust when the air-fuel ratio of the exhaust flowing is lean and to release the nitrogen oxides it has absorbed when the oxygen concentration of the exhaust flowing in is low;

a bypass path branching off from the portion of the exhaust passage on the upstream side of the NOx absorbing material and adapted to cause the exhaust to bypass the NOx absorbing material;

an exhaust flow switching means for selectively switching the flow of the exhaust between the NOx absorbing material and the bypass path;

an SOx absorbing material which is arranged in the portion of the exhaust passage on the upstream side of the exhaust flow switching means and which is adapted to absorb sulfur oxides when the air-fuel ratio of the exhaust flowing-in is lean and to release the sulfur oxides it has absorbed when the oxygen concentration of the exhaust flowing in is low; and an NOx catalyst provided in the exhaust passage on the downstream side of the bypass path and adapted to purify nitrogen oxides when the air-fuel ratio of the exhaust is lean;

wherein the exhaust flow switching means causes all the exhaust to flow through the NOx absorbing material when the air-fuel ratio of the exhaust is controlled to be lean, and causes all the exhaust to flow through the bypass path when the air-fuel ratio of the exhaust is controlled to be stoichiometric or rich.

* * * * *

UNITED STATES PATENT AND TRADEMARK OFFICE
CERTIFICATE OF CORRECTION

PATENT NO. : 6,502,391 B1  Page 1 of 1
DATED : January 7, 2003
INVENTOR(S) : Shinya Hirota et al.

It is certified that error appears in the above-identified patent and that said Letters Patent is hereby corrected as shown below:

Column 64,
Line 52, change "lean-bum" to -- lean-burn --.

Column 65,
Line 66, change "lean-bum" to -- lean-burn --.

Column 66,
Line 38, change "lean-bum" to -- lean-burn --.

Column 69,
Line 44, remove blank lines before and after line starting with "leseless" and replace "leseless" with -- less --.

Column 70,
Line 34, change "warning-up" to -- warming-up --.

Signed and Sealed this

Ninth Day of September, 2003

JAMES E. ROGAN
*Director of the United States Patent and Trademark Office*